(12) United States Patent
Bonissone et al.

(10) Patent No.: US 7,895,062 B2
(45) Date of Patent: Feb. 22, 2011

(54) SYSTEM FOR OPTIMIZATION OF INSURANCE UNDERWRITING SUITABLE FOR USE BY AN AUTOMATED SYSTEM

(75) Inventors: Piero Patrone Bonissone, Schenectady, NY (US); Richard Paul Messmer, Rexford, NY (US); Angela Neff Patterson, Blacksburg, VA (US); Dan Yang, Westborough, MA (US); Marc Pavese, Saratoga Springs, NY (US); Rajesh Venkat Subbu, Troy, NY (US); Kareem Sherif Aggour, Niskayuna, NY (US)

(73) Assignee: Genworth Financial, Inc., Richmond, VA (US)

( * ) Notice: Subject to any disclaimer, the term of this patent is extended or adjusted under 35 U.S.C. 154(b) by 1167 days.

(21) Appl. No.: 10/173,039

(22) Filed: Jun. 18, 2002

(65) Prior Publication Data

US 2003/0187702 A1    Oct. 2, 2003

Related U.S. Application Data

(60) Provisional application No. 60/343,207, filed on Dec. 31, 2001.

(51) Int. Cl.
*G06Q 40/00* (2006.01)
*G06Q 10/00* (2006.01)
*G06Q 50/00* (2006.01)

(52) U.S. Cl. .............................. 705/4; 705/2

(58) Field of Classification Search .................. 705/2–4, 705/38
See application file for complete search history.

(56) References Cited

U.S. PATENT DOCUMENTS 4,642,768 A    2/1987    Roberts
4,722,055 A    1/1988    Roberts (Continued)

FOREIGN PATENT DOCUMENTS

EP    0621556 A2    10/1994

(Continued)

OTHER PUBLICATIONS

Watje et al., PCT/US01/40167—WO 2001/1063445.*

(Continued)

*Primary Examiner*—Neal R Sereboff
(74) *Attorney, Agent, or Firm*—Hunton & Williams

(57) ABSTRACT

A robust system for automating the tuning and maintenance of decision-making systems is described. A configurable multi-stage mutation-based evolutionary algorithm optimally tunes the decision thresholds and internal parameters of fuzzy rule-based and case-based systems that decide the risk categories of insurance applications. The tunable parameters have a critical impact on the coverage and accuracy of decision-making, and a reliable method to optimally tune these parameters is critical to the quality of decision-making and maintainability of these systems.

12 Claims, 30 Drawing Sheets

U.S. PATENT DOCUMENTS

| | | | |
|---|---|---|---|
| 4,766,539 A | 8/1988 | Fox | |
| 4,831,526 A | 5/1989 | Luchs et al. | |
| 4,837,693 A | 6/1989 | Schotz | |
| 4,839,804 A | 6/1989 | Roberts | |
| 4,949,278 A | 8/1990 | Davies | |
| 4,975,840 A * | 12/1990 | DeTore et al. | 705/4 |
| 5,191,522 A | 3/1993 | Bosco et al. | |
| 5,202,827 A | 4/1993 | Sober | |
| 5,208,898 A * | 5/1993 | Funabashi et al. | 706/45 |
| 5,218,539 A | 6/1993 | Elphick et al. | |
| 5,218,646 A | 6/1993 | Sirat et al. | |
| 5,235,654 A | 8/1993 | Anderson et al. | |
| 5,235,702 A | 8/1993 | Miller | |
| 5,241,620 A * | 8/1993 | Ruggiero | 706/16 |
| 5,359,509 A | 10/1994 | Little et al. | |
| 5,523,942 A | 6/1996 | Tyler | |
| 5,537,315 A | 7/1996 | Mitcham | |
| 5,586,313 A | 12/1996 | Schnittker et al. | |
| 5,590,038 A | 12/1996 | Pitroda | |
| 5,613,072 A | 3/1997 | Hammond | |
| 5,619,621 A | 4/1997 | Puckett | |
| 5,619,694 A | 4/1997 | Shimazu | |
| 5,627,973 A | 5/1997 | Armstrong | |
| 5,636,117 A | 6/1997 | Rothstein | |
| 5,655,085 A | 8/1997 | Ryan | |
| 5,696,907 A | 12/1997 | Tom | |
| 5,701,400 A | 12/1997 | Amado | |
| 5,712,984 A | 1/1998 | Hammond | |
| 5,752,236 A | 5/1998 | Sexton | |
| 5,752,237 A | 5/1998 | Cherny | |
| 5,754,980 A | 5/1998 | Anderson | |
| 5,768,422 A | 6/1998 | Yaegar | |
| 5,774,761 A | 6/1998 | Rai | |
| 5,796,863 A | 8/1998 | Lyon | |
| 5,797,134 A | 8/1998 | McMillan | |
| 5,805,730 A | 9/1998 | Yaegar et al. | |
| 5,805,731 A | 9/1998 | Yaegar et al. | |
| 5,809,478 A | 9/1998 | Greco | |
| 5,819,230 A | 10/1998 | Christie | |
| 5,835,897 A | 11/1998 | Dang | |
| 5,839,103 A | 11/1998 | Mammone et al. | |
| 5,839,113 A | 11/1998 | Federau | |
| 5,839,118 A | 11/1998 | Ryan | |
| 5,845,256 A | 12/1998 | Pescitelli et al. | |
| 5,850,480 A | 12/1998 | Scanlon | |
| 5,852,808 A | 12/1998 | Cherny | |
| 5,855,005 A | 12/1998 | Schuler | |
| 5,870,721 A * | 2/1999 | Norris | 705/38 |
| 5,873,066 A | 2/1999 | Underwood et al. | |
| 5,884,274 A | 3/1999 | Walker | |
| 5,893,072 A | 4/1999 | Zizzamia | |
| 5,897,619 A | 4/1999 | Hargrove | |
| 5,907,848 A | 5/1999 | Zaiken et al. | |
| 5,930,392 A | 7/1999 | Ho | |
| 5,930,759 A | 7/1999 | Moore et al. | |
| 5,956,691 A | 9/1999 | Powers | |
| 5,970,464 A | 10/1999 | Apte et al. | |
| 5,978,769 A | 11/1999 | Brown | |
| 5,987,434 A | 11/1999 | Libman | |
| 6,003,007 A | 12/1999 | DiRienzo | |
| 6,009,402 A | 12/1999 | Whitworth | |
| 6,018,714 A | 1/2000 | Risen | |
| 6,023,691 A | 2/2000 | Bertrand | |
| 6,026,363 A | 2/2000 | Shepard | |
| 6,049,773 A | 4/2000 | McCormack et al. | |
| 6,064,970 A | 5/2000 | McMillan | |
| 6,070,148 A | 5/2000 | Mori | |
| 6,076,066 A | 6/2000 | DiRienzo et al. | |
| 6,078,890 A | 6/2000 | Mangin | |
| 6,088,677 A | 7/2000 | Spurgeon | |
| 6,088,686 A | 7/2000 | Walker | |
| 6,098,070 A | 8/2000 | Maxwell | |
| 6,112,190 A | 8/2000 | Fletcher | |
| 6,115,694 A | 9/2000 | Cheetham et al. | |
| 6,119,093 A | 9/2000 | Walker | |
| 6,125,194 A | 9/2000 | Yeh et al. | |
| 6,128,598 A | 10/2000 | Walker | |
| 6,141,648 A | 10/2000 | Bonissone et al. | |
| 6,151,584 A | 11/2000 | Papierniak et al. | |
| 6,163,770 A | 12/2000 | Gamble | |
| 6,178,406 B1 | 1/2001 | Cheetham et al. | |
| 6,182,048 B1 | 1/2001 | Osborn | |
| 6,186,793 B1 * | 2/2001 | Brubaker | 434/107 |
| 6,208,974 B1 | 3/2001 | Campbell | |
| 6,246,991 B1 | 6/2001 | Abe | |
| 6,266,645 B1 | 7/2001 | Simpson | |
| 6,272,471 B1 | 8/2001 | Segal | |
| 6,272,482 B1 | 8/2001 | McKee | |
| 6,304,859 B1 | 10/2001 | Ryan | |
| 6,314,415 B1 | 11/2001 | Mukherjee | |
| 6,334,192 B1 | 12/2001 | Karpf | |
| 6,415,284 B1 | 7/2002 | D'Souza et al. | |
| 6,519,578 B1 | 2/2003 | Reddy | |
| 6,542,905 B1 | 4/2003 | Fogel et al. | |
| 6,553,365 B1 | 4/2003 | Summerlin et al. | |
| 6,584,446 B1 | 6/2003 | Buchanan | |
| 6,594,668 B1 | 7/2003 | Hudy | |
| 6,604,080 B1 | 8/2003 | Kern | |
| 6,615,181 B1 | 9/2003 | Segal | |
| 6,647,374 B2 | 11/2003 | Kansal | |
| 6,683,697 B1 | 1/2004 | Lech et al. | |
| 6,684,188 B1 | 1/2004 | Mitchell et al. | |
| 6,684,189 B1 | 1/2004 | Ryan et al. | |
| 6,684,190 B1 | 1/2004 | Powers | |
| 6,684,276 B2 | 1/2004 | Walker | |
| 6,714,925 B1 | 3/2004 | Barnhill et al. | |
| 6,725,220 B2 | 4/2004 | Stratlgos | |
| 6,731,993 B1 | 5/2004 | Carter | |
| 6,757,668 B1 | 6/2004 | Goebel | |
| 6,823,319 B1 * | 11/2004 | Lynch et al. | 705/38 |
| 6,826,539 B2 | 11/2004 | Loveland | |
| 6,829,584 B2 | 12/2004 | Loveland | |
| 6,868,386 B1 | 3/2005 | Henderson | |
| 6,869,362 B2 | 3/2005 | Walker | |
| 6,871,181 B2 | 3/2005 | Kansal | |
| 6,877,132 B1 | 4/2005 | De et al. | |
| 6,922,720 B2 | 7/2005 | Cianciarulo | |
| 6,937,990 B1 | 8/2005 | Walker | |
| 6,944,597 B2 | 9/2005 | Callen | |
| 6,963,853 B1 | 11/2005 | Smith | |
| 6,999,935 B2 | 2/2006 | Parankirinathan | |
| 7,020,692 B2 | 3/2006 | Cianciarulo | |
| 7,024,384 B2 | 4/2006 | Daughtery, III | |
| 7,027,992 B2 | 4/2006 | Zaccaria | |
| 7,050,932 B2 | 5/2006 | Selby et al. | |
| 7,062,706 B2 | 6/2006 | Maxwell et al. | |
| 7,072,841 B1 | 7/2006 | Pednault | |
| 7,095,426 B1 | 8/2006 | Childress | |
| 7,117,450 B1 | 10/2006 | Chaudhri | |
| 7,127,407 B1 | 10/2006 | Averill | |
| 7,130,779 B2 | 10/2006 | Beverina | |
| 7,143,051 B1 | 11/2006 | Hanby | |
| 7,249,040 B1 | 7/2007 | Binns | |
| 7,260,549 B2 * | 8/2007 | Spielmann et al. | 705/7 |
| 7,319,970 B1 | 1/2008 | Simone | |
| 7,325,076 B1 | 1/2008 | Morrison | |
| 7,337,121 B1 | 2/2008 | Beinat | |
| 7,343,307 B1 | 3/2008 | Childress | |
| 7,392,201 B1 | 6/2008 | Binns | |
| 7,398,218 B1 | 7/2008 | Bernaski | |
| 7,516,079 B2 | 4/2009 | Harrison | |
| 7,542,914 B1 | 6/2009 | Bates | |
| 7,555,438 B2 | 6/2009 | Binns | |
| 7,555,439 B1 | 6/2009 | Binns | |

| | | |
|---|---|---|
| 7,567,914 B2 | 7/2009 | Bonissone |
| 7,610,257 B1 | 10/2009 | Abrahams |
| 7,617,240 B2 | 11/2009 | Guyan |
| 7,620,560 B2 | 11/2009 | Dang |
| 7,624,037 B2 | 11/2009 | Bost |
| 7,630,909 B2 | 12/2009 | Wahlbin |
| 7,630,910 B2 | 12/2009 | Bonissone |
| 7,630,911 B2 | 12/2009 | Kay |
| 7,630,913 B2 | 12/2009 | Kay |
| 2001/0032099 A1 | 10/2001 | Joao |
| 2001/0049611 A1 | 12/2001 | Peach |
| 2001/0053986 A1 | 12/2001 | Dick |
| 2002/0010679 A1 | 1/2002 | Felsher |
| 2002/0032585 A1 | 3/2002 | Keyes |
| 2002/0035490 A1 | 3/2002 | Ohmoto |
| 2002/0040306 A1 | 4/2002 | Sugiyama |
| 2002/0049618 A1 | 4/2002 | McClure |
| 2002/0055862 A1 | 5/2002 | Jinks |
| 2002/0059126 A1* | 5/2002 | Ricciardi .................... 705/36 |
| 2002/0072936 A1 | 6/2002 | Newman |
| 2002/0077860 A1 | 6/2002 | Earnest et al. |
| 2002/0087364 A1 | 7/2002 | Lerner et al. |
| 2002/0091550 A1 | 7/2002 | White |
| 2002/0095317 A1 | 7/2002 | McCabe |
| 2002/0099596 A1 | 7/2002 | Geraghty |
| 2002/0111834 A1 | 8/2002 | Kogure |
| 2002/0111835 A1 | 8/2002 | Hele et al. |
| 2002/0116231 A1 | 8/2002 | Hele et al. |
| 2002/0120474 A1 | 8/2002 | Hele et al. |
| 2002/0120560 A1 | 8/2002 | Morgan |
| 2002/0123910 A1 | 9/2002 | Hereford |
| 2002/0128882 A1 | 9/2002 | Nakagawa |
| 2002/0138307 A1 | 9/2002 | Kramer |
| 2002/0143585 A1 | 10/2002 | Kodama |
| 2002/0143586 A1 | 10/2002 | Kodama |
| 2002/0156655 A1 | 10/2002 | Matsuda |
| 2002/0161609 A1 | 10/2002 | Zizzamia |
| 2002/0169641 A1 | 11/2002 | Wallace |
| 2002/0173995 A1 | 11/2002 | Schiminovich |
| 2002/0178033 A1 | 11/2002 | Yoshioka |
| 2003/0023462 A1 | 1/2003 | Heilizer |
| 2003/0028404 A1 | 2/2003 | Herron et al. |
| 2003/0061075 A1 | 3/2003 | Heckman |
| 2003/0069760 A1 | 4/2003 | Gelber |
| 2003/0074231 A1 | 4/2003 | Renes |
| 2003/0078817 A1 | 4/2003 | Harrison |
| 2003/0088443 A1 | 5/2003 | Majikes |
| 2003/0088488 A1 | 5/2003 | Solomon |
| 2003/0093302 A1 | 5/2003 | Quido |
| 2003/0093304 A1 | 5/2003 | Keller |
| 2003/0097281 A1 | 5/2003 | Momose |
| 2003/0101080 A1 | 5/2003 | Zizzamia |
| 2003/0120557 A1 | 6/2003 | Evans |
| 2003/0126049 A1 | 7/2003 | Nagan |
| 2003/0142043 A1 | 7/2003 | Matsueda |
| 2003/0144874 A1 | 7/2003 | Barret |
| 2003/0144888 A1 | 7/2003 | Baron |
| 2003/0158758 A1 | 8/2003 | Kanazawa |
| 2003/0167191 A1 | 9/2003 | Slabonik |
| 2003/0172043 A1 | 9/2003 | Guyon et al. |
| 2003/0176931 A1 | 9/2003 | Pednault et al. |
| 2003/0177032 A1 | 9/2003 | Bonissone et al. |
| 2003/0182159 A1 | 9/2003 | Bonissone et al. |
| 2003/0187693 A1 | 10/2003 | Oka |
| 2003/0187696 A1 | 10/2003 | Bonissone |
| 2003/0187697 A1 | 10/2003 | Bonissone et al. |
| 2003/0187698 A1 | 10/2003 | Bonissone |
| 2003/0187699 A1 | 10/2003 | Bonissone et al. |
| 2003/0187700 A1 | 10/2003 | Bonissone |
| 2003/0187701 A1 | 10/2003 | Bonissone |
| 2003/0187702 A1 | 10/2003 | Bonissone |
| 2003/0187703 A1 | 10/2003 | Bonissone |
| 2003/0187704 A1 | 10/2003 | Hashiguchi |
| 2003/0187768 A1 | 10/2003 | Ryan |
| 2003/0195776 A1 | 10/2003 | Moore |
| 2003/0208385 A1 | 11/2003 | Zander |
| 2003/0233260 A1 | 12/2003 | Snell |
| 2003/0233323 A1 | 12/2003 | Bilski |
| 2003/0236685 A1 | 12/2003 | Buckner |
| 2003/0236686 A1 | 12/2003 | Matsumoto |
| 2004/0004453 A1 | 1/2004 | Junnan et al. |
| 2004/0019575 A1 | 1/2004 | Talbot et al. |
| 2004/0024618 A1 | 2/2004 | Martin |
| 2004/0024619 A1 | 2/2004 | DiBella |
| 2004/0024620 A1 | 2/2004 | Robertson |
| 2004/0030589 A1 | 2/2004 | Leisher |
| 2004/0039608 A1 | 2/2004 | Mazur |
| 2004/0039610 A1 | 2/2004 | Weitermann |
| 2004/0039710 A1 | 2/2004 | McMillan et al. |
| 2004/0044763 A1 | 3/2004 | Besson |
| 2004/0049506 A1 | 3/2004 | Ghouri |
| 2004/0054621 A1 | 3/2004 | Bretvin |
| 2004/0059608 A1 | 3/2004 | Gore |
| 2004/0059639 A1 | 3/2004 | Ripper |
| 2004/0078243 A1 | 4/2004 | Fisher |
| 2004/0078250 A1 | 4/2004 | Schorb |
| 2004/0093242 A1 | 5/2004 | Cadigan et al. |
| 2004/0103003 A1 | 5/2004 | Mayers |
| 2004/0103012 A1 | 5/2004 | Nussbaum |
| 2004/0128147 A1 | 7/2004 | Vallinayagam |
| 2004/0128170 A1 | 7/2004 | MacKethan et al. |
| 2004/0128172 A1 | 7/2004 | Van Cleave |
| 2004/0138927 A1 | 7/2004 | Eydeland |
| 2004/0153346 A1 | 8/2004 | Grundel |
| 2004/0172308 A1 | 9/2004 | Macchia |
| 2004/0172311 A1 | 9/2004 | Kauderer |
| 2004/0181435 A9 | 9/2004 | Snell |
| 2004/0186753 A1 | 9/2004 | Kim |
| 2004/0199410 A1 | 10/2004 | Feyen |
| 2004/0204858 A1 | 10/2004 | Brumbaugh |
| 2004/0220837 A1 | 11/2004 | Bonissone et al. |
| 2004/0220838 A1 | 11/2004 | Bonissone |
| 2004/0220839 A1 | 11/2004 | Bonissone |
| 2004/0220840 A1 | 11/2004 | Bonissone |
| 2004/0230459 A1 | 11/2004 | Dordick |
| 2004/0230460 A1 | 11/2004 | Thomas |
| 2004/0236611 A1 | 11/2004 | Bonissone |
| 2004/0249678 A1 | 12/2004 | Henderson |
| 2004/0249679 A1 | 12/2004 | Henderson |
| 2004/0260594 A1 | 12/2004 | Maddox et al. |
| 2004/0267577 A1 | 12/2004 | Nakai |
| 2004/0267578 A1 | 12/2004 | Pearson |
| 2004/0267579 A1 | 12/2004 | Markman |
| 2005/0022122 A1 | 1/2005 | Barrus et al. |
| 2005/0027571 A1 | 2/2005 | Gamarnik |
| 2005/0027572 A1 | 2/2005 | Goshert |
| 2005/0043971 A1 | 2/2005 | Hendrickson |
| 2005/0055248 A1 | 3/2005 | Helitzer |
| 2005/0055249 A1 | 3/2005 | Helitzer |
| 2005/0060203 A1 | 3/2005 | LaJoie |
| 2005/0060207 A1 | 3/2005 | Weidner |
| 2005/0060208 A1 | 3/2005 | Gianantoni |
| 2005/0071204 A1 | 3/2005 | Parankirinathan |
| 2005/0075911 A1 | 4/2005 | Craven |
| 2005/0080649 A1 | 4/2005 | Alvarez |
| 2005/0086084 A1 | 4/2005 | Dillard |
| 2005/0102168 A1 | 5/2005 | Thomas |
| 2005/0102171 A1 | 5/2005 | Ashley |
| 2005/0102172 A1 | 5/2005 | Sirmans |
| 2005/0108062 A1 | 5/2005 | Higgins |
| 2005/0108064 A1 | 5/2005 | Castleman |
| 2005/0108066 A1 | 5/2005 | Weidner |
| 2005/0114184 A1 | 5/2005 | Rock |
| 2005/0119919 A1 | 6/2005 | Eder |
| 2005/0119920 A1 | 6/2005 | Murphy |
| 2005/0125253 A1 | 6/2005 | Bonissone |

| | | |
|---|---|---|
| 2005/0125259 A1 | 6/2005 | Annappindi |
| 2005/0131742 A1 | 6/2005 | Hoffman |
| 2005/0137914 A1 | 6/2005 | Schmitter |
| 2005/0137915 A1 | 6/2005 | Martin |
| 2005/0144045 A1 | 6/2005 | Corsi |
| 2005/0144046 A1 | 6/2005 | Schloss |
| 2005/0144047 A1 | 6/2005 | Tran |
| 2005/0154618 A1 | 7/2005 | Kita |
| 2005/0154619 A1 | 7/2005 | Barr |
| 2005/0182666 A1 | 8/2005 | Perry |
| 2005/0182667 A1 | 8/2005 | Metzger |
| 2005/0182670 A1 | 8/2005 | Burgess |
| 2005/0187799 A1 | 8/2005 | McGiffin |
| 2005/0192849 A1 | 9/2005 | Spalding |
| 2005/0203778 A1 | 9/2005 | Chen |
| 2005/0209894 A1 | 9/2005 | Wilson |
| 2005/0216426 A1 | 9/2005 | Weston et al. |
| 2005/0228699 A1 | 10/2005 | Samuels |
| 2005/0240447 A1 | 10/2005 | Kil |
| 2005/0246207 A1 | 11/2005 | Noonan |
| 2005/0256747 A1 | 11/2005 | Hellrigel |
| 2005/0261943 A1 | 11/2005 | Quarterman |
| 2005/0267783 A1 | 12/2005 | Zaccaria |
| 2005/0267785 A1 | 12/2005 | Parankirinathan |
| 2005/0273370 A1 | 12/2005 | Udell |
| 2005/0273371 A1 | 12/2005 | Callen |
| 2005/0278199 A1 | 12/2005 | Ghani |
| 2005/0288968 A1 | 12/2005 | Collins |
| 2005/0288971 A1 | 12/2005 | Cassandra |
| 2006/0015373 A1 | 1/2006 | Cuypers |
| 2006/0015374 A1 | 1/2006 | Ochs |
| 2006/0026044 A1 | 2/2006 | Smith |
| 2006/0026045 A1 | 2/2006 | Rothschild |
| 2006/0031104 A1 | 2/2006 | Gianantoni |
| 2006/0041454 A1 | 2/2006 | Matisonn |
| 2006/0047540 A1 | 3/2006 | Hutten |
| 2006/0059020 A1 | 3/2006 | Davidson |
| 2006/0064331 A1 | 3/2006 | Odermott |
| 2006/0064332 A1 | 3/2006 | Schoenbaum |
| 2006/0074724 A1 | 4/2006 | Schwartz |
| 2006/0080139 A1 | 4/2006 | Mainzer |
| 2006/0080153 A1 | 4/2006 | Fox |
| 2006/0085230 A1 | 4/2006 | Brill |
| 2006/0089860 A1 | 4/2006 | Fitzmorris |
| 2006/0089861 A1 | 4/2006 | King |
| 2006/0095301 A1 | 5/2006 | Gay |
| 2006/0095304 A1 | 5/2006 | Madison |
| 2006/0095305 A1 | 5/2006 | Madison |
| 2006/0100912 A1 | 5/2006 | Kumar |
| 2006/0108434 A1 | 5/2006 | Kallestad |
| 2006/0122871 A1 | 6/2006 | Cowley |
| 2006/0129427 A1 | 6/2006 | Wennberg |
| 2006/0129428 A1 | 6/2006 | Wennberg |
| 2006/0167735 A1 | 7/2006 | Ward |
| 2006/0241982 A1 | 10/2006 | Seifert |
| 2006/0253305 A1 | 11/2006 | Dougherty |
| 2006/0287892 A1 | 12/2006 | Jones |
| 2007/0011033 A1 | 1/2007 | Atkinson |
| 2007/0118554 A1 | 5/2007 | Chang |
| 2009/0055226 A1 | 2/2009 | Tritz |
| 2009/0055227 A1 | 2/2009 | Bakos |
| 2009/0070152 A1 | 3/2009 | Sperske |
| 2009/0076860 A1 | 3/2009 | Pelz |
| 2009/0089101 A1 | 4/2009 | Hashim |
| 2009/0094065 A1 | 4/2009 | Hyde |
| 2009/0094067 A1 | 4/2009 | Jung |
| 2009/0099877 A1 | 4/2009 | Hyde |
| 2009/0100095 A1 | 4/2009 | Jung |
| 2009/0106054 A1 | 4/2009 | Sarel |
| 2009/0119133 A1 | 5/2009 | Yeransian |
| 2009/0157433 A1 | 6/2009 | Schmidt |
| 2009/0177500 A1 | 7/2009 | Swahn |
| 2009/0182584 A1 | 7/2009 | Harkensee |
| 2009/0182678 A1 | 7/2009 | Braun |
| 2009/0187434 A1 | 7/2009 | Cowles |
| 2009/0192828 A1 | 7/2009 | Yunker |
| 2009/0198523 A1 | 8/2009 | Grieder |
| 2009/0198527 A1 | 8/2009 | Guerrero |
| 2009/0204447 A1 | 8/2009 | Tucker |
| 2009/0210256 A1 | 8/2009 | Upadhyayula |
| 2009/0216567 A1 | 8/2009 | Dust |
| 2009/0228308 A1 | 9/2009 | Chien |
| 2009/0240532 A1 | 9/2009 | Gore |
| 2009/0248453 A1 | 10/2009 | Seybold |
| 2009/0254379 A1 | 10/2009 | Adams |
| 2009/0265190 A1 | 10/2009 | Ashley |
| 2009/0265191 A1 | 10/2009 | Evanitsky |
| 2009/0276247 A1 | 11/2009 | Howell |
| 2009/0276249 A1 | 11/2009 | Dust |
| 2009/0281841 A1 | 11/2009 | Baak |
| 2009/0287509 A1 | 11/2009 | Basak |
| 2009/0287512 A1 | 11/2009 | Bonissone |
| 2009/0299773 A1 | 12/2009 | Gore |
| 2009/0299774 A1 | 12/2009 | Gore |
| 2009/0299775 A1 | 12/2009 | Gore |
| 2009/0299776 A1 | 12/2009 | Gore |
| 2009/0307015 A1 | 12/2009 | Gore |

FOREIGN PATENT DOCUMENTS

| | | |
|---|---|---|
| WO | WO 98/22936 | 5/1998 |
| WO | WO 01/20512 A2 | 3/2001 |
| WO | WO 01/93193 | 6/2001 |
| WO | WO 01/63445 | 8/2001 |
| WO | WO 01/88834 A2 | 11/2001 |
| WO | 2004/008256 | 11/2004 |

OTHER PUBLICATIONS

Watje et al., U.S. Appl. No. 09/010,535.*
Apte, C. RAMP: Rules Abstraction for Modeling and Prediction, IBM TJ Watson Research Center, Jan. 12, 1996.*
Finger, Robjet Chapter 6, "Risk Classificaiton", Foundations of Casualty Actuarial Science, 4th Edition 2001.*
Murphy, Karl, "Using Generalized Linear Models to Build Dynamic Pricing Systems" Casualty Actuarial Society, Winter 2000.*
Brockett, Robert et al., Operations Research in Insurance: A Review, Transactions of Society of Actuaries, 1995, vol. 47.*
Aggour, Kareem, Automating the Underwriting of Insurance Applications, Fall 2006 AI Magazine.*
Avelino J. Gonzalez et al., "A case-based reasoning approach to real estate property appraisal," Systems with Applications, vol. 4, pp. 229-246, 1992.
Piero P. Bonissone et al., "Evolutionary optimization of fuzzy decision systems for automated insurance underwriting," Proceedings of the 2002 IEEE International Conference on Fuzzy Systems, May 12-17, 2002, pp. 1003-1008.
Piero P. Bonissone et al, "Fuzzy case-based reasoning for decision making," 2001 IEEE International Fuzzy Systems Conference, pp. 995-998.
Haberman, et al., Generalised Linear Models in Actuarial Work, Presented to the Staple Inn Actuarial Society, Feb. 2, 1998.
Borglin, et al., Stochastic Dominance and Conditional Expectation—An Theoretical Approach, The Geneva Papers on risk and Insurance Theory, 27:31-48, 2002.
Allwein et al., "Reducing Multiclass to Binary: A Unifying Approach for Margin Classifiers", Journal of Machine Learning Research, vol. 1, (2000), pp. 113-141.
Rubtsov et al., "A Unified Format for Trained Neural Network Description", Neural Network, Proceedings IJCNN '01 International Joint Conference, vol. 4, pp. 2367-2372, Meeting date: Jul. 15-19, 2001.
Yang, "An Evaluation of Statistical Approaches to Text Categorization", Kluwer Academic Publishers, Information Retrieval 1, pp. 69-90.
Foltin et al., "*Beyond expert systems: Neural networks in accounting,*" National Public Accountant, Jun. 1996, pp. 26-30, v41n6.

Goetz, "A Fuzzy Future for MIS?", Informationweek, p. 51, Feb. 25, 1991, ISSN: 8750-6874. Dialog ID No. 01544473, From Dialog file 16 (Gale Group).

Humpert, Bidirectional Associative Memory with Several Patterns, 1990, ISU, CS-122, I-741-I-750.

Waxman et al., "Information Fusion for Image Analysis: Geospatial Foundations for Higher Fusion", 2002, ISIF, 562-569.

Yap, Jr. et al., "Generalized Associative Memory Models for Data Fusion", 2003, IEEE, 0-7803-7898-9/03, 2528-2533.

Goetz, "Clearing up fuzzy logic—Forum—Column", Software Magazine, Jan. 1992, Wiesner Publications, Inc.

Nakao, et al., General Social Survey Methodological Report No. 70, Computing 1989, Occupational Prestige Scores, pp. 1-65.

Flores, et al. Robust Logistic Regression For Insurance Risk Classification, University Carlos III de Madrid, Nov. 2001, pp. 1-20.

Collins, et al., An Application of A Multiple Network Learning System to Emulation of Mortgage Underwriting Judgements, IEEE Service Center, 1988, pp. 11-459-11-466.

Schlesinger, Insurance Demand Without the Expected-Utility Paradigm, Journal of Risk and Insurance, Oct. 1996, pp. 1-29.

http://web.archive.org/web/20021201125553/http://www.echoecho.com/jsforms02.htm.

Jablonoswki, Fuzzy Logic and Insurance Decisions Society of Chartered Property and Casualty Underwriters CPCU Journal Sep. 1991 vol. 44 Issue 3 p. 181-187.

Qureshi, Artificial Intelligence In Accounting & Business The National Public Accountant Sep. 1998 vol. 43 Issue 7 p. 13-18.

Nikolopoulos, A Hybrid Machine Learning System and its Application to Insurance Underwriting Evolutionary Computation 1994 IEEE World Cong on Computation Intell Proc of the first IEEE Conf Jun. 1994 p. 692-695 vol. 2.

Young, Adjusting Indicted Insurance Rates: Fuzzy Rules That Consider Both Experience and Auxiliary Data Proceeding of the Casualty Actuarial Society 1997.

Keeney et al., *Decisions with Multiple Objective: Preferences and Value Tradeoffs* book, 1976, John Wiley & Sons, Inc., preface pages, acknowledgement page, Chapter Headings p. xv, Contents pp. xvii-xxviii.

Duda et al., *"Pattern Classification"* book, $2^{nd}$ Edition, John Wiley & Songs, Inc., 2001, Contents pp. vii-xvi, Preface pp. xvii-xx.

Shafer, *"A Mathematical Theory of Evidence"* book, published by Princeton University Press, Princeton and London, 1976, Preface pp. ix-x, Contents pp. xi-xiii.

Kuncheva et al., *"Designing Classifier Fusion System by Genetic Algorithms,"* IEEE Transactions of Evolutionary Computation, vol. 4, No. 4, Sep. 2000, pp. 327-336.

Chibelushi et al., *"Adaptive Classifier Integration for Robust Pattern Recognition,"* IEEE Transactions on Systems, Man, and Cybernetics—Part B: Cybernetics, vol. 29, No. 6, Dec. 1999, pp. 902-907.

Dempster, *"Upper and Lower Probabilities Induced By A Multivalued Mapping,"* Annals of Mathematical Statistics, Harvard University, 38:, pp. 325-339, 1967.

Bonissone et al., *"Selecting Uncertainty Calculi and Granularity and Experiment in Trading-Off Precision and Complexity,"* Uncertainty in Artificial Intelligence, Kanal & Lemmer (editors), pp. 217-247, Elsevier Science Publishers B.V. (North-Holland), 1986.

Bonissone, *"Summarizing and Propagating Uncertain Information With Triangular Norms,"* International Journal of Approximate Reasoning, Elsevier Science Publishing Co., Inc., New York, NY, 1: pp. 71-101, 1987.

Krzyzak et al., *"Methods of Combining Multiple Classifiers and Their Applications to Handwriting Recognition,"* IEEE Transactions on Systems, Man, and Cybernetics, vol. 22, No. 3, pp. 418-435, May/Jun. 1992.

Fairhurst et al., *"Enhancing Consensus in Multiple Expert Decision Fusion,"* IEE Proceedings Vis. Image Signal Process, vol. 147, No. 1, 2000.

Ruspini, *"Epistemic Logics, Probability, and the Calculus of Evidence,"*Proc. Tenth Intern Joint Conf. on Artificial Intelligence, Milan, Italy, Reasoning pp. 924-931, 1987.

Schweizer et al., *"Associative Functions and Abstract Semigroups,"* Publicationes Mathematicae Debrecen, 10:pp. 69-81, 1963.

Srivastava et al., *"A Hybrid Neural Network Model for Fast Voltage Contingency Screening and Ranking,"* International Journal of Electrical Power & Energy Systems, vol. 22, No. 1, pp. 35-42.

Lampinen et al., *"Selection of Training Samples for Learning With Hints,"* IJCNN 1999 IEEE, International Joint Conference on Neural Networks, vol. 2, pp. 1438-1441.

Abu-Mostafa, *"Hints and the VC Dimension,"* Neural Computation, vol. 5, No. 2, Mar. 1993, pp. 278-288.

Ding et al., *"Multi-class Protein Fold Recognition Using Support Vector Machines and Neural Networks,"*Bioinformatics, vol. 17, No. 4, 2001, pp. 349-358.

Dorizzi et al., *"Cooperation and Modularity for Classification Through Neural Network Techniques,"* Proceedings of 1993 International Conference on System, Man and cybernetics, vol. 3, pp. 469-474.

Price et al., *"Pairwise Neural Network Classifiers with Probabilistic Outputs,"* Tesauro et al., eds., Neural Information Processing Systems, vol. 7, 1994, pp. 1109-1116.

Vaughn et al., *"Interpretation and Knowledge Discovery from a Multilayer Perception Network that Performs Whole Life Assurance Risk Assessment,"* Neural Computing & Applications, Springer-Verlag London.

Collins et al., *"An Application of a Multiple Neural Network Learning System to Emulation of Mortgage Underwriting Judgements,"* Proceedings of the IEEE International Conference on Neural Networks, 1988, pp. II-459 through II-466.

Nossek et al., *"Classification Systems Based on Neural Networks,"* the Fifth IEEE International Workshop on Cellular Neural Networks and their Applications, London, England, Apr. 14-17, 1998, pp. 26-33.

Abu-Mostafa, *"A Method for Learning from Hints,"* in Hanson, Cowan & Giles eds., Advances in Neural Information Processing Systems, vol. 5, pp. 73-80, Morgan Kaufmann, San Mateo, CA.

Beradi et al., *"The Effect of Misclassification Costs on Neural Network Classifiers,"* Decision Sciences, vol. 30, No. 3, summer 1999, pp. 659-682.

Tong et al., *"Linguistic Approach to Decisionmaking with Fuzzy Sets,"* IEEE Transactions on Systems, Man, and Cybernetics, vol. SMC-10, No. 11, Nov. 1990, pp. 716-723.

MacCrimmon, *"An Overview of Multiple Objective Decision Making,"* editors Cochrane and Zeleny, 1973, pp. 18-44.

Kung et al., *"On finding the Maxima of a Set of Vectors,"* Journal for the Association of Computing Machinery, vol. 22, No. 4, Oct. 1975, pp. 469-476.

Bentley et al., *"On the Average Number of Maxima in a Set of Vectors and Applications,"* Journal of the Association for Computing Machinery, vol. 25, No. 4, Oct. 1978, pp. 536-543.

Simon, *"A Behavioral Model of Rational Choice,"* Quarterly Journal of Economics, vol. 69, No. 1, Feb. 1955, pp. 99-118.

Zionts, *"Decision Making: Some Experiences, Myths and Observations,"* Multiple criteria Decision Making: Proceedings of the Twelfth International Conference, Lecture notes in Economics and Mathematical Systems, vol. 448, Hagen (Germany), 1997, pp. 233-241.

Friedman, *"Multivariate Adaptive Regression Splines,"* Annals of Statistics, SLAC PUB-4960 Rev, Tech Report 102 Rev, Aug. 1990, pp. 1-79.

Schumaker, Discussion of Friedman paper, *"Multivariate Adaptive Regression Splines,"*pp. 1-2.

Owen, Discussion of Friedman paper, *"Multivariate Adaptive Regression Splines,"* pp. 1-9 & Figs. 1-4.

Stone, Discussion of Friedman paper, *"Multivariate Adaptive Regression Splines,"* pp. 1-3.

Sullivan, Some Comments on Friedman paper, *"Multivariate Adaptive Regression Splines,"* pp. 1-6.

Breiman, Discussion of Friedman paper, *"Multivariate Adaptive Regression Splines,"* 8 pages.

Golubev et al., Discussion of Friedman paper, *"Multivariate Adaptive Regression Splines,"* 2 pages.

Buja et al., Discussion of Friedman paper, *"Multivariate Adaptive Regression Splines,"* pp. 1-5.

Gu et al., Comments on Friedman paper, "*Multivariate Adaptive Regression Splines*," pp. 1-10, rev. Jun. 5, 1990.

Barron et al., Discussion of Friedman paper, "*Multivariate Adaptive Regression Splines*," pp. 1-12 and 2 pages of Tables, Jul. 1990, University of IL.

Friedman, "*Rejoinder*," pp. 1-14.

Calpine et al., Some properties of Pareto optimal choices in decision problems, Int. J. Manage. Sci., 1976, pp. 141-147, vol. 4, No. 2.

Subba, et al., Modeling and Convergence Analysis of Distributed Coevolutionary Algorithims, IEEE, 2000, pp. 1276-1283.

\* cited by examiner

| PREFERRED BEST 0 | PREFERRED 1 | SELECT 3 | STANDARD PLUS 5 | STANDARD 8 | TABLE II 16 | TABLE IV 4 | TABLE VI 2 | TABLE VIII 1 |
|---|---|---|---|---|---|---|---|---|
|  | 0.1 | 0.1 | 0.2 | 0.2 | 0.3 | 0.2 | 0.2 | 0.3 |
|  |  | 0.2 | 0.3 | 0.5 | 0.4 | 0.3 | 0.2 |  |
|  |  | 0.2 | 0.5 | 0.5 | 0.4 | 0.3 |  |  |
|  |  |  | 0.6 | 0.6 | 0.5 | 0.6 |  |  |
|  |  |  | 0.7 | 0.6 | 0.5 |  |  |  |
|  |  |  |  | 0.6 | 0.5 |  |  |  |
|  |  |  |  | 0.8 | 0.5 |  |  |  |
|  |  |  |  | 0.8 | 0.6 |  |  |  |
|  |  |  |  |  | 0.6 |  |  |  |
|  |  |  |  |  | 0.7 |  |  |  |
|  |  |  |  |  | 0.7 |  |  |  |
|  |  |  |  |  | 0.7 |  |  |  |
|  |  |  |  |  | 0.8 |  |  |  |
|  |  |  |  |  | 0.8 |  |  |  |
|  |  |  |  |  | 0.9 |  |  |  |
|  |  |  |  |  | 0.9 |  |  |  |

FIG. 10

| RC-A | STANDARD | TABLE 2 | TABLE 4 | TABLE 6 | TABLE 8 | TABLE 10 | TABLE 12 | TABLE 14 | TABLE 16 | TABLE 18 | TABLE 20 | TABLE 22 | TABLE 24 | TABLE 26 | TABLE 28 | TABLE 30 | TABLE 32 |
|---|---|---|---|---|---|---|---|---|---|---|---|---|---|---|---|---|---|
| RC-B | | | | | | | | | | | | | | | | | |
| STANDARD | | 2 | 4 | 6 | 8 | 10 | 12 | 14 | 16 | 18 | 20 | 22 | 24 | 26 | 28 | 30 | 32 |
| TABLE 2 | 2 | 4 | 6 | 8 | 10 | 12 | 14 | 16 | 18 | 20 | 22 | 24 | 26 | 28 | 30 | 32 | 34 |
| TABLE 4 | 4 | 6 | 8 | 10 | 12 | 14 | 16 | 18 | 20 | 22 | 24 | 26 | 28 | 30 | 32 | 34 | 36 |
| TABLE 6 | 6 | 8 | 10 | 12 | 14 | 16 | 18 | 20 | 22 | 24 | 26 | 28 | 30 | 32 | 34 | 36 | 38 |
| TABLE 8 | 8 | 10 | 12 | 14 | 16 | 18 | 20 | 22 | 24 | 26 | 28 | 30 | 32 | 34 | 36 | 38 | 40 |
| TABLE 10 | 10 | 12 | 14 | 16 | 18 | 20 | 22 | 24 | 26 | 28 | 30 | 32 | 34 | 36 | 38 | 40 | DECLINE |
| TABLE 12 | 12 | 14 | 16 | 18 | 20 | 22 | 24 | 26 | 28 | 30 | 32 | 34 | 36 | 38 | 40 | DECLINE | DECLINE |
| TABLE 14 | 14 | 16 | 18 | 20 | 22 | 24 | 26 | 28 | 30 | 32 | 34 | 36 | 38 | 40 | DECLINE | DECLINE | DECLINE |
| TABLE 16 | 16 | 18 | 20 | 22 | 24 | 26 | 28 | 30 | 32 | 34 | 36 | 38 | 40 | DECLINE | DECLINE | DECLINE | DECLINE |
| TABLE 18 | 18 | 20 | 22 | 24 | 26 | 28 | 30 | 32 | 34 | 36 | 38 | 40 | DECLINE | DECLINE | DECLINE | DECLINE | DECLINE |
| TABLE 20 | 20 | 22 | 24 | 26 | 28 | 30 | 32 | 34 | 36 | 38 | 40 | DECLINE | DECLINE | DECLINE | DECLINE | DECLINE | DECLINE |
| TABLE 22 | 22 | 24 | 26 | 28 | 30 | 32 | 34 | 36 | 38 | 40 | DECLINE | DECLINE | DECLINE | DECLINE | DECLINE | DECLINE | DECLINE |
| TABLE 24 | 24 | 26 | 28 | 30 | 32 | 34 | 36 | 38 | 40 | DECLINE | DECLINE | DECLINE | DECLINE | DECLINE | DECLINE | DECLINE | DECLINE |
| TABLE 26 | 26 | 28 | 30 | 32 | 34 | 36 | 38 | 40 | DECLINE | DECLINE | DECLINE | DECLINE | DECLINE | DECLINE | DECLINE | DECLINE | DECLINE |
| TABLE 28 | 28 | 30 | 32 | 34 | 36 | 38 | 40 | DECLINE | DECLINE | DECLINE | DECLINE | DECLINE | DECLINE | DECLINE | DECLINE | DECLINE | DECLINE |
| TABLE 30 | 30 | 32 | 34 | 36 | 38 | 40 | DECLINE | DECLINE | DECLINE | DECLINE | DECLINE | DECLINE | DECLINE | DECLINE | DECLINE | DECLINE | DECLINE |
| TABLE 32 | 32 | 34 | 36 | 38 | 40 | DECLINE | DECLINE | DECLINE | DECLINE | DECLINE | DECLINE | DECLINE | DECLINE | DECLINE | DECLINE | DECLINE | DECLINE |

FIG. 11

| CLASSIFICATION DISTANCE | $X_{1:N}$ = NUMBER OF RETRIEVED CASES FOR EACH PROBE | | | | | | | | | | TOTAL NUMBER OF PROBES |
|---|---|---|---|---|---|---|---|---|---|---|---|
| | [1-4] | [5-8] | [9-12] | [17-20] | [21-24] | [25-28] | [29-32] | [33-36] | [37-40] | 40+ | |
| -3 | 5 | 4 | 4 | 2 | 0 | 0 | 0 | 0 | 0 | 0 | 15 |
| -2 | 9 | 12 | 9 | 7 | 7 | 6 | 6 | 4 | 2 | 2 | 64 |
| -1 | 6 | 9 | 16 | 17 | 19 | 13 | 9 | 9 | 8 | 8 | 114 |
| 0 | 5 | 6 | 15 | 20 | 25 | 31 | 32 | 33 | 35 | 40 | 242 |
| 1 | 6 | 8 | 13 | 15 | 13 | 11 | 12 | 8 | 7 | 7 | 100 |
| 2 | 8 | 7 | 7 | 4 | 3 | 2 | 1 | 1 | 1 | 1 | 35 |
| 3 | 2 | 1 | 0 | 0 | 0 | 0 | 0 | 0 | 0 | 0 | 3 |
| TOTAL CASES WITHIN BINS OF N | 41 | 47 | 64 | 65 | 67 | 63 | 60 | 55 | 53 | 58 | 573 |

FIG. 15

| CLASSIFICATION DISTANCE | X1:N=NUMBER OF RETRIEVED CASES FOR EACH PROBE | | | | | | | | | |
|---|---|---|---|---|---|---|---|---|---|---|
| | [1-4] | [5-8] | [9-12] | [17-20] | [21-24] | [25-28] | [29-32] | [33-36] | [37-40] | 40+ |
| -3 | 12.20% | 8.51% | 6.25% | 3.08% | 0.00% | 0.00% | 0.00% | 0.00% | 0.00% | 0.00% |
| -2 | 21.95% | 25.53% | 14.06% | 10.77% | 10.45% | 9.52% | 10.00% | 7.27% | 3.77% | 3.45% |
| -1 | 14.63% | 19.15% | 25.00% | 26.15% | 28.36% | 20.63% | 15.00% | 16.36% | 15.09% | 13.79% |
| 0 | 12.20% | 12.77% | 23.44% | 30.77% | 37.31% | 49.21% | 53.33% | 60.00% | 66.04% | 68.97% |
| 1 | 14.63% | 17.02% | 20.31% | 23.08% | 19.40% | 17.46 | 20.00% | 14.55% | 13.21% | 12.07% |
| 2 | 19.51% | 14.89% | 10.94% | 6.15% | 4.48% | 3.17% | 1.67% | 1.82% | 1.89% | 1.72% |
| 3 | 4.88% | 2.19% | 0.00% | 0.00% | 0.00% | 0.00% | 0.00% | 0.00% | 0.00% | 0.00% |
| TOTAL % WITHIN BINS | 100.00% | 100.00% | 100.00% | 100.00% | 100.00% | 100.00% | 100.00% | 100.00% | 100.00% | 100.00% |

FIG. 16

| CLASSIFICATION DISTANCE | X1:N = NUMBER OF RETRIEVED CASES FOR EACH PROBE | | | | | | | | | |
|---|---|---|---|---|---|---|---|---|---|---|
| | [1-4] | [5-8] | [9-12] | [17-20] | [21-24] | [25-28] | [29-32] | [33-36] | [37-40] | 40+ |
| 0 | 12.20% | 12.77% | 23.44% | 30.77% | 37.31% | 49.21% | 53.33% | 60.00% | 66.04% | 68.97% |

FIG. 17

| | \[1-4\] | \[5-8\] | \[9-12\] | \[17-20\] | \[21-24\] | \[25-28\] | \[29-32\] | \[33-36\] | \[37-40\] | 40+ |
|---|---|---|---|---|---|---|---|---|---|---|
| | | | | X1:N = NUMBER OF RETRIEVED CASES FOR EACH PROBE | | | | | | |
| PERFORMANCE FUNCTION BY BINS OF N | -4.17 | -3.45 | -1.70 | -0.62 | 0.12 | 0.83 | 1.08 | 1.55 | 2.02 | 2.19 |

FIG. 18

| | [1-4] | [5-8] | [9-12] | [17-20] | [21-24] | [25-28] | [29-32] | [33-36] | [37-40] | 40+ |
|---|---|---|---|---|---|---|---|---|---|---|
| NORMALIZED AND FLOORED PERF. FUNCT. | 0.00 | 0.00 | 0.00 | 0.00 | 0.05 | 0.38 | 0.49 | 0.71 | 0.92 | 1.00 |

X1:N = NUMBER OF RETRIEVED CASES FOR EACH PROBE

FIG. 19

| CASE # | CBE | VALIDATED CASE | DISTANCE FROM CORRECT DECISION | REWARD PENALTY (ACCURACY WEIGHT) | CONFIDENCE | τ 0.1 | τ 0.2 | τ 0.3 | τ 0.4 | τ 0.5 | τ 0.6 | τ 0.7 | τ 0.8 | τ 0.9 | τ 1 |
|---|---|---|---|---|---|---|---|---|---|---|---|---|---|---|---|
| IN CB | DECISION | DECISION | | | FACTOR | CF>τ | CF>τ | CF>τ | CF>τ | CF>τ | CF>τ | CF>τ | CF>τ | CF>τ | CF>τ |
| 1 | STANDARD | STANDARD | 0 | 4 | 0.56 | 1 | 1 | 1 | 1 | 1 | 0 | 0 | 0 | 0 | 0 |
| 2 | TABLE 2 | TABLE 2 | 0 | 4 | 0.8 | 1 | 1 | 1 | 1 | 1 | 1 | 1 | 0 | 0 | 0 |
| 3 | TABLE 4 | TABLE 5 | -1 | -1 | 0.4 | 1 | 1 | 1 | 1 | 0 | 0 | 0 | 0 | 0 | 0 |
| 4 | TABLE 6 | TABLE 7 | -1 | -1 | 0.6 | 1 | 1 | 1 | 1 | 1 | 1 | 0 | 0 | 0 | 0 |
| 5 | TABLE 7 | TABLE 4 | -3 | -11 | 0.18 | 1 | 0 | 0 | 0 | 0 | 0 | 0 | 0 | 0 | 0 |
| 6 | DECLINE | DECLINE | 0 | 4 | 0.7 | 1 | 1 | 1 | 1 | 1 | 1 | 0 | 0 | 0 | 0 |
| 7 | STNDPLUS | STANDARD | -1 | -1 | 0.46 | 1 | 1 | 1 | 1 | 0 | 0 | 0 | 0 | 0 | 0 |
| 8 | TABLE 4 | TABLE 3 | -1 | -1 | 0.55 | 1 | 1 | 1 | 1 | 1 | 0 | 0 | 0 | 0 | 0 |
| 9 | TABLE 8 | TABLE 7 | -1 | -1 | 0.67 | 1 | 1 | 1 | 1 | 1 | 1 | 0 | 0 | 0 | 0 |
| 10 | TABLE 6 | TABLE 9 | -3 | -11 | 0.3 | 1 | 1 | 0 | 0 | 0 | 0 | 0 | 0 | 0 | 0 |

| | | | | | | | | | | | | |
|---|---|---|---|---|---|---|---|---|---|---|---|---|
| COVERAGE | $g_1(\tau)$ | 1.00 | 0.90 | 0.80 | 0.70 | 0.60 | 0.30 | 0.10 | 0.00 | 0.00 | 0.00 |
| RELATIVE ACCURACY | $g_2(\tau)$ | -1.50 | -0.44 | 0.88 | 1.14 | 1.50 | 2.33 | 4.00 | 0.00 | 0.00 | 0.00 |
| GLOBAL ACCURACY | $A(\tau)$ | -1.50 | -0.40 | 0.70 | 0.80 | 0.90 | 0.70 | 0.40 | 0.00 | 0.00 | 0.00 |

SYSTEM FOR OPTIMIZATION OF INSURANCE UNDERWRITING SUITABLE FOR USE BY AN AUTOMATED SYSTEM

CROSS-REFERENCE TO RELATED APPLICATIONS

The present application claims priority from U.S. Provisional Patent Application Ser. No. 60/343,207, which was filed on Dec. 31, 2001.

BACKGROUND OF THE INVENTION

The present invention relates to a process and system for underwriting insurance applications, and more particularly to a system for optimizing decisions for underwriting insurance applications based on flexible fuzzy rule-based and case-based systems.

A trained individual or individuals traditionally perform insurance underwriting. A given application for insurance (also referred to as an "insurance application") may be compared against a plurality of underwriting standards set by an insurance company. The insurance application may be classified into one of a plurality of risk categories available for a type of insurance coverage requested by an applicant. The risk categories then affect a premium paid by the applicant, e.g., the higher the risk category, the higher the premium. A decision to accept or reject the application for insurance may also be part of this risk classification, as risks above a certain tolerance level set by the insurance company may simply be rejected.

There can be a large amount of variability in the insurance underwriting process when performed by individual underwriters. Typically, underwriting standards cannot cover all possible cases and variations of an application for insurance. The underwriting standards may even be self-contradictory or ambiguous, leading to uncertain application of the standards. The subjective judgment of the underwriter will almost always play a role in the process. Variation in factors such as underwriter training and experience, and a multitude of other effects can cause different underwriters to issue different, inconsistent decisions. Sometimes these decisions can be in disagreement with the established underwriting standards of the insurance company, while sometimes they can fall into a "gray area" not explicitly covered by the underwriting standards.

Further, there may be an occasion in which an underwriter's decision could still be considered correct, even if it disagrees with the written underwriting standards. This situation can be caused when the underwriter uses his/her own experience to determine whether the underwriting standards may or should be interpreted and/or adjusted. Different underwriters may make different determinations about when these adjustments are allowed, as they might apply stricter or more liberal interpretations of the underwriting standards. Thus, the judgment of experienced underwriters may be in conflict with the desire to consistently apply the underwriting standards.

Most of the key information required for automated insurance underwriting is structured and standardized. However, some sources of information may be non-standard or not amenable to standardization. By way of example, an attending physician statement ("APS") may be almost as unique as each individual physician. However, a significant fraction of applications may require the use of one or more APS due to the presence of medical impairments, age of applicants, or other factors. Without such key information, the application underwriting process cannot be automated for these cases.

Conventional methods for dealing with some of the problems described above have included having human underwriters directly reading the APS. However, an APS document can be as long as several tens of pages. Therefore, the manual reading process, combined with note-taking and consulting other information, such as an underwriting manual or the like, can greatly extend the cycle-time for each application processed, increase underwriter variability, and limit capacity by preventing the automation of the decision process.

Other drawbacks may also exist.

SUMMARY OF THE INVENTION

An exemplary embodiment of the invention provides a system for optimizing an insurance application underwriting decision based on a plurality of predetermined underwriting rules for an insurance underwriting system comprising an input module for defining a process for the insurance application underwriting decision for the insurance underwriting system, a processor module for performing a plurality of insurance application underwriting decisions by applying the process to a plurality of certified insurance applications, where each of the plurality of certified insurance applications comprises an insurance application for which a correct underwriting decision has already been made, and a comparison module for comparing the correct underwriting decisions to the underwriting decisions performed by applying the process.

According to another exemplary embodiment of the invention, a system for optimizing an insurance application underwriting decision based on a plurality of predetermined underwriting rules for an insurance underwriting system, the system comprises an input module for defining the plurality of underwriting rules for the insurance underwriting system. In addition, a processor module performs a plurality of insurance application underwriting decisions by applying the plurality of rules to a plurality of certified insurance applications, where each of the plurality of certified insurance applications comprises an insurance application for which a correct underwriting decision has already been made. A comparison module compares the correct underwriting decisions and the underwriting decisions performed by applying the plurality of rules. Further, a penalty module generates at least one penalty based on the comparison of the correct underwriting decisions and the underwriting decisions performed by applying the plurality of rules. A redefinition module then redefines the plurality of underwriting rules based on the generated penalty and the comparison of the correct underwriting decisions and the underwriting decisions performed by applying the plurality of rules.

According to another embodiment of the present invention, a system for optimizing an insurance application underwriting decision based on an application comparison of an insurance application with at least one previously made insurance application underwriting decision for an insurance underwriting system is provided, where the system comprises an input module for defining the application comparison for the insurance underwriting system and a processor module for performing a plurality of insurance application underwriting decisions by applying the application comparison to a plurality of certified insurance applications, where each of the plurality of certified insurance applications comprises an insurance application for which a correct underwriting decision has already been made. Further, the system comprises a comparison module for comparing the correct underwriting decisions and the underwriting decisions performed by applying the application comparison, a penalty module for generating at least one penalty based on the comparison of the correct underwriting decisions and the underwriting decisions performed by applying the application comparison, and a redefinition module for redefining the application comparison based on the generated penalty and the comparison of the correct underwriting decisions and the underwriting decisions performed by applying the application comparison.

By way of another embodiment of the present invention, a system for optimizing a decision based on a plurality of predetermined rules for a decision system, the system comprises an input module for defining the plurality of rules for the decision system and a processor module for performing a plurality of decisions by applying the plurality of rules to a plurality of certified decisions, where each of the plurality of certified decisions comprises a decision for which a correct decision has already been made. A comparison module compares the correct decisions to the decisions performed by applying the plurality of rules and a penalty module generates at least one penalty based on the comparison of the comparison of the underwriting decisions performed by applying the plurality of rules and the correct underwriting decision. Further, a redefinition module redefines the plurality of rules based on the generated penalty and the comparison of the correct decisions and the underwriting decisions performed by applying the plurality of rules.

In another exemplary embodiment of the invention, a system for optimizing an insurance application underwriting decision for an insurance underwriting system, comprises means for defining a process for the insurance application underwriting decision for the insurance underwriting system. In addition, the system comprises means for performing a plurality of insurance application underwriting decisions by applying the process to a plurality of certified insurance applications, where each of the plurality of certified insurance applications comprises an insurance application for which a correct underwriting decision has already been made; and means for comparing the correct underwriting decisions to the underwriting decisions performed by applying the process.

Another exemplary embodiment of the invention provides a system for optimizing an insurance application underwriting decision based on a plurality of predetermined underwriting rules for an insurance underwriting system. The system comprises means for defining the plurality of underwriting rules for the insurance underwriting system. Further, the system comprises means for performing a plurality of insurance application underwriting decisions by applying the plurality of rules to a plurality of certified insurance applications, where each of the plurality of certified insurance applications comprises an insurance application for which a correct underwriting decision has already been made, and means for comparing the correct underwriting decisions and the underwriting decisions performed by applying the plurality of rules. The system additionally comprises means for generating at least one penalty based on the comparison of the correct underwriting decisions and the underwriting decisions performed by applying the plurality of rules, and means for redefining the plurality of underwriting rules based on the generated penalty and the comparison of the correct underwriting decisions and the underwriting decisions performed by applying the plurality of rules.

By way of another exemplary embodiment of the invention, a system for optimizing an insurance application underwriting decision based on an application comparison of an insurance application with at least one previously made insurance application underwriting decision for an insurance underwriting system is provided, where the system comprises means for defining the application comparison for the insurance underwriting system and means for performing a plurality of insurance application underwriting decisions by applying the application comparison to a plurality of certified insurance applications, where each of the plurality of certified insurance applications comprises an insurance application for which a correct underwriting decision has already been made. The system further comprises means for comparing the correct underwriting decisions and the underwriting decisions performed by applying the application comparison, means for generating at least one penalty based on the comparison of the correct underwriting decisions and the underwriting decisions performed by applying the application comparison, and means for redefining the application comparison based on the generated penalty and the comparison of the correct underwriting decisions and the underwriting decisions performed by applying the application comparison.

According to a further exemplary embodiment of the invention, a system for optimizing a decision based on a plurality of predetermined rules for a decision system comprises means for defining the plurality of rules for the decision system and means for performing a plurality of decisions by applying the plurality of rules to a plurality of certified decisions, where each of the plurality of certified decisions comprises a decision for which a correct decision has already been made. The system also comprises means for comparing the correct decisions to the decisions performed by applying the plurality of rules, means for generating at least one penalty based on the comparison of the underwriting decisions performed by applying the plurality of rules and the correct underwriting decision, and means for redefining the plurality of rules based on the generated penalty and the comparison of the correct decisions and the underwriting decisions performed by applying the plurality of rules.

BRIEF DESCRIPTION OF THE FIGURES

FIG. 10 is a chart illustrating the distribution of similarity measures for a set of retrieved cases, according to an embodiment of the invention.

FIG. 11 is a table illustrating a linear aggregation of rate classes, according to an embodiment of the invention.

FIG. 15 illustrates a distribution of classification distances for each bin containing a range of retrieved cases, according to an embodiment of the invention.

FIG. 16 illustrates a distribution of normalized percentage of classification distances for each bin containing a range of retrieved cases, according to an embodiment of the invention.

FIG. 17 illustrates a distribution of correct classification for each bin containing a range of retrieved cases, according to an embodiment of the invention.

FIG. 18 illustrates a distribution of a performance function for each bin containing a range of retrieved cases, according to an embodiment of the invention.

FIG. 19 illustrates a distribution of a performance function for each bin containing a range of retrieved cases, after removing negative numbers and normalizing the values between 0 and 1, according to an embodiment of the invention.

FIG. 21 illustrates a computation of coverage and accuracy according to an embodiment of the invention.

DETAILED DESCRIPTION OF THE INVENTION

Figure 1:
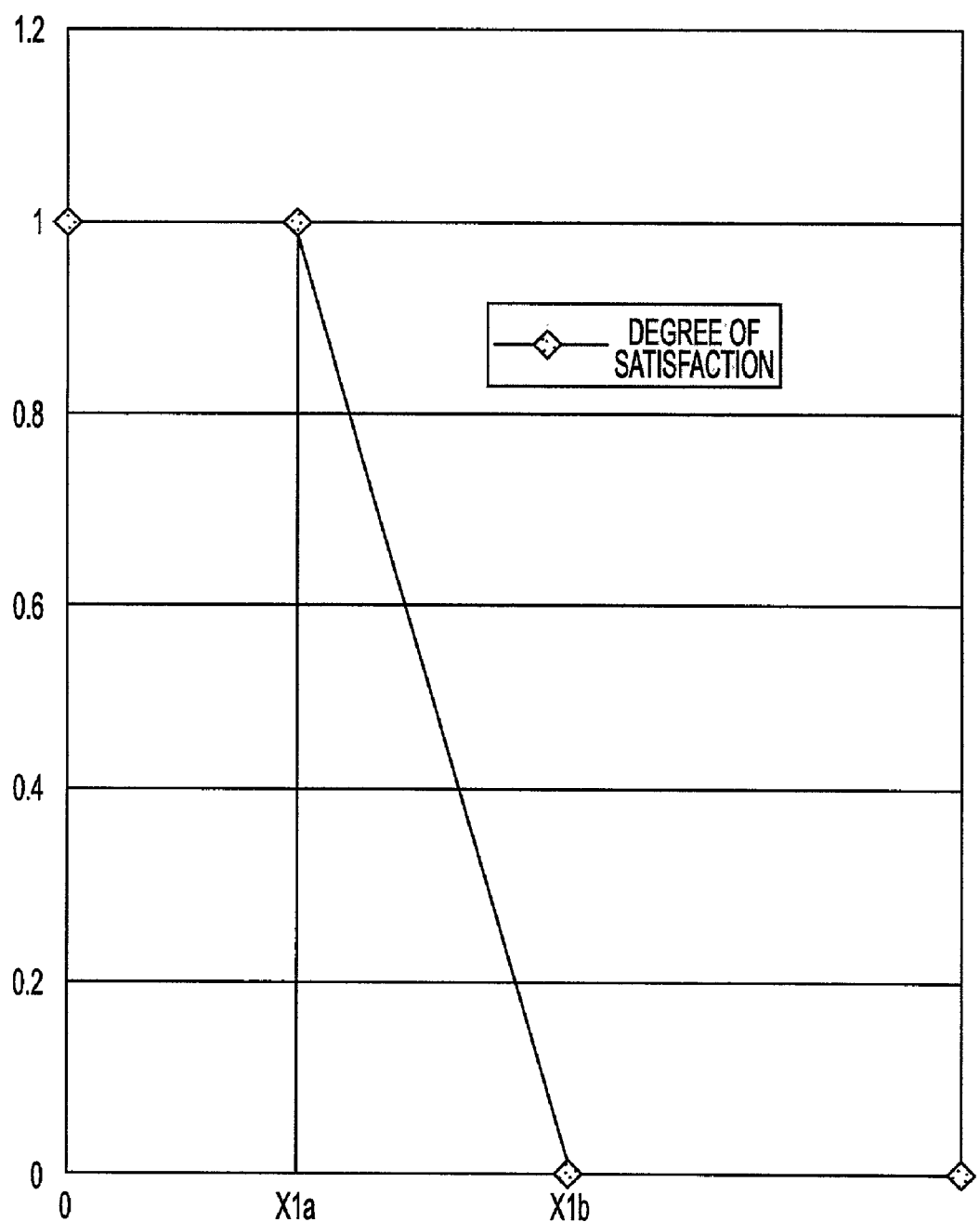
FIG. 1 is a graph illustrating a fuzzy (or soft) constraint, a function defining for each value of the abscissa the degree of satisfaction for a fuzzy rule, according to an embodiment of the invention.

Reference will now be made in detail to the present preferred embodiments of the invention, examples of which are illustrated in the accompanying drawings in which like reference characters refer to corresponding elements.

Rules Based Reasoning

As stated above, a process and system is provided for insurance underwriting which is able to incorporate all of the rules in the underwriting standards of a company, while being robust, accurate, and reliable. According to an embodiment of the invention, the process and system provided may be suitable for automation. Such a process and system may be flexible enough to adjust the underwriting standards when appropriate. As mentioned above, each individual underwriter may have his/her own set of interpretations of underwriting standards about when one or more adjustments should occur. According to an embodiment of the present invention, rules may be incorporated while still allowing for adjustment using a fuzzy logic-based system. A fuzzy logic-based system may be described as a formal system of logic in which the traditional binary truth-values "true" and "false" are replaced by real numbers on a scale from 0 to 1. These numbers are absolute values that represent intermediate truth-values for answers to questions that do not have simple true or false, or yes or no answers. In standard binary logic, a given rule is either satisfied (with a degree of satisfaction of 1), or not (with a degree of satisfaction of 0), creating a sharp boundary between the two possible degrees of satisfaction. With fuzzy logic, a given rule may be assigned a "partial degree of satisfaction", a number between 1 and 0, in some boundary region between a "definite yes", and a "definite no" for the satisfaction of a given rule. Each rule will be composed by a conjunction of conditions. Each condition will be represented by a fuzzy set $A(x)$, which can be interpreted as a degree of preference induced by a value x for satisfying a condition A. An inference engine determines a degree of satisfaction of each condition and an overall degree of satisfaction of a given rule.

For the purposes of illustration, imagine that a hypothetical life insurance company has a plurality of risk categories, which are identified as "cat1", "cat2", "cat3", and "cat4." In this example, a rating of cat1 is a best or low risk, while cat4 is considered a worst or high risk. An applicant for an insurance policy would be rejected if he/she fails to be placed in any category. An example of a type of rule laid out in a set of underwriting guidelines could be, "The applicant may not be in cat1 if his/her cholesterol value is higher than X1." Similarly, a cholesterol value of X2 could be a cutoff for cat2, and so on. However, it is possible that a cholesterol reading of one point over X1 may not in practice disqualify the applicant from the cat1 rating, if all of the other rules are satisfied for cat1. It may be that readings of one point over X1 are still allowable, and so on. To define a fuzzy rule, two parameters, $X1a$ and $X1b$ may be needed. When the applicant's cholesterol is below $X1a$, a fuzzy rule may be fully satisfied (e.g., a degree of satisfaction of 1). By way of present example, X1 from the above may be used as $X1a$. A parameter $X1b$ may be a cutoff above which the fuzzy rule is fully unsatisfied (e.g., a degree of satisfaction of 0). For example, it may be determined from experienced underwriters of the insurance company that under no circumstances can the applicant get the cat1 rating if his/her cholesterol is above 190 (X1) by more than four points. In that situation, the fuzzy rule may use $X1a=X1$, that is 190, and $X1b=X1a+4$, that is 194. Other settings may be used. $X1a$ and $X1b$ are parameters of the model. To obtain the partial degree of satisfaction when the cholesterol value falls within the range $[X1a, X1b]$, a continuous switching function may be used, which interpolates between the values 1 and 0. The simplest such function is a straight line, as disclosed in FIG. 1, but other forms of interpolation may also be used.

Turning to cat2, cat3, and cat4, there may be a different cholesterol rule for each category, which states that the applicant may not be placed in that category if his/her cholesterol is higher than X2, X3, or X4, respectively. The same procedures may be used, turning each rule into a fuzzy logic rule by assigning high and low cutoff values (e.g., X2$a$, X2$b$; X3$a$, X3$b$; X4$a$, X4$b$). Thus, by way of continuing the example, cat2 may be associated with a fuzzy rule that uses X2$a$=X2 and X2$b$=X2+4, where X2=195 (for cat2). In addition X3$a$=X3 and X3$b$=X3+4, where X3=200 (for cat3), and X4$a$=X4 and X4$b$=X4, where X4=205 (for cat4). Other parameters also may be used. Similarly, one would proceed through each rule in the underwriting guidelines, allowing for fuzzy partial degrees of satisfaction. In the present invention, each piece of data may be judged many times on the basis of each rule.

Once each fuzzy rule in the rule set has been applied, a decision is made to which category the applicant belongs. For each risk category, there may be a subset of rules that apply to that category. In order to judge whether the applicant is eligible for the given category, some number of aggregation criteria may be applied. To be concrete, using the above hypothetical case, take the subset of all rules that apply to cat1. There will be a fuzzy degree of satisfaction for every rule, where the set of degrees of satisfaction is called {DS-cat1}. According to an embodiment of the invention, if any of the degrees of satisfaction are zero, then the applicant may be ruled out of cat1. Thus, one of the aggregation criteria may be, "reject from cat1 if MIN({DS-cat1})<=A1," where A1 is a chosen constant, and the notation MIN( . . . ) denotes selection of the smallest value out of the set. One choice for A1 may be 0.5, but other choices may be used. By way of another example, the choice, A1=0.7 may also be used. Again, the constant A1 may be considered as a parameter of the model, which may be determined.

As another aggregation rule, by way of example, if very many of the rules have partial degrees of satisfaction of 0.9, then too much adjusting may be occurring, and the applicant may be ruled out of cat1, even though the aggregation rule, MIN({DS-cat1})<=A1, may not be satisfied. The missing score (MS) is determined from the degree of satisfaction (DS) by MS=1-DS. If a given fuzzy rule has DS=0.9, then it would have a missing score of 0.1. The aggregation criterion for this case might take the form, "reject from cat1 if SUM({MS-cat1})>=A2," where A2 is a different chosen constant, the notation, SUM( . . . ) denotes summation of all the elements of the set, and {MS-cat1} is the set of "missing scores" for each rule. The aggregation criteria above may use the sum of all of the missing scores for the cat1 rules as a measure to determine when too much adjusting has been done, comparing that with the constant A2. The measure defined above (SUM{MS-cat1}) may be interpreted as a measure proportional to the difference between the degree of complete satisfaction of all rules and the average degree of satisfaction of each rule (DS-cat1). It is understood in this invention that there may be any number of different kinds of aggregation criteria, of which the above two are only specific examples.

In a further step, the results of applying the aggregation criteria to the set of rules relating to each category may be compared. A result according to one example may be that the applicant is ruled out of cat1 and cat2, but not from cat3 or cat4. In that case, assuming that the insurance company's policy was to place applicants in the best possible risk category, the final decision would be to place the applicant in cat3. Other results may also be obtained.

As stated above, this fuzzy logic system may have many parameters that may be freely chosen. It should be noted that the fuzzy logic system may extend and therefore subsume a conventional (Boolean) logic system. By setting the fuzzy logic system parameters to have only crisp thresholds (in which the core value is equal to the support) the Boolean rules may be represented as a case of fuzzy rules. Those parameters may be fit to reproduce a given set of decisions, or set by management in order to achieve certain results. By way of one example, a large set of cases may be provided by the insurance company as a standard to be reproduced as closely as possible. Preferably in such an example, there may be many cases, thereby minimizing the error between the fuzzy rules model and the supplied cases. Optimization techniques such as logistic regression, genetic algorithms, Monte Carlo, etc., also may be used to find an optimal set of parameters. By way of another example, some of the fuzzy rules may be determined directly by the management of the insurance company. This may be done through knowledge engineering sessions with experienced underwriters, by actuaries acting on statistical information related to the risk being insured or by other manners. In fact, when considering maintenance of the system, initial parameters may be chosen using optimization versus a set of cases, while at a future time, as actuarial knowledge changes, these facts may be used to directly adjust the parameters of the fuzzy rules. New fuzzy rules may be added, or aggregation rules may change. The fuzzy logic system can be kept current, allowing the insurance company to implement changes quickly and with zero variability, thereby providing a process and system that is flexible.

Figure 2:
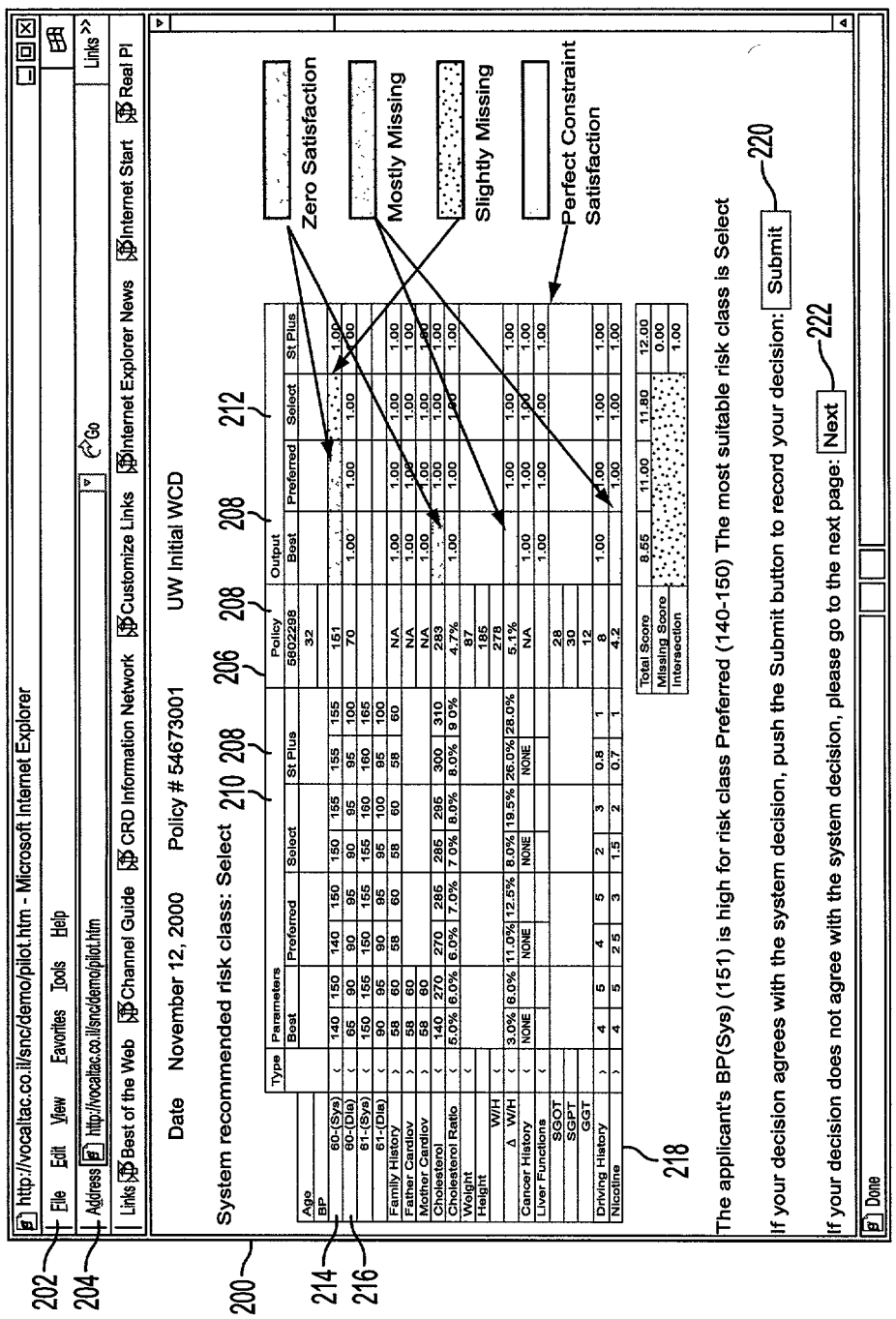
FIG. 2 is a graph illustrating the measurements based on the degree of satisfaction for a collection of fuzzy rules, according to an embodiment of the invention.

According to one embodiment of the invention, the fuzzy logic parameters may be entered into a spreadsheet to evaluate the fuzzy rules for one case at a time. This may be essentially equivalent to implementation in a manual processing type environment. FIG. 2 is a graphical representation illustrating a plurality of measurements based on a degree of satisfaction for a rule. A graphical user interface (GUI) 200 displays the degree of satisfaction for one or more rules. GUI 200 includes a standard toolbar 202, which may enable a user to manipulate the information in known manners (e.g., printing, cutting, copying, pasting, etc.). According to an embodiment of the invention, GUI may be presented over a network using a browser application such as Internet Explorer®, Netscape Navigator®, etc. An address bar 204 may enable the user to indicate what portion is displayed. A chart 206 displays various insurance decision components and how each insurance decision component satisfies its associated rule. A plurality of columns 208 illustrates a plurality of categories for each decision component, as well as a plurality of parameters for each decision component. A column 210 identifies the actual parameters of the potential applicant for insurance and a plurality of columns 212 illustrate a degree of satisfaction of each rule. By way of example, a row 214 is labeled BP (Sys), corresponding to a systolic blood pressure rule. To receive the Best or Preferred category classification, the applicant must have a systolic blood pressure score (score) between 140 and 150. To receive a Select category classification, the applicant must have a score between 150 and 155, while a score of 155 or more receives a "Standard Plus" or St. Plus category classification. In this example, the applicant has a score of 151. The columns 212 show zero satisfaction of the rule for the Best and Preferred category classifications. Additionally, FIG. 2 shows that the applicant slightly missed satisfaction for the Select category, and Perfect Constraint Satisfaction for the St. Plus Category.

In another example, a row 216 is labeled BP (Dia.), corresponding to a diastolic blood pressure rule. To receive a Best category classification, the applicant must have a diastolic blood pressure score (score) between 85 and 90, between 90 and 95 for a Preferred category classification, between 90 and 95 for the Select category classification, and between 95 and 100 for the St. Plus category classification. Here, the applicant has a score of 70, resulting in Perfect Constraint Satisfaction in all of the columns 212.

By way of a further example, a row 218 is labeled Nicotine, where a score between 4 and 5 receives the Best category classification, a score between 2.5 and 3 receives the Preferred category classification, a score between 1.5 and 2 receives the Select category classification, and a score between 0.7 and 1 receives the St. Plus category classification. In this example, the applicant has a score of 4.2. Thus, a score of "Mostly Missing" is indicated under the Best category of a column 212, while a score of Perfect Constraint Satisfaction is indicated for all others.

GUI 200 presents a submit button 220 to enable the user to accept a decision and submit it to a database. Alternatively, the user may decide not to accept the decision. The user may activate a next button 222 to record his/her decision. Other methods for display may also be used.

Figure 3:
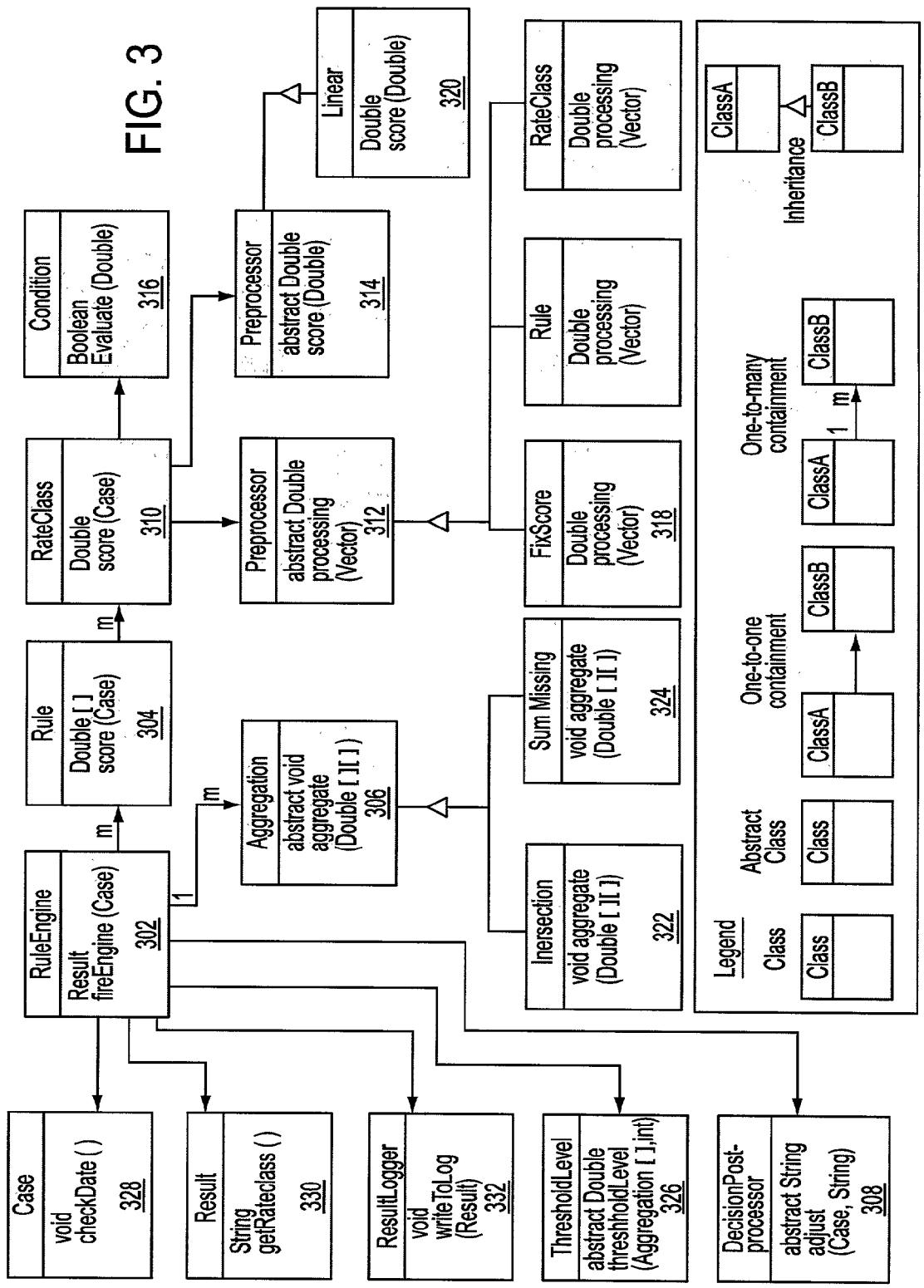
FIG. 3 is a schematic representation of an object-oriented system to determine the degree of satisfaction for a collection of fuzzy rules, according to an embodiment of the invention.

According to another embodiment of the invention, the rules may be encoded into a Java-based computer code, which can query a database to obtain the case parameters, and write its decision in the database as well. The object model of the java implementation is illustrated in FIG. 3. This java implementation may be suitable for batch processing, or for use in a fully automated underwriting environment. According to an embodiment of the invention, a rule engine (class RuleEngine) 302 may be the control of the system. The decision components of rule engine 302 may be composed of several rules (class Rule) 304, several aggregations (class Aggregation) 306 and zero or one decision post-processors (class DecisionPostProcessor) 308. A Rule object 304 may represent the fuzzy logic for one or a group of variables. Each rule is further composed of a number of rateclasses (class Rateclass) 310. A Rateclass object 310 defines the rules for a specific rateclass. According to an embodiment of the invention, a Rateclass object 310 may comprise two parts. The first is pre-processing (class Preprocessor) 312, which may process multiple inputs to form one output. The second is post-processing (class Postprocessor) 314, which may take the result of the pre-processing, feed it to a fuzzy function and get a fuzzy score. Some of the rules may be conditional, such as the variable blood pressure systolic, where the thresholds vary depending on the age of the applicant. Class Condition 316 may represent such a condition, if there is any. Classes FixedScore 318, Minimal and Maximal may define some special preprocessing functions, and class Linear 320 may define the general linear fuzzy function as illustrated in FIG. 1.

According to an embodiment of the invention, there may be two phases at runtime for rule engine 302. The first phase may be initialization. In the process, the rule definition file in XML format configures the rule engine. All the rule engine parameters are defined in the process, for example, number of rules, the fuzzy thresholds, pre and post processing and aggregation operation (including class Intersection 322 and Sum Missing 324) and class ThresholdLevel 326. The second phase may be scoring. After correct initialization, the fireEngine method in rule engine 302 may take an input parameter—an instance of class Case 328 containing all the required variable values, and output an instance of class Result 330, which encapsulates all the decision results, including rateclass placement, the fuzzy scores for each variable and each rateclass, and the aggregation scores. Class ResultLogger 332 may log the output. Other object models for a java implementation may also be used.

Figure 4:
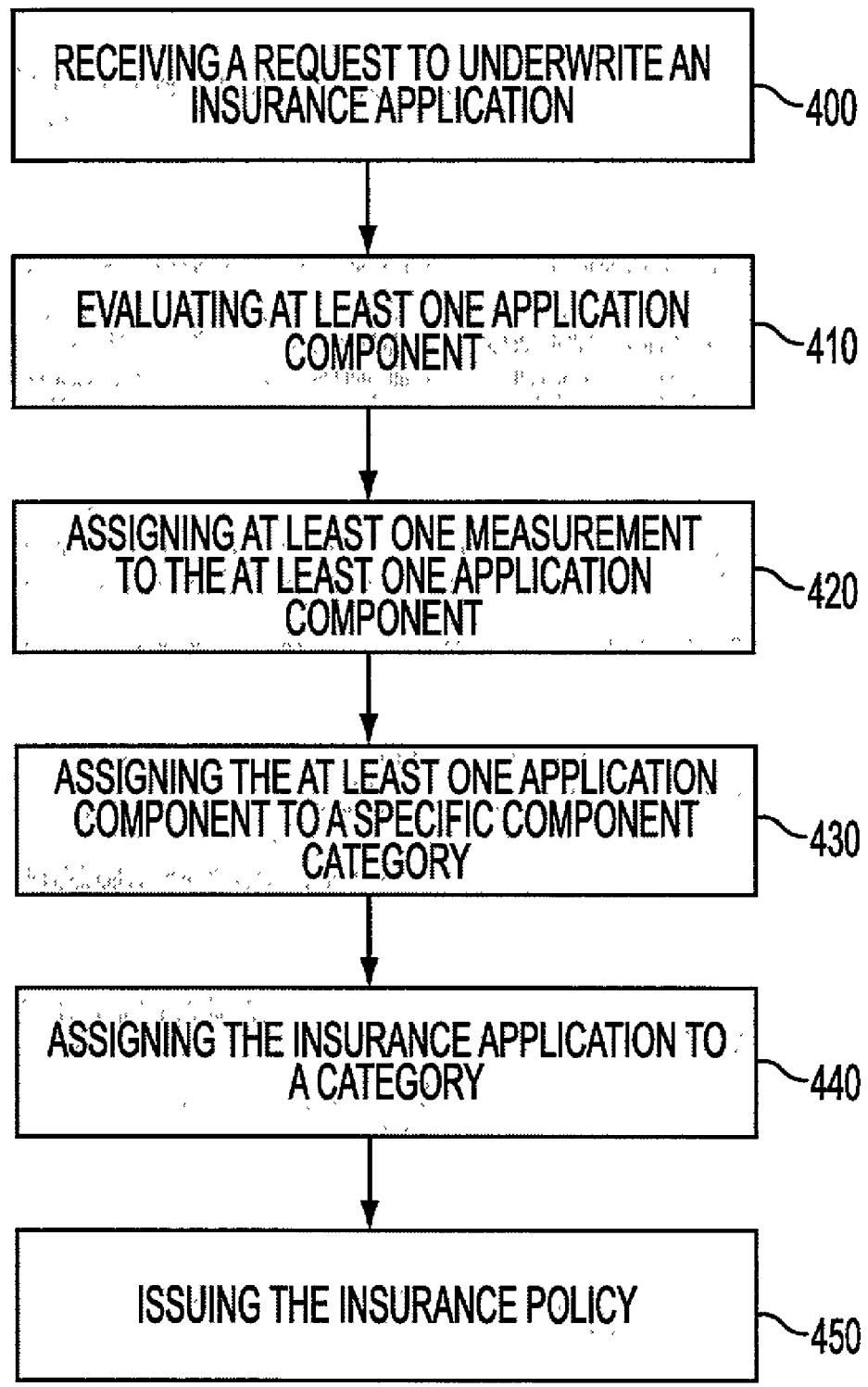
FIG. 4 is a flowchart illustrating steps performed in a process for underwriting an insurance application using fuzzy logic according to an embodiment of the invention.

FIG. 4 is a flowchart illustrating the steps performed in a process for underwriting an insurance application using fuzzy logic rules according to an embodiment of the invention. At step 400, a request to underwrite an insurance application may be received. The request to underwrite may come directly from a consumer (e.g., the person being insured), an insurance agent or another person. The request to underwrite comprises information about one or more components of the insurance application. According to an embodiment of the invention, the components may include the various characteristics associated with the individual to be insured, such as a cholesterol level, a blood pressure level, a pulse, and other characteristics.

At step 410, at least one decision component is evaluated. As described above, evaluating a decision component may comprise evaluating a decision component using a fuzzy logic rule. To perform the evaluation, a rule may be defined and assigned to the decision component. While each rule is generally only assigned one decision component, it is understood that more than one decision component may be assigned to each rule. Further, parameters for each rule may be defined, as also described above.

At step 420, at least one measurement is assigned to the at least one decision component. As described above with regard to the application of a fuzzy logic rule, a measurement may be assigned to the decision component from a sliding scale, such as between zero (0) and one (1). Other types of measurements may also be assigned.

At step 430, each decision component is assigned a specific component category based on the assigned measurement. As described above, a number of specific component categories are defined. Based on the assigned measurements, each decision component is assigned to one or more specific component categories. By way of the examples above, the specific component categories may be defined as cat1, cat2, cat3, and cat4. Cat1 may only be assigned decision components at a certain level or higher. Similarly, cat2 may only be assigned decision components at a second level or higher and so on. Other methods for assigning a specific component category may also be used.

At step 440, the insurance application is assigned to a category. According to an embodiment of the invention, the categories to which the insurance application is assigned are the same as the categories to which the insurance decision components are assigned. As described above, the insurance application may be assigned to a category based upon how the decision components were assigned. Thus, by way of example, an insurance application may be assigned to cat1 only if two or fewer decision components are assigned to cat2 and all other decision components are assigned to cat1. Other methods for assigning an insurance application to a category may also be used.

At step 450, an insurance policy is issued. Based on the category to which it is assigned, certain amounts are paid to maintain the insurance policy in a manner that is well known in the industry. It is understood that based on a category, an insurance policy may not be issued. The customers may decide the premiums are too high. Alternatively, the insurance company may determine that the risk is too great, and decide not to issue the insurance policy.

Case Based Reasoning

A rule-based reasoning (RBR) system may provide for an underwriting process by following a generative approach, typically a rule-chaining approach, in which a deductive path is created from the evidence (facts) to the decisions (goals). A case-based reasoning (CBR) system, on the other hand, may follow an analogical approach rather than a deductive approach. In such a system, a reasoner may determine the correct rate class suitable for underwriting by noticing a similarity of an application for insurance with one or more previously underwritten insurance applications and by adapting known solutions of such previously underwritten insurance applications instead of developing a solution from scratch. A plurality of underwriting descriptions and their solutions are stored in a CBR Case Base and are the basis for measurement of the CBR performance. According to an embodiment of the invention, a CBR system may be only as good as the cases within its Case Base (also referred to as "CB") and its ability to retrieve the most relevant cases in response to a new situation.

A case-based reasoning system can provide an alternative to a rules-based expert system, and may be especially appropriate when a number of rules needed to capture an expert's knowledge is unmanageable, when a domain theory is too weak or incomplete, or when such domain theory is too dynamic. The CBR system has been successful in areas where individual cases or precedents govern the decision-making processes.

In many aspects, a case-based reasoning system and process is a problem solving method different from other artificial intelligence approaches. In particular, instead of using only general domain dependent heuristic knowledge, such as in the case of an expert system, specific knowledge of concrete, previously experienced, problem situations may be used with CBR. Another important characteristic may be that CBR implies incremental learning, as a new experience is memorized and available for future problem solving each time a problem is solved. CBR may involve solving new problems by identifying and adapting solutions to similar problems stored in a library of past experiences.

Figure 5:
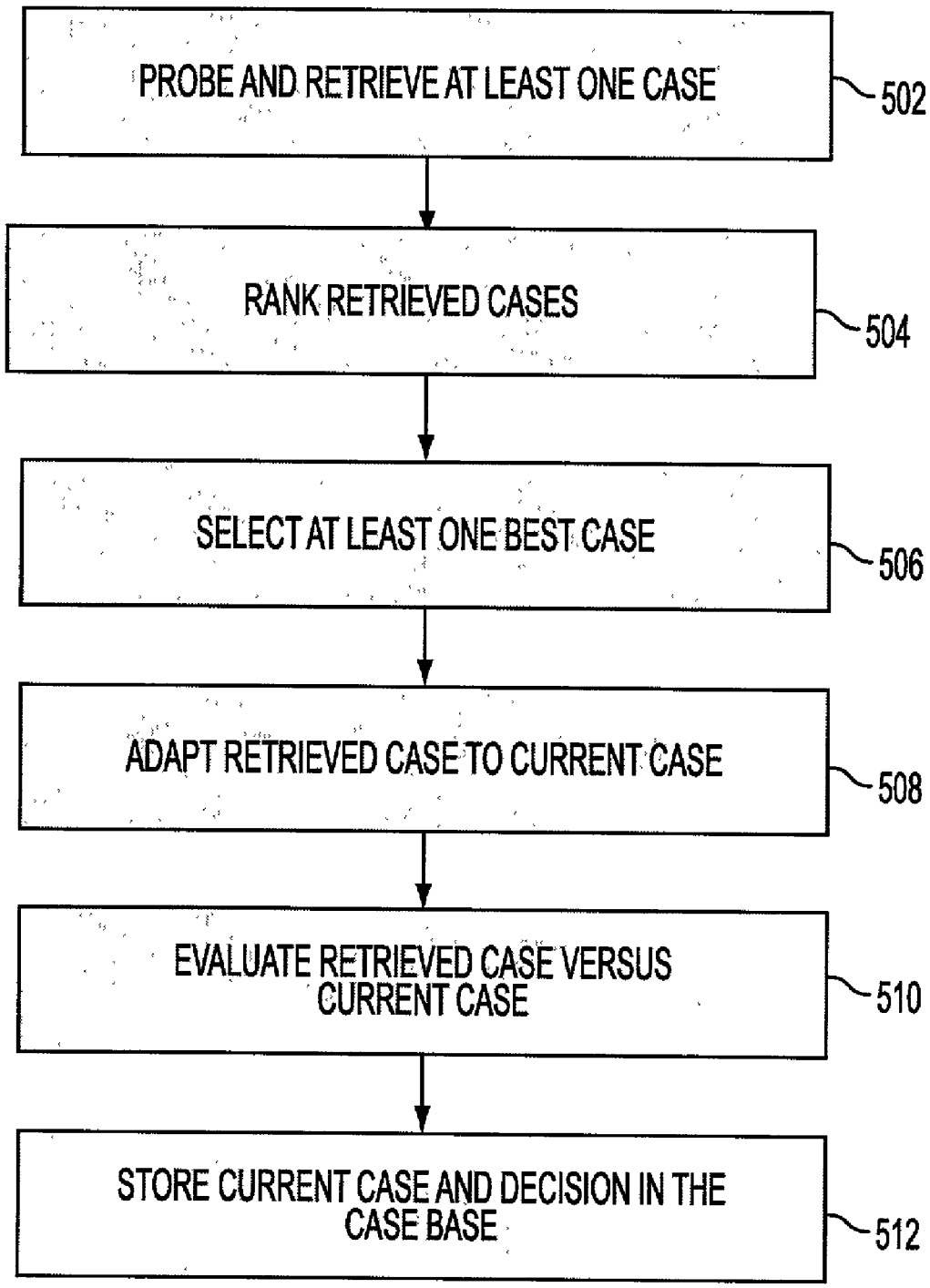
FIG. 5 is a flowchart illustrating steps for an inference cycle according to an embodiment of the invention.

According to an embodiment of the invention, an inference cycle of the CBR process may comprise a plurality of steps, as illustrated in the flow chart of FIG. 5. At step 502, probing and retrieving one or more relevant cases from a case library is performed. Ranking the retrieved relevant cases, based on a similarity measure occurs at step 504. At step 506, one or more best cases are selected. At step 508, one or more retrieved relevant cases are adapted to a current case. The retrieved, relevant cases are evaluated versus the current case, based on a confidence factor at step 510. The newly solved case is stored in the case memory at step 512.

These steps will be illustrated below within the context of insurance underwriting. However, one of ordinary skill in the art will recognize that these steps may be used in other contexts as well. For purposes of this example only, assume that an applicant provides his/her vital sign information (e.g., an age, a weight, a height, a systolic blood pressure level and a diastolic blood pressure level, a cholesterol level and a ratio, etc.) as a vector equal to:

$X=[x_1, x_2 \ldots, x_n]$.

Furthermore, in this example, assume that two of the values corresponding to the cholesterol level, and a weight-to-height ratio, are above normal levels, while the others fall within normal ranges. The first two components of vector X correspond to the cholesterol level ($x_1$) and the weight-to-height ratio ($x_2$). For purposes of this example, the applicant has an abnormally high cholesterol ratio (8.5%) and is over-weight (weight-to-height ratio=3.8 lb/inch). Furthermore, the applicant has one medical condition/history, for instance a history of hypertension. This condition may require the applicant to provide additional detailed information related to the history of hypertension, e.g., a cardiomegaly, a chest pain, a blood pressure mean and a trend over the past three months (where mean is the average of the blood pressure readings over a particular time period and trend corresponds to the slope of the reading such as upward, or downward, etc.) The detailed information may be contained in a vector $Y=[y_1, y_2, \ldots, y_p]$, where the value of p will vary according to the applicant's medical condition.

The first step in the CBR methodology may be to represent a new case (probe) as a query in a structured query language (SQL), which may be formulated against a database of previously placed applicants (cases). According to an embodiment of the invention, the SQL query may be of the form:

$Q: [f_1(x), f_2(x), \ldots, f_n(x)]$ AND [Condition=label]

where $[f_1(x), f_2(x), \ldots, f_n(x)]$, will be a vector of n fuzzy preference functions, one of each of the elements of vector X, and a label will be an index representing the applicant's current medical condition. For this example, the CBR system may retrieve all previous applicants with a history of hypertension, whose vital signs were normal, except for a cholesterol ratio and a weight-to-height ratio. In other words, the SQL query may be for all cases matching the same condition and similar vital information as the applicant. An example of such a SQL query may be:

$Q1=$[Support(Around (8.5%;x)), Support (Around (3.8;x)), Support (Normal(i)), . . . , Support (Normal(n))] AND [Condition=Hypertension]

Figure 6:
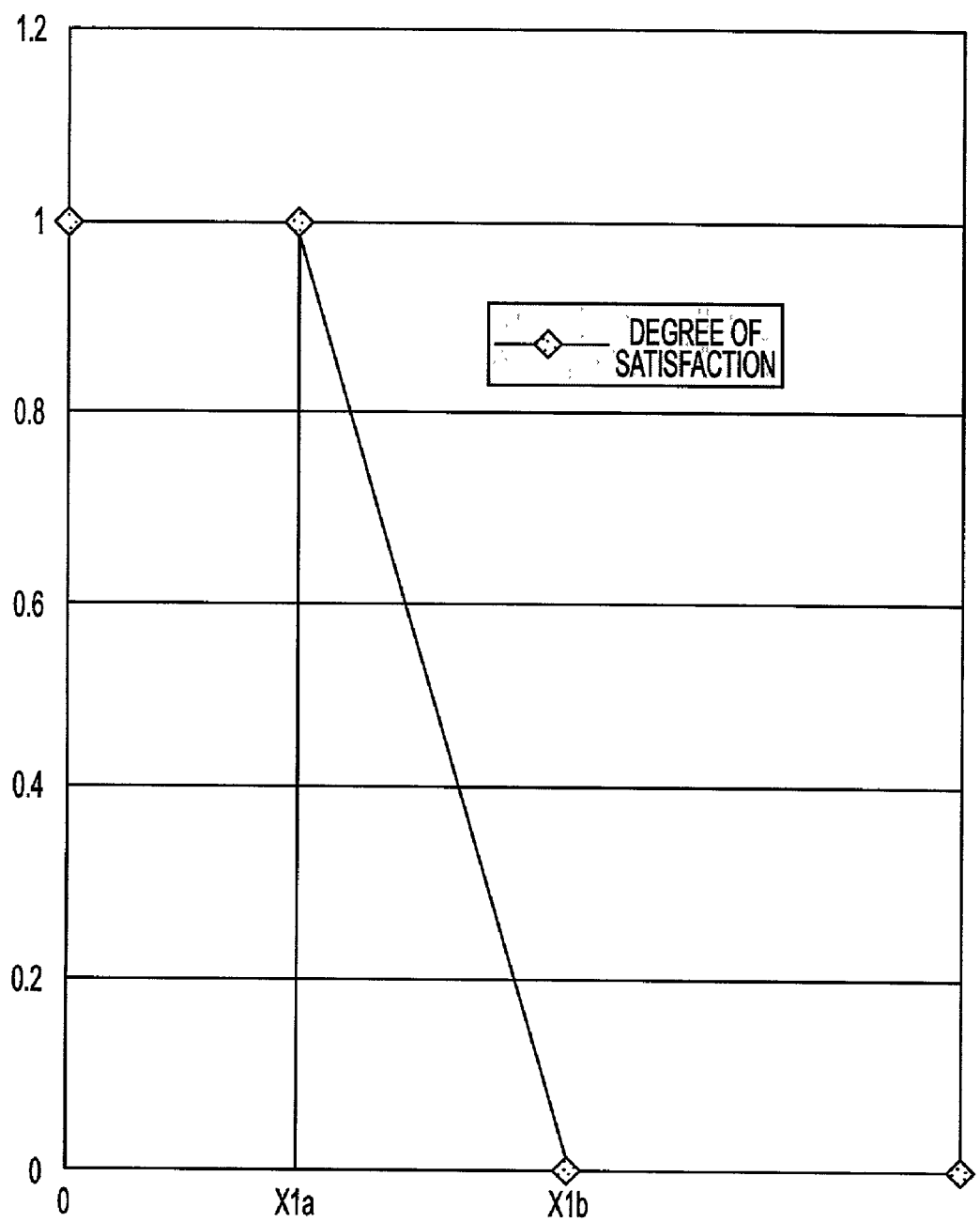
FIG. 6 is a graph illustrating a fuzzy (or soft) constraint, a function defining for each value of the abscissa the degree of satisfaction for a rule comparing similar cases, according to an embodiment of the invention.

The meaning of Normal(i) may be determined by a fuzzy logic set representing a soft threshold for a variable, x(i), as it is used in the stricter class rate, (e.g., Preferred Best in the case of Life Insurance.) FIG. 6 illustrates the case of Normal (j), where x(j) corresponds to the cholesterol ratio. For example, it may be determined from the most experienced underwriters of the insurance company that under no circumstances can the applicant get the best class rate if his/her cholesterol ratio is above X1 by more than five points. In that example, one may use X1b−X1a=5. The specific values for X1a and X1b may be parameters of the model, and will be explained below in greater detail. To obtain the partial degree of satisfaction when the cholesterol ratio value falls within the range [X1a, X1b], a continuous switching function may be used which interpolates between the values 1 and 0. The simplest such function is a straight line, but other functions may also be used.

In a linear membership function as shown in FIG. 6, the values X1a and X1b are the low and high cutoffs, respectively. A strict yes/no rule may be recovered in the limit that X1a=X1b. Thus, many methods that mix fuzzy and strict rules in any proportion may be covered as a subset of this method.

Figure 7:
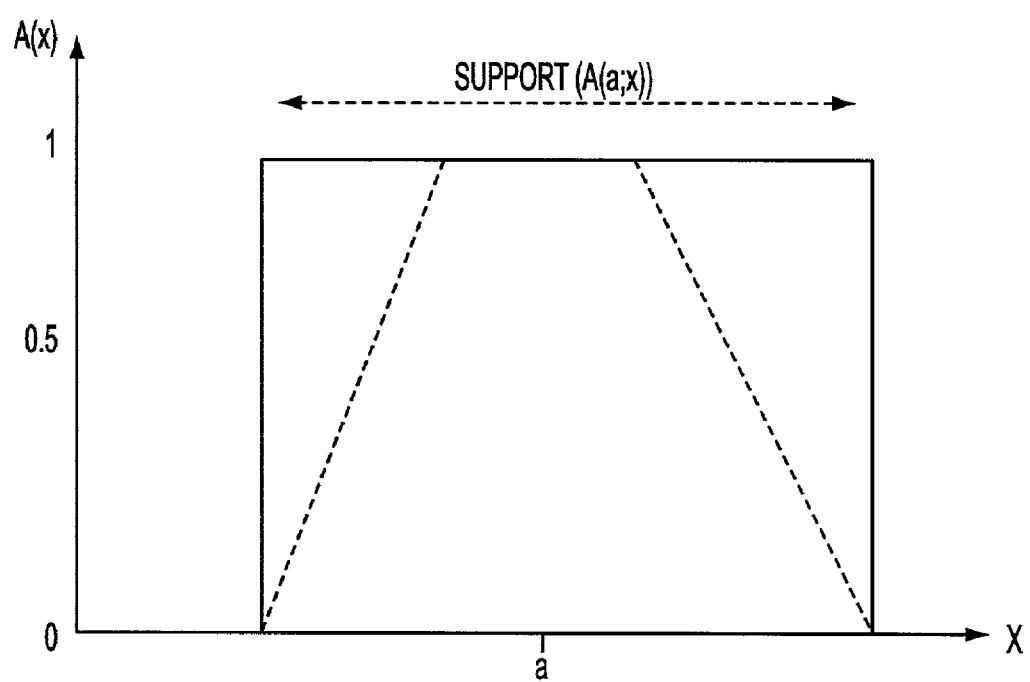
FIG. 7 is a graph illustrating the core of a fuzzy (or soft) constraint, according to an embodiment of the invention.

Around (a; x) may be determined by a fuzzy relationship, whose membership function can be interpreted as the degree to which the value x meets the property of "being around a." If Around (a; x)=1, then the value of x may be close to a well within a desired tolerance. The support of the fuzzy relationship Around (a; x) may be defined as the interval of values of x for which Around (a; x)>0, as illustrated in FIG. 7. If Around (a; x)=0 then the value of x is too far from a, beyond any acceptable tolerance.

Figure 8:
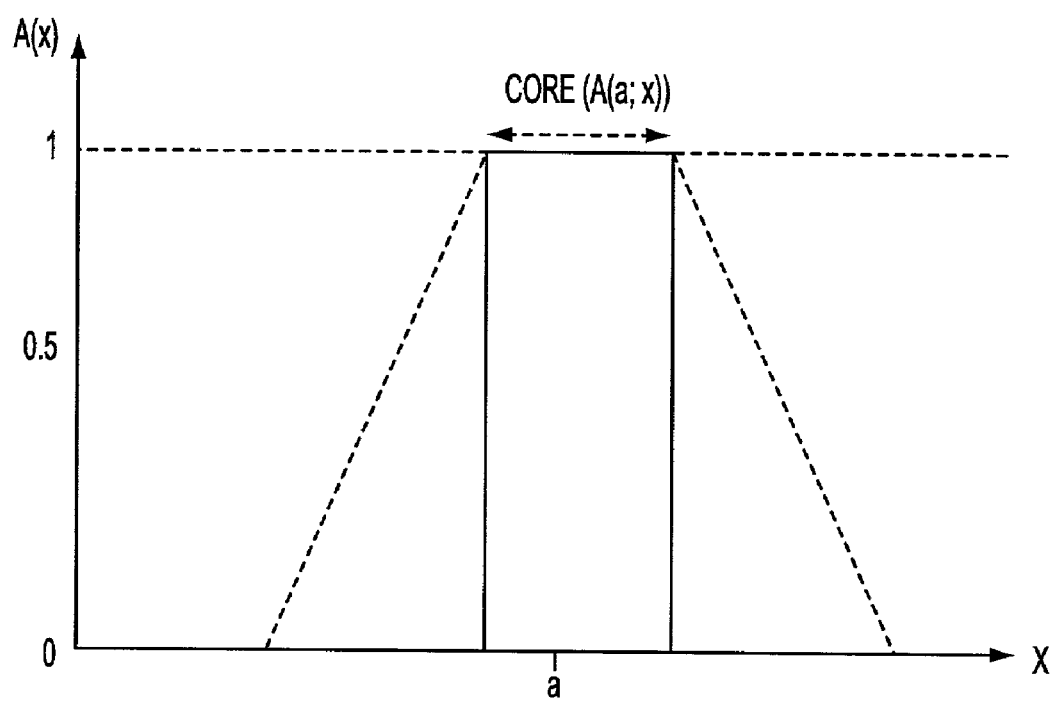
FIG. 8 is a graph illustrating the support of a fuzzy (or soft) constraint, according to an embodiment of the invention.

The core of the fuzzy relationship Around (a; x) may be defined as the interval of values of x for which Around (a; x)=1, as illustrated in FIG. 8. Any value belonging to the core fully satisfies the property and, in terms of a preference, it is indistinguishable from any other value in the core.

A trapezoidal membership distribution representing the relationship may have a natural preference interpretation. The support of the distribution may represent a range of tolerable values and correspond to an interval-value used in an initial SQL retrieval query. The core may represent the most desirable range of values and may establish a top preference. By definition, a feature value falling inside the core will receive a preference value of 1. As the feature value moves away from a most desirable range, its associated preference value will decrease from 1 to 0. By retrieving the cases having cholesterol ratios falling in the support of Around (8.5%; x) and having weight-to-height ratios falling in the support of Around (3.8; x) all possible relevant cases may be retrieved.

In executing an SQL query Q1 of the above example against the CBR database, N cases may be retrieved. By construction, all N cases must have all of their vital values inside the support of the corresponding element x(i) defined by Q1. Furthermore, all cases must be related to the same medical condition, (e.g., hypertension).

At this point, considering the outputs of each of the N retrieved cases may provide a first preliminary decision. According to an embodiment of the invention, a decision may be made only on the retrieved cases, i.e., only using the first n variables and the label used in the SQL query Q1. Each retrieved case may be referred to as a case $C_k$ (k between 1 and N), and an output classification of case $C_k$ as $O_k$, where $O_k$ is a variable having an attribute value indicating the rate class assigned to the applicant corresponding to case $C_k$. By way of example, $O_k$ may assume one out of T possible values, i.e., $O_k=L$, where $L \in \{R_1, R_2, \ldots, R_T\}$. For instance, in the case of Life insurance products, L={Preferred-Best, Preferred, Preferred-Nicotine, . . . , Standard, . . . , Table-32}. Other values may also be used.

Figure 9:
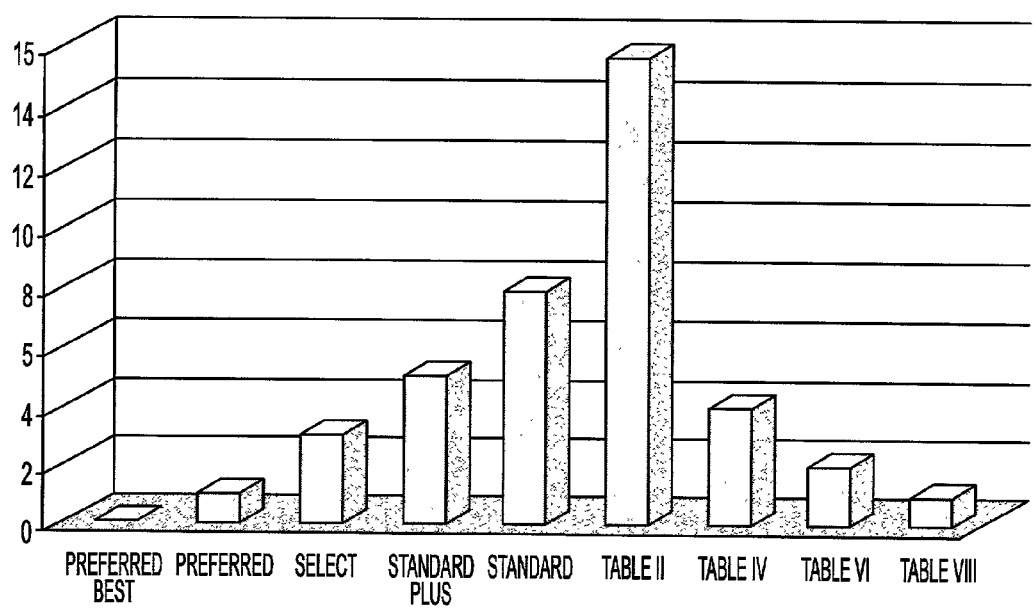
FIG. 9 is a graph illustrating the rate class histogram derived from a set of retrieved cases, according to an embodiment of the invention.

In this example, the SQL query Q1 retrieves 40 cases (N=40). FIG. 9 illustrates the histogram (distribution of the retrieved cases over the rate classes) of the results of the SQL query Q1. As seen in FIG. 9, a first preliminary decision indicates Table-II as being the most likely rate class for the new applicant represented by the SQL query Q1.

All N cases may have all their vital values inside the support of the corresponding element x(i) defined by the SQL query Q1 and they are all related to the same medical condition, (e.g., hypertension). Therefore, each case may also contain p additional elements corresponding to the variables specific to the medical condition. A case $C_k$ (k between 1 and N) may be represented as an r-dimensional vector, where r=n+p. The first n elements correspond to the n vital sign described by the vector X, namely $[x_{1,k}, x_{2,k}, \ldots, x_{n,k}]$. The remaining p elements may correspond to the specific features related to the condition hypertension, namely $[x_{(n+1),k}, x_{(n+2),k}, \ldots, x_{r,k}]$. The value of p may vary according to the value of the label, i.e., the medical condition.

A degree of matching between case $C_k$ and the SQL query Q1 may be determined. To this extent, the n-dimensional vector $M(C_k, Q1)$ may be defined as an evaluation of each of the functions $[f_1(x), f_2(x), \ldots, f_n(x)]$ from the SQL Query Q1 with the first n elements of $C_k$, namely $[x_{1,k}, x_{2,k}, \ldots, x_{n,k}]$:

$$M(C_k,Q1)=[f_1(x_{1,k}),f_2(x_{2,k}), \ldots, f_n(x_{n,k})]$$

At the end of this evaluation, each case will have a preference vector whose elements take values in the (0,1] interval (where the notation (0,1] indicates that this is an open interval at 0 (i.e., it does not include the value 0), and a closed interval at 1 (i.e., it includes the value 1)). These values may represent a partial degree of membership of the feature value in each case and the fuzzy relationships representing preference criteria in the SQL query Q1. Since this preference vector represents a partial order, the CBR system aggregates its elements to generate a ranking of the case, according to their overall preference.

A determination is made of an n-dimensional weight vector $W=[w_1, w_2, \ldots, w_n]$ in which the element $w_i$ takes a value in the interval [0,1] and determines the relative importance of feature i in $M(C_k, Q1)$, i.e., the relevance of $f_i(x_{i,k})$. According to an embodiment of the invention, this can be done via direct elicitation from an underwriter or using pair-wise comparisons, following Saaty's method. By way of example, if all features are equally important, all their corresponding weights may be equal to 1. Other methods may also be used. Once the weight vector has been determined, several aggregating functions are used to rank the cases, where the aggregating function will map an n-dimensional unitary hypercube into a one-dimensional unit interval, i.e.,: $[0,1]^n \rightarrow [0,1]$.

To consider compensation among the elements, a definition is made of the aggregating function $A[W,M(C_k, Q1)]$ as a weighted sum of its elements, i.e.:

$$A[W, M(C_k, Q1)] = \sum_{i=1}^{n} w_i f_i(x_{i,k})$$

Alternatively, a strict intersection aggregation without compensation may be obtained using a weighted minimum, i.e.:

$$A[W,M(C_k,Q1)]=\text{Minimum}_{1, \ldots, n}[\max(1-w_i),f(x_{i,k})]$$

Regardless of the aggregating function selected, it may be considered as a measure of similarity between the each retrieved case $C_k$ and the query Q1, and may be referred to as S(k,1). Using this measure, cases may be sorted according to an overall degree of preference, which may be interpreted as a measure of similarity between each retrieved case $C_k$ and the query Q1.

In the first preliminary decision, the output of case $C_k$ may be referred to as $O_k$, where $O_k$ is a variable whose attribute value indicates a rate class assigned to the applicant corresponding to a case $C_k$. Assume, for example, that $O_k$ can take one out of T possible values, i.e., $O_k=L$, where $L \in \{R_1, R_2, \ldots, R_T\}$. For instance, in the case of Life insurance products, L={Preferred-Best, Preferred, Preferred-Nicotine, . . . , Standard, . . . , Table-32}. However, not all cases are equally similar to our probe. FIG. 10 illustrates a distribution of the similarity measure S(k,1) over the T for the retrieved N cases (e.g., N=40 in the present example).

According to an embodiment of the invention, a minimum similarity value may be considered for a case. For instance, to only consider similar cases, a threshold may be established on the similarity value. By way of example, only cases with a similarity greater or equal to 0.5 may be considered. According to an embodiment of the invention, a determination may be made of a fuzzy cardinality of each of the rate classes, by adding up the similarity values in each class. Other distributions may also be evaluated.

A histogram may be drawn that aggregates the original retrieval frequency with the similarity of the retrieved cases, and may be referred to as a pseudo-histogram. This process may be similar to a N-Nearest Neighbor approach, where the N retrieved cases represent the N points in the neighborhood, and the value of S(k,1) represents the complement of the distance between the point K and the probe, i.e., the similarity between each case and a query. The rate class Ri, with the largest cumulative measure may be proposed as a solution. By way of example, Table-II is the solution indicated by either option.

A decision may be made on how many cases will be used to refine a solution. Having sorted the cases along the first n dimensions, the remaining p dimensions may be analyzed corresponding to the features related to the specific medical condition. Some of these medical conditions may have variables with binary or attribute values (e.g., chest pain (Y/N), malignant hypertension (N), Mild, Treated, etc.), while others ones may have continuous values (e.g., cardiomegaly (% of enlargement), systolic and diastolic blood pressure averaged and trend in past 3 months, 24 months, etc.).

An attribute-value and a binary-value may be used to select, among the N retrieved cases, the cases that have the same values. This may be the same as performing a second SQL query, thereby refining the first SQL query Q1. From the originally retrieved N cases, the cases with the correct binary or attribute values may be selected. This may be done for all of the attribute-values and the binary-valued variables, or for a subset of the most important variables. After this selection, the original set of cases will likely have been reduced. However, when a Case Base is not sufficiently large, a reduction in the number of variables used to perform this selection may be needed. Assuming that there are now L cases (where L<N), these cases may still be sorted according to a value of a similarity metric $S(k,1)$.

A third preliminary decision may be obtained by re-computing the distribution of the similarity measure $S(k,1)$ over the T values for the output $O_k$, and then proposing as a solution the class Ri with the largest cumulative measure using the same pseudo-histogram method described above.

A similarity measure over the numerical features related to the medical condition may be obtained by establishing a fuzzy relationship Around(a; x) similar to the one described above. This fuzzy relationship would establish a neighborhood of cases with similar condition intensities. By performing an evaluation and an aggregation similar to one described above, a similarity measure may be obtained by medical condition, and may be referred to as $I(k,1)$.

A final decision may involve creating a linear combination of both similarity measures:

$$F(k,1) = \alpha S(k,1) + (1-\alpha)I(k,1),$$

thereby providing the distribution of the final similarity measure $F(k,1)$ over the T values of $O_k$. According to an embodiment of the invention, the final decision or solution may be the class $R_i$ with the largest cumulative measure using the same pseudo-histogram method.

A reliability of the solution may be measured in several ways, and as a function of many internal parameters computed during this process. According to an embodiment of the invention, the number of retrieved (N) and refined (L) cases (e.g., area of the histogram) may be measured. Larger values of N+L may imply a higher reliability of the solution. According to another embodiment of the invention, the fuzzy cardinality of the retrieved and refined cases (i.e., area of the pseudo-histogram) may be measured. Larger values may imply a higher reliability of the solution. According to a further embodiment of the invention, the shape of the pseudo-histogram of the values of $O_k$, (i.e., spread of the histogram) may be measured, where a tighter distribution (smaller sigmas) would be more reliable than scattered ones. According to another embodiment of the invention, the mode of the pseudo-histogram of the values of $O_k$, (e.g., maximum value of the histogram) may be measured. Higher values of the mode may be more reliable than lower ones. A contribution of one or more of these measurements may be used to determine reliability. Other measurements may also be used.

Using a training set, a conditional probability of misclassification as a function of each of the above parameters may be determined, as well. Then, the (fuzzy) ranges of those parameters may be determined and a confidence factor may be computed.

If the solution does not pass a confidence threshold (e.g., because it does not have enough retrieved cases, has a scattered pseudo-histogram, etc.), then the CBR system may suggest a solution to the individual underwriter and delegate to him/her the final decision. Alternatively, if the confidence factor is above the confidence threshold, then the CBR system may validate the underwriter's decision. Regardless of the decision maker, once the decision is made, the new case and its corresponding solution are stored in the Case Base, becoming available for new queries.

According to an embodiment of the invention, clean cases (previously placed by rule base) may be used to tune the CBR parameters (e.g., membership functions, weights, and similarity metrics), thereby abating risk. Other methods for abating risk may also be used.

By defining and using three stages of preliminary decisions, the CBR system may display tests, thereby generating useful information for the underwriter while the Case Base is still under development. As more information (cases and variables describing each case) is stored in the Case Base, the CBR system may be able to use a more specific decision stage.

According to an embodiment of the invention, the first two preliminary decision stages may only require the same vital information used for clean applications and the symbolic (i.e., label) information of the medical condition. A third decision stage may make use of a subset of the variables describing the medical condition thereby refining the most similar cases. The subset of variables may be chosen by an expert underwriter as a function of their relevance to the insured risk (mortality, morbidity, etc.). This step will allow the CBR system to refine the set of N retrieved cases, and select the most similar L cases, on the basis of the most important binary and attribute variables describing the medical condition. The final two preliminary decision stages may only require the same vital information used for clean applications and the symbolic (i.e., label) information of the medical condition.

According to an embodiment of the invention, it may be important that at all times the value of N (for the first two decision stages) and the value of L (for the third decision stage) be large enough to ensure significance. The number of cases used may be one of the parameters used to compute the confidence factor described above.

In the first step of the example, the new case (probe) was represented as a SQL query, and it was assumed that only one medical condition was present. The complete SQL query Q may have been formulated as:

$$Q: [f_1(x), f_2(x), \ldots, f_n(x)] \text{ AND [Condition=label]}$$
$$\text{AND [Condition number 1]}$$

If the applicant has more than one medical condition, the applicant may be compared with other applicants having the same medical conditions. By way of another example extending the original example used, the applicant is assumed to have an abnormally high cholesterol ratio (8.5%) and be over-weight (weight-to-height ratio=3.8 lb/inch). Furthermore, the applicant discloses that he/she has two medical conditions, (e.g., hypertension and diabetes).

In a densely populated Case Base, the applicant may be represented by the query:

$Q$: $[f_1(x), f_2(x), \ldots, f_n(x)]$ AND [Condition 1=label] AND [Condition 2=label 2] AND [Condition number=2]

This query may be instantiated as:

$Q1$: [Support(Around (8.5%, $x$)), Support (Around (3.8; $x$)), Support (Normal($i$)), ..., Support (Normal($n$))] AND [Condition=Hypertension] AND [Condition=Diabetes] AND [Condition number=2]

With a well-populated Case Base, this may be a process for handling multiple medical conditions in complex cases.

As more conditions are added to a query, fewer cases will likely be retrieved. If the retrieved number of cases N is not significant, a useful decision may not be produced. An alternative (surrogate) solution may be to decompose a query into two separate queries, treating each medical condition separately. For instance, assuming that the modified query Q1 requesting two simultaneous conditions does not yield any meaningful result, the CBR system may decompose the query Q1 into a plurality of queries, Q1-A and Q1-B:

where $Q1$-$A$: [Support(Around (8.5%,$x$)), Support (Around (3.8;$x$)), Support (Normal($i$)), ..., Support (Normal($n$))] AND [Condition=Hypertension] AND [Condition number=1]; and where $Q1$-$B$: [Support(Around (8.5%,$x$)), Support (Around (3.8;$x$)), Support (Normal($i$)), ..., Support (Normal($n$))] AND [Condition=Diabetes] AND [Condition number=1]

Each query may be treated separately and may obtain a decision on the rate class for each of the queries. In other words, it may be assumed that there are two applicants, both overweight and with a high cholesterol ratio, one with hypertension and one with diabetes.

After obtaining suggested placements in the appropriate rate class, (e.g., RC-A and RC-B, respectively) the answers may be combined according to a set of aggregation rules representing the union of multiple rate classes induced by the presence of multiple medical conditions. According to an embodiment of the invention, these rules may be elicited from experienced underwriters. A look-up table, as illustrated in FIG. 11, may represent this rule set. FIG. 11 is just an example that shows a linear aggregation of the rate classes. Assume that the rate class assigned to query Q1-A is RC-A=Table 6 and the rate class assigned to query Q1-B is RC-B=Table 8. The combined rate class generated from the aggregation rule is RC=Table 14. Other tables may be designed to over-penalize the occurrence of multiple conditions as their presence might affect risk and, therefore, claims, in a non-linear fashion. For example RC-A=Table 6 and RC-B=Table 8 could be aggregated into RC=Table 18 by a stricter table. Other aggregation process may also be used.

Additionally, these tables may be used in an associative fashion. In other words, when an applicant has three or more medical conditions, the CBR system may aggregate the rate classes derived from the first two medical conditions, obtain the result and aggregate the result with the rate class obtained from the third medical condition, and so on, as illustrated in FIG. 11. This method is a surrogate alternative that may be used when enough cases with multiple conditions are included in the Case Base.

According to an embodiment of the invention, a CBR engine may be encoded into a Java based computer code, which can query a database to obtain the case parameters, and write its decision in the database as well. This embodiment may be suitable for batch processing, and for use in a fully automated underwriting environment.

Calculation of Confidence Factor

A described above, CBR may be used to automate decisions in a variety of circumstances, such as, but not limited to, business, commercial, and manufacturing processes. Specifically, it may provide a method and system to determine at run-time a degree of confidence associated with the output of a Case Based Decision Engine, also referred to as CBE. Such a confidence measure may enable a determination to be made on when a CBE decision is trustworthy enough to automate its execution and when the CBE decision is not as reliable and may need further consideration. If a CBE decision is not determined to be as reliable, a CBE analysis may still be beneficial by providing an indicator, forwarding it to a human decision maker, and improving the human decision maker's productivity with an initial screening that may limit the complexity of the final decision. The run-time assessment of the confidence measure may enable the routing mechanism and increases the usefulness of a CBE.

Figure 12:
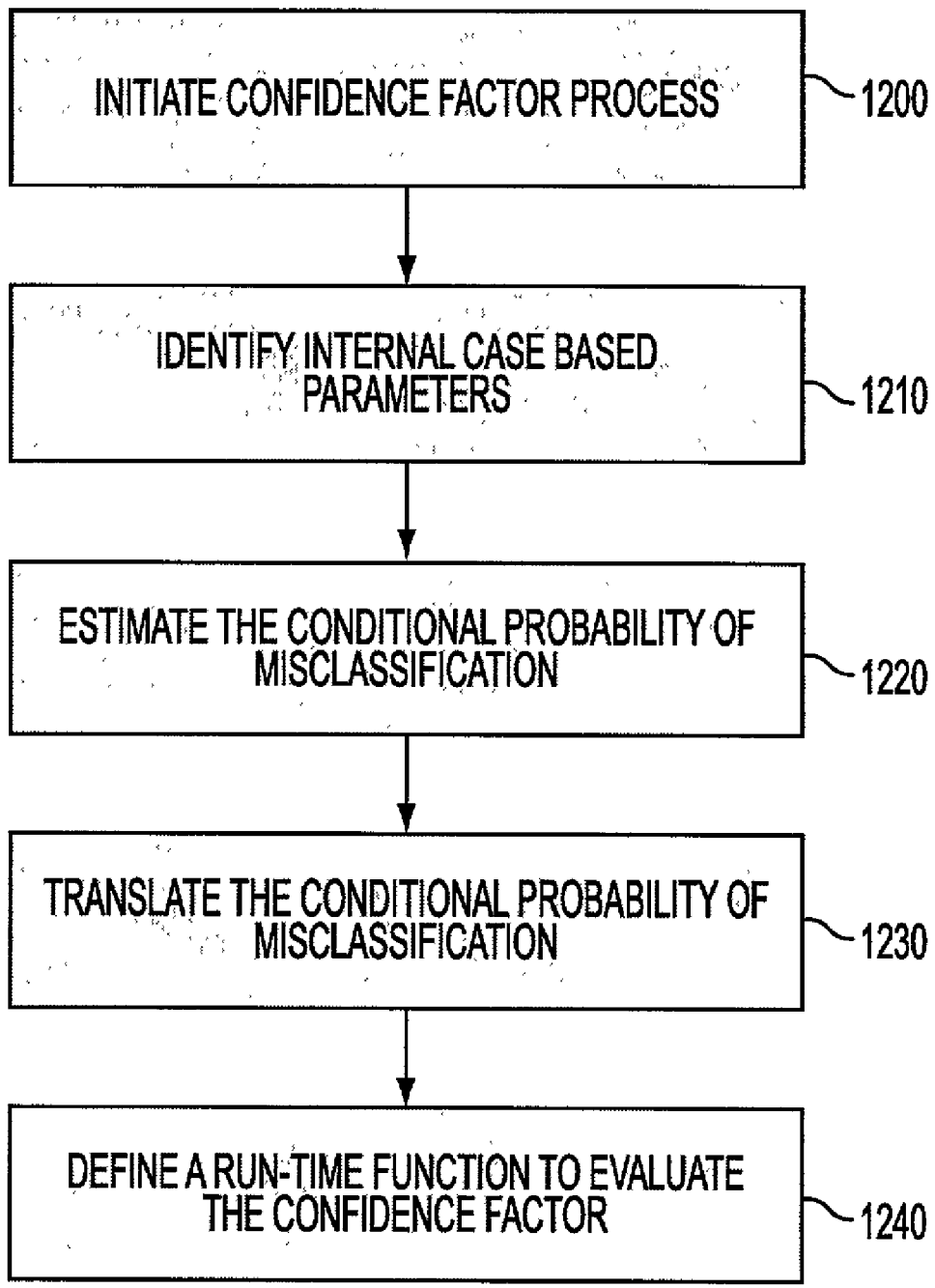
FIG. 12 is a flowchart illustrating the steps performed in a process for determining the degree of confidence of an underwriting decision based on similar cases, according to an embodiment of the invention.

An embodiment of the invention may comprise two parts: a) the run-time computation of a confidence factor for a query; and b) the determination of the threshold to be used with the computed confidence factor. FIG. 12 is a flowchart illustrating a process for determining a run-time computation of a confidence factor according to an embodiment of the invention. At Step 1200, a confidence factor process is initiated. At Step 1210, CBE internal parameters that may affect the probability of misclassification are identified. At Step 1220, the conditional probability of misclassification for each of the identified parameters is estimated. At Step 1230, the conditional probability of misclassification is translated into a soft constraint for each parameter. At Step 1240, a run-time function to evaluate the confidence factor for each new query is defined. The determination of the threshold for the confidence factor may be obtained by using a gradient-based search. It is understood that other steps may be performed within this process, and/or the order of steps may be changed. The process of FIG. 12 will now be described in greater detail below.

According to an embodiment of the invention, CBE may be used to automate the underwriting process of insurance policies. By way of example, CBE may be used for underwriting life insurance applications, as illustrated below. It is understood, however, that the applicability of this invention is much broader, as it may apply to any Case-Based Decision Engine(s).

According to an embodiment of the invention, an advantage of the present invention may include improving deployment of a method and system of automated insurance underwriting, based on the analysis of previous similar cases, as it may allow for an incremental deployment of the CBE, instead of postponing deployment until an entire case base has been completely populated. Further, a determination may be made for which applications (e.g., characterized by specific medical conditions) the CBE can provide sufficiently high confidence in the output to shift its use from a human underwriter productivity tool to an automated placement tool. As a case base (also referred to as a "CB") is augmented and/or updated by new resolved applications, the quality of the retrieved cases may improve. Another advantage of the present invention may be that the quality of the case base may be monitored, thereby indicating the portion of the case base that requires growth or scrubbing. For instance, monitoring may enable identification of regions in the CB with insufficient coverage (small area histograms, low similarity levels), regions containing inconsistent decisions (bimodal histograms), and ambiguous regions (very broad histograms).

In addition, by establishing a confidence threshold, a determination may be made whether the output can be used directly to place the application or if it will be a suggestion to be revised by the human underwriter, where such a determination may be made for each application processed by the CBE. Further, according to an embodiment of the invention, a process may be used after the deployment of the CBE, as part of maintenance of the case base. As the case base is enriched by the influx of new cases, the distribution of its cases may also vary. Regions of the case base that were sparsely populated might now contain a larger number of cases. Therefore, as part of the tuning of the CBE, one may periodically recompute certain steps within the process to update the soft constraints on each of the parameters. As part of the same maintenance, one may also periodically update the value of the best threshold to be used in the process.

While the present invention is described in relation to applicability to the improvement of the performance of a Case Based Engine for Digital Underwriting, it is understood that the method and system described herein may be applied to any Case Based Reasoning system, to annotate the quality of its output and decide whether or not to act upon the generated output. By way of example, CBR systems may have applications in manufacturing, scheduling, design, diagnosis, planning, and other areas.

As described above, the CBE relies on having a densely populated Case Base ("CB") from which to retrieve the precedents for the new application (i.e., the similar cases). According to an embodiment of the invention, until the CB contains a sufficiently large number of cases for most possible applications, the CBE output may not be reliable. Such an output may, by way of example, be used as a productivity aid for a human underwriter, rather than an automation tool.

For each processed application, a measure of confidence in the CBE output is computed so that a final decision maker (CBE or human underwriter) may be identified. As the decision engine generates its output from the retrieval, selection, and adaptation of the most similar cases, such a confidence measure may reflect the quality of the match between the input (the application under consideration) and the current knowledge, e.g., the cases used by the CBE for its decision.

The confidence measure proposed by this invention needs to reflect the quality of the match between the current application under consideration and the cases used for the CBE decision. This measure needs to be evaluated within the context of the statistics for misclassification gathered from the training set. More specifically, according to an embodiment of the invention, the steps described below may be performed. These steps may include, but are not limited to, the following: 1) Formulate a query against the CB, reflecting the characteristics of the new application as query constraints; 2) Retrieve the most relevant cases from the case library. For purposes of illustration, assume that N cases have been retrieved, where N is greater than 0 (i.e., not a null query or an empty retrieved set of cases). A histogram of the N cases is generated over the universe of their responses, i.e., a frequency of the rate class; 3) Rank the retrieved cases using a similarity measure; 4) Select the best cases thereby reducing the total number of useful retrieved cases from N to L; and 5) Adapt the L refined solutions to the current case in order to derive a solution for the case. By way of example, selecting the mode of the histogram may be used to derive a solution.

To determine the confidence in the decision, it may be desirable to understand what the probability of generating a correct or incorrect classification is. Specifically, it may be desirable to identify which factors affect misclassifications, and, for a given case, use these factors to assess if it is more or less likely to generate a wrong decision. According to an embodiment of the invention, unless a decision is binary, the decision will consist of placing the case under considerations in one of several bins. Hence, there may be different degrees of misclassification, depending on the distance of the CBE decision from the correct value. Given the different costs associated with different degrees of misclassification, the factors impacting the decision may be used with the likely degree of misclassification.

One aspect of the present invention deals with the process and method used to accomplish this result. At Step 1210 the CBE internal parameters that might affect the probability of misclassification may be determined. Each of these parameters may be referred to as an x. Furthermore, assume that there are M parameters (i.e., i=1, . . . M, forming a parameter vector $X=[x_1, x_2, \ldots x_M]$.

Parameters that may affect the probability of misclassification include, but are not limited to, the following potential list of candidates:

$x_1$: N=Number of retrieved cases (i.e., cardinality of retrieved set and area of histogram in FIG. 9), e.g., N=40 cases.

$x_2$: variability of retrieved cases (measure of dispersion of histogram in FIG. 9).

$x_3$: number of retrieved cases thresholded by similarity value (area of histogram in FIG. 10) e.g., 25 cases.

$x_4$: variability of retrieved cases thresholded by similarity value. (measure of dispersion of histogram in FIG. 10).

$x_5$: L=number of refined cases. (i.e., cardinality of refined set) e.g., 21 cases.

$x_6$: variability of refined cases.

$x_7$: number of refined cases, thresholded by similarity value e.g., 16 cases.

$x_8$: variability of refined cases thresholded by similarity value.

$x_9$: measure of strength of mode (percentage of cases in mode of histogram) e.g., 50%.

According to an embodiment of the invention, other parameters may include:

$x_{10}$: number of retrieved cases weighted by similarities. (i.e. fuzzy cardinality of retrieved set (area of histogram in FIG. 9)).

$x_{11}$: variability of retrieved cases weighted by similarities (measure of dispersion of histogram in FIG. 9).

$x_{12}$: number of refined cases weighted by similarities (i.e. fuzzy cardinality of refined set).

$x_{13}$: variability of refined cases weighted for similarities.

These parameters may be query-dependent, (e.g., they may vary for each new application). This may be in contrast to static design parameters, such as, but not limited to, similarity weights, retrieval parameters, and confidence threshold. Static parameters may be tuned at development time (e.g., when a system is initially developed) and periodically revised at maintenance time(s) (e.g., during maintenance periods for a system). According to an embodiment of the invention, static parameters may be considered fixed while evaluating parameters $[x_1-x_9:]$.

According to an embodiment of the invention, the above parameters may likely be positively correlated. By way of example, the number or refined cases L may depend on the total number of cases N. The relative impact of these parameters may be evaluated via a statistical correlation analysis, CART, C4.5 or other algorithms to identify and eliminate those parameters that contribute the least amount of additional information. By way of another example, methods may be used to handle partially redundant information in a way that avoids double counting of the evidence. The use of a minimum operator in the computation of the Confidence Factor, as is described below, is such an example.

According to an embodiment of the invention, at step 1220, the conditional probability of misclassification for each parameter $x_i$ (for i=1 . . . 9) may be estimated. By way of example, this step may be achieved by running a set of experiments with a training set. Given a certified Case Base (e.g., a CB containing a number K of cases whose associated decisions were certified correct), the following steps may then be followed:

(1) For each of the K cases in the CB, one case is selected (from the CB) and may be considered as the probe, i.e., the case whose decision we want to determine (1310).

(2) The Case Based Engine (CBE) and the (K−1) cases remaining in the CB may then be used to determine the rate class (i.e., the placement decision for the probe) (1320).

(3) The decision derived from the CBE may then be compared with the original certified decision of the probe (1330).

(4) The comparison and its associated parameters $[x_1-x_2]$ may then be recorded.

(5) The selected case may be placed in the CB and another case selected. (i.e., back to step (1) (1340)).

(6) Perform steps (2) through (5) until all the K cases in the CB have been used as probes (1350).

Figure 13:
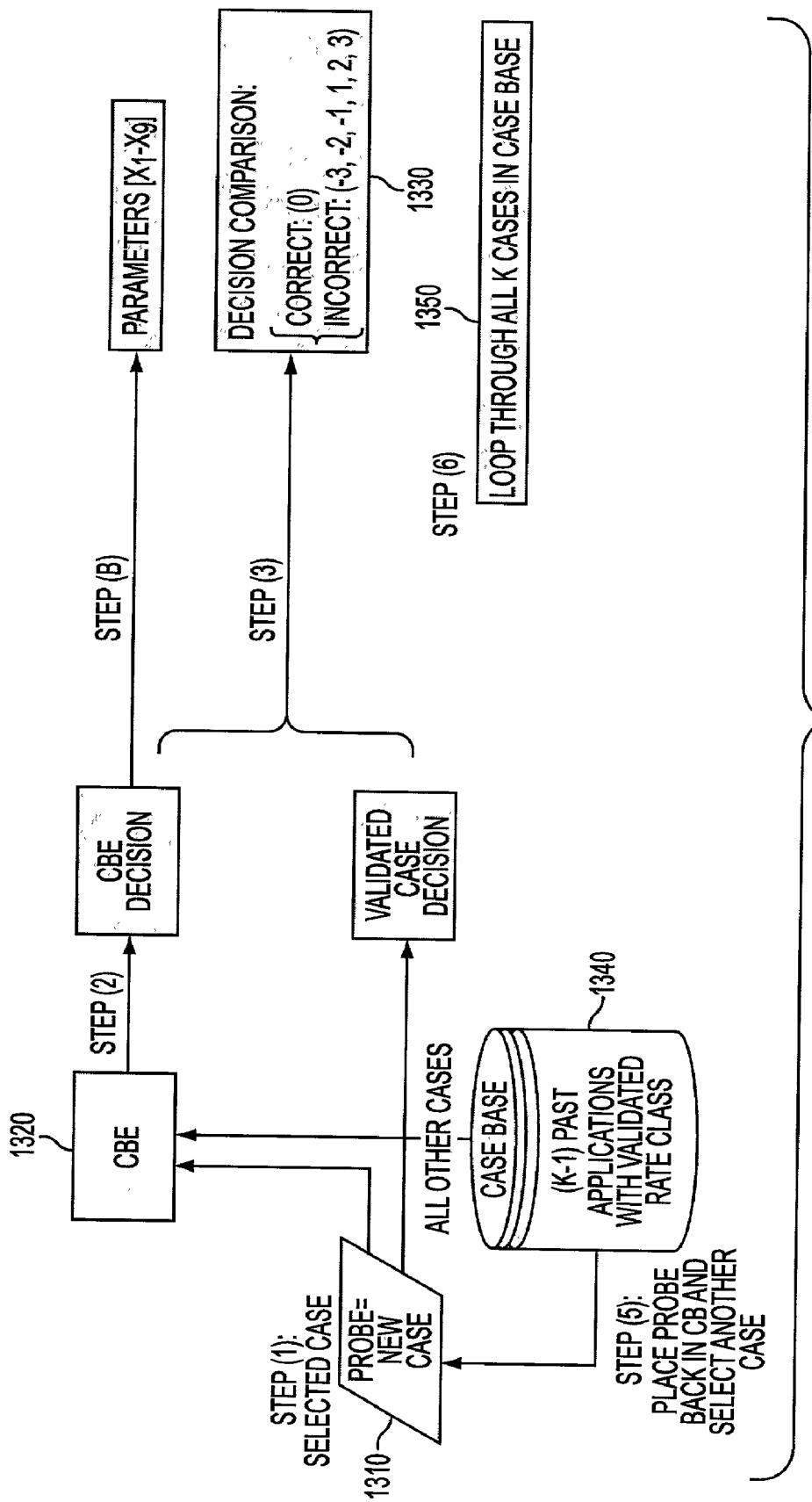
FIG. 13 is a process map illustrating a decision flow, according to an embodiment of the invention.
Figure 14:
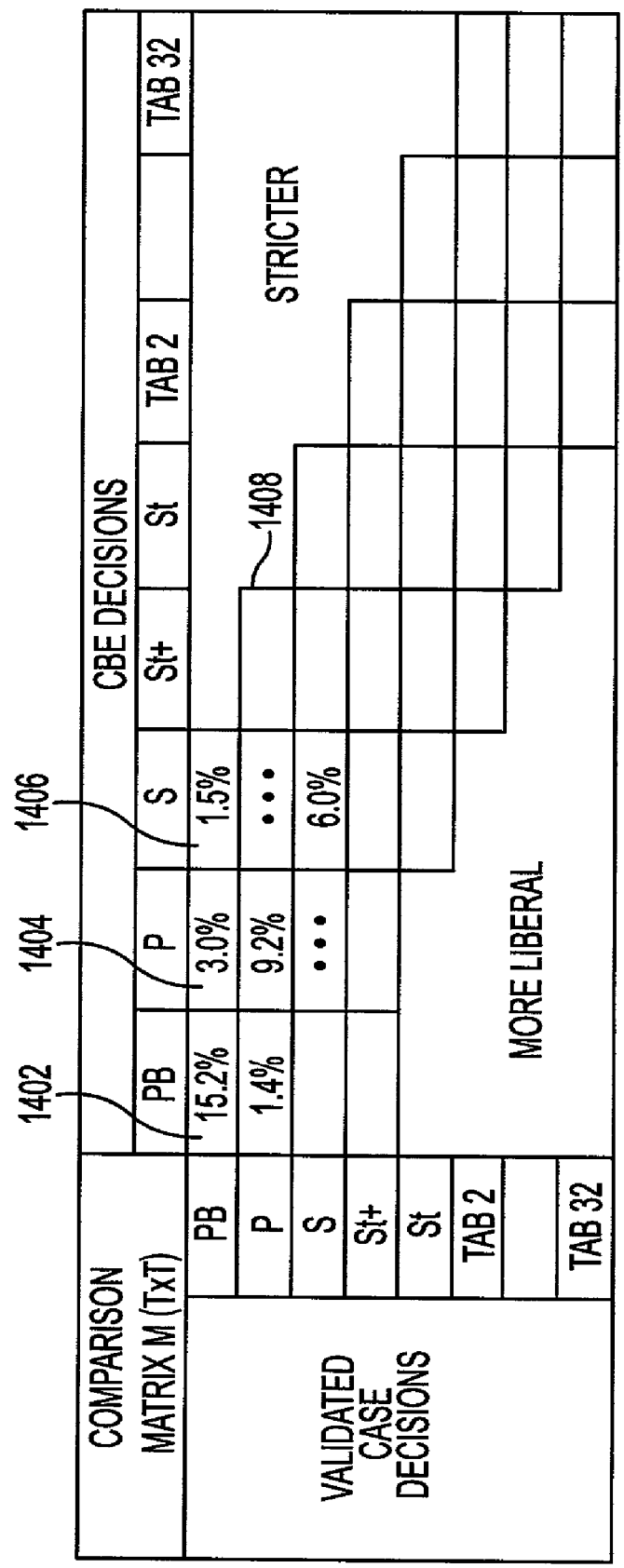
FIG. 14 illustrates a comparison matrix, according to an embodiment of the invention.

This process is illustrated in FIG. 13. Once the process is completed, the results may be collected and analyzed. The comparison matrix of FIG. 14 illustrates a comparison between a probe's decision derived from the CBE and the probe's certified reference decision. The cells located on the comparison matrix's main diagonal may contain the percentage of correct classifications. The cells off the main diagonal may contain the percentage of incorrect classifications. As was previously mentioned, there may be different degrees of misclassification, depending on the distance of a CBE decision from the corresponding reference decision.

At this point, it may be desirable to estimate the conditional probability of misclassification given each of parameters $[x_1-x_9]$. Since each case in the comparison matrix has its associated parameters $[x_1-x_9]$ recorded, a histogram of the distance from the correct decision for each of these parameters may be generated. This process may be illustrated by a simple example. As was previously described, the value of the first parameter $x_1$:

$x_1$: N=Number of retrieved cases. (i.e., cardinality of retrieved set (area of histogram in FIG. 9))

FIG. 15 shows an example of cross-tabulation of classification distances and number of retrieved cases for each probe. By way of this example, the processing of 573 probes is shown, achieving a correct classification for 242 of them. Additionally, 214 were classified as one rate class off (where 114 at (−1) and 100 at (+1) equal 214). Further, 99 were two rate classes off (where 64 at (−2) and 35 at (+2) equal 99), and 18 were 3 or more classes off. These 573 cases may also be subdivided in ten bins, representing ranges of the number of retrieved cases used for each probe. By way of example, 41 cases had between 1 and 4 retrieved cases (first column), while 58 cases used more than 40 retrieved cases (last column). FIG. 16 illustrates the same cross-tabulation using percentages instead of the number of cases. According to an embodiment of the invention, this table may be referred to as matrix D(i, j), where i=1 . . . 7 (the seven distances considered), and j=1 . . . 10 (the ten bins considered).

Note that this table contains the same percentages illustrated in FIG. 15, once we normalize the values by the total number of cases, tabulated for different values of $x_1$. For instance, the total percentage of Correct Classifications (CC) in FIG. 14 may be defined as the sum of the elements on the main diagonal, i.e.:

$$\% \ CC = \sum_{i=1}^{T} M(i, i)$$

The same percentage may be obtained by adding the percentages distributed along the fourth row (corresponding to Distance 0), i.e.:

$$\% \ CC = \sum_{j=1}^{10} D(4, j)$$

The percentage of correct classification may increase with the number of cases retrieved for each probe (fourth row, distance=0). By analyzing a given column on this table, an estimate may be derived of the probability of correct/incorrect classification, given that the number of cases is in the range of values corresponding to the column.

According to an embodiment of the invention, step 1230 may comprise translating the conditional probability of misclassification into a soft constraint for each parameter $x_1$ (for i=1 . . . 9). By way of example, all misclassifications are determined to be equally undesirable, the only concern may be with the row corresponding to distance equal 0 (i.e., correct classification), as illustrated in FIG. 17. By way of another example, it may be desirable to penalize more those misclassifications that are two or three rate classes away from the correct decision. Therefore, an overall performance function may be formulated that aggregates the rewards of correct classifications with increasing penalties for misclassifications. Although various types of aggregating function may be used to achieve these ends, one possible aggregating function may use a weighted sum of rewards and penalties. Specifically, for each bin (range of values) of the parameter $x_1$ under consideration, a reward/penalty $w_i$ may be considered. For instance:

$$f(Bin_k) = \sum_{i=1}^{7} w_i D(i, k)$$

Where, for example, the weight vector $W[w_i]$, i=1 . . . 7 is W=[−11, −6, −1, 4, −1, −6, −11]

This weight vector indicates that misclassifying a decision by three or more rate classes is eleven times worse than a misclassification that is one rate class away. Except for the fourth element, which indicates the reward for correct classifications, all other elements in vector W indicate the penalty value for the corresponding degree of misclassification. FIG. 18 illustrates the result of applying the performance function $f(Bin_k)$ to the values of FIG. 16, i.e., Matrix D.

By interpreting the values of FIG. 18 as degree of preference, a fuzzy membership function $Ci(x_i)$, is derived, indicating the tolerable and desirable ranges for each parameter $x_i$.

Figure 20:
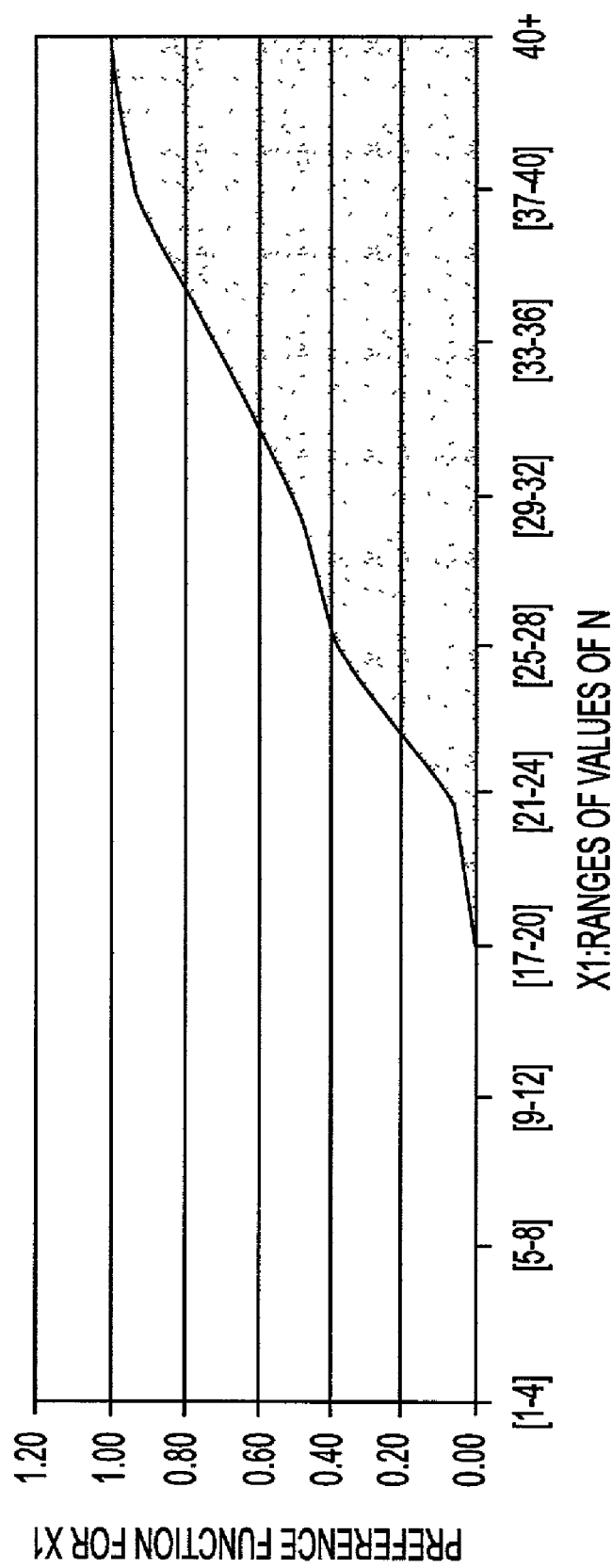
FIG. 20 illustrates results of a plot of the preference function (derived from FIG. 19) according to an embodiment of the invention.

According to an embodiment of the invention, a possible way to convert the values of FIG. 18 to a fuzzy membership function is to replace any negative value with a zero and then normalize the elements by the largest value. In this example, the result of this process is illustrated in FIGS. 19 and 20.

As previously described, the membership function of a fuzzy set is a mapping from the universe of discourse (the range of values of the performance function) into the interval [0,1]. The membership function has a natural preference interpretation. The support of the membership function $Ci(x_i)$ represents the range of tolerable (i.e., acceptable) values of $x_i$. The support of the fuzzy set $Ci(x_i)$ is defined as the interval of values of x for which $Ci(x_i) > 0$. Similarly, the core may represent the most desirable range of values and establish a top preference. The core of the membership function $Ci(x_i)$ may be defined as the interval of values $x_i$, for which $Ci(x_i)=1$. In the example of FIG. 20, the support is [22, infinity] and the core is [40, infinity]. By definition, a feature value falling inside the core will receive a preference value of 1. As the feature value moves away from the most desirable range, its associated preference value will decrease from 1 to 0. At this point, the information may be translated into a soft constraint representing our preference for the values of parameter $x_i$. The soft constraint may be referred to as $Ci(x_i)$, as illustrated in FIG. 20.

According to an embodiment of the invention, a fourth step of this invention may be to define a run-time function to evaluate the confidence measure for each new query. By way of example, after executing the third step for each of the nine parameters, nine soft constraints may be obtained $Ci(x_i)$ i= 1, . . . , 9. A soft constraint evaluation (SCE) vector is generated that contains the degree to which each parameter satisfies its corresponding soft constraint; SCE $[C_1(x_1), \ldots, C_9(x_9)]$. The Confidence Factor ($CF_j$) to be associated to each new case j may be computed at run-time as the intersection of all the soft constraints evaluations contained in the SCE vector.

$$CF_j = \bigcap_{i=1}^{9} C_i(x_i) = \operatorname*{Min}_{i=1}^{9} C_i(x_i)$$

According to an embodiment of the invention, all elements in the Soft Constraint Evaluation (SCE) vector may be real numbers in the interval [0,1]. Therefore the Confidence Factor $CF_j$ will also be a real number in the interval [0,1]. Nine potential soft constraints represent the most desirable fuzzy ranges for the nine parameters described above. Given a new probe, its computed parameter vector $X=[x_1-x_9]$ may used be to determine the degree to which all soft constraints are satisfied (SCE), leading to the computation of its Confidence Factor CF.

As previously described above, a four-step process was described to compute at run-time the confidence factor. The minimum threshold for the confidence value may be determined by a series of experiments with the data, to avoid being too restrictive or too inclusive. A higher-than-needed threshold may decrease the coverage provided by the CBE by rejecting too many correct solutions (False Negatives). As the threshold is lowered, the number of accepted solutions is increased and therefore, an increase in coverage is obtained. However, a lower-than needed threshold may decrease the accuracy provided by the CBE by accepting too many incorrect solutions (False Positives). Therefore, it may be desirable to obtain a threshold using a method that balances these two concepts.

According to an embodiment of the invention, coverage for any given threshold level r may include accepting n(r) cases out of K. Given a Case Base with K cases, the function $g_1(t)$ may be defined as a measure or coverage:

$g_1(\tau) = n(\tau)/K$

For accuracy, the performance function $f$, as previously defined, may be used (e.g., aggregate the rewards of correct classifications with the increasing penalties for misclassifications) and may be adapted to the entire Case Base to evaluate its accuracy for any given threshold r. As the value of r is modified, more decisions may be accepted or rejected, modifying the entries of the comparison matrix $M=[M(i,j)]$.

$$g_2(\tau) = \sum_{i=1}^{T} K * R * M(i, i) + \sum_{i=1}^{T} \sum_{j=i, j \neq i}^{T} p(i, j) * R * M * (i, j)$$

Specifically, the function $g_2(\tau)$ may be defined as a measure of relative accuracy, where $M(i, j)$ is the $(i, j)$ element of the comparison matrix illustrated in FIG. 14. It may represent the percentage of cases classified in cell i while the correct classification was cell j. Therefore (i=j) implies a correct classification. The percentage may be computed over the total cases for which the decision has been accepted (i.e., its corresponding confidence was above the threshold). Further, $K*R$ may be a reward for correct classification (where K indicates a static multiple of basic reward R), and $p(i,j)*R$ may be the penalty for incorrect classification ($p(i,j)$ determine a dynamic multiple of basic reward R).

For simplicity, R=1 may be used. The penalty function $p(i,j)$ may indicate the increasing penalty for misclassifications farther away from the correct one. Many possible versions of function $p(i,j)$ can be used. By way of example, the vector $W=[-11, -6, -1, 4, -1, -6, -11]$ corresponds to the values:

K=4 and $p(i,j)=5|i-j|+4$

Figure 30:
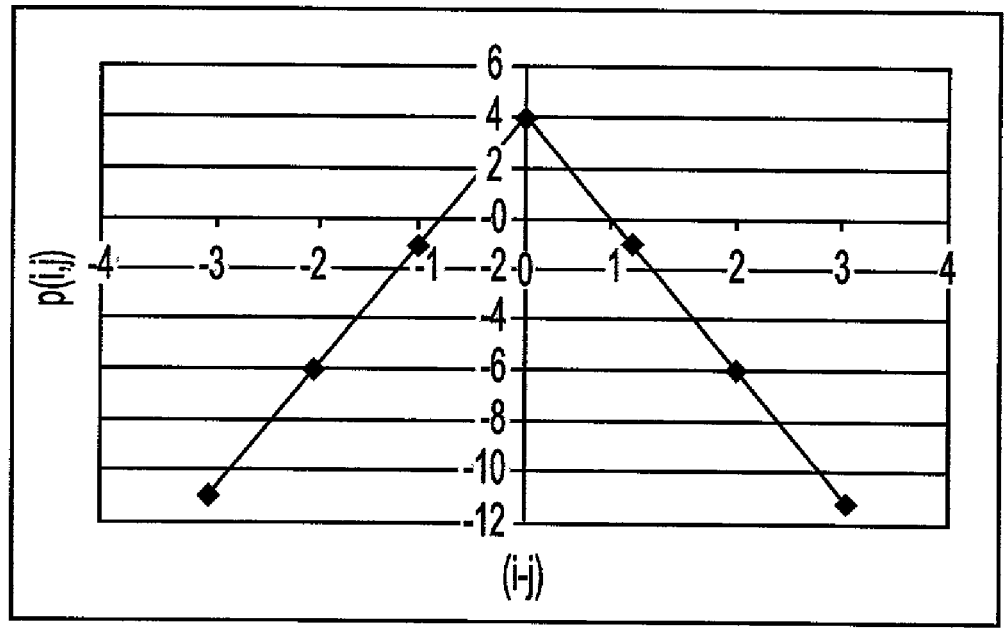
FIG. 30 is a graph illustrating a linear penalty function used in the evaluation of the accuracy of the CBE, according to an embodiment of the invention.
Figure 31:
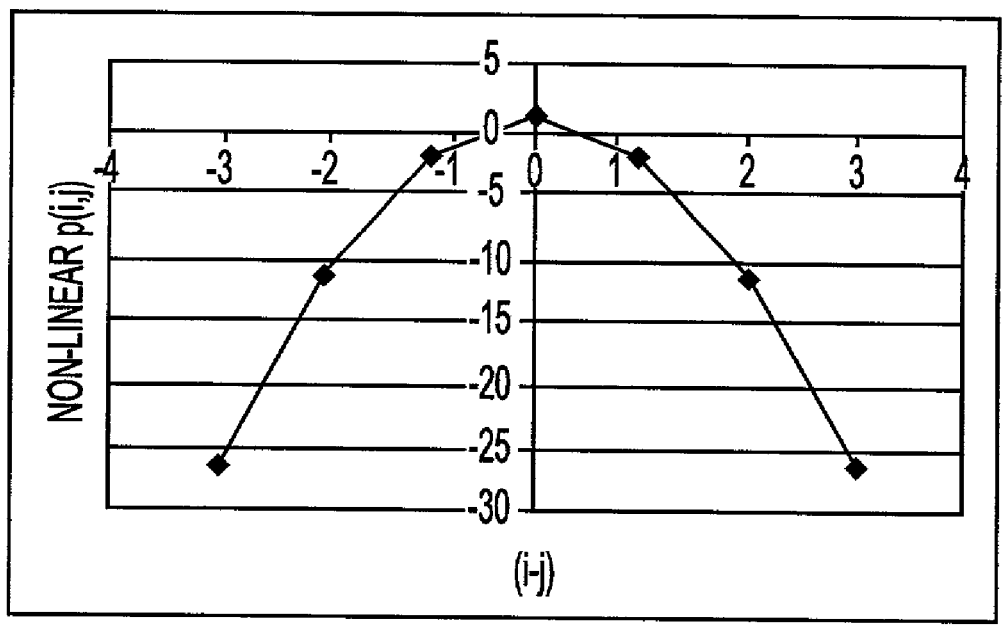
FIG. 31 is a graph illustrating a nonlinear penalty function used in the evaluation of the accuracy of the CBE, according to an embodiment of the invention.

A linear penalty function $p(i,j)$ is illustrated in FIG. 30. It will be recognized by those of ordinary skill in the art that other linear functions may also be used. If over-penalization for larger misclassifications is desired, a non-linear penalty function may be used, such as $p(i,j)=-3(i-j)^2+4$, such as that illustrated in FIG. 31.

The selection of a penalty function may be left as a choice to a user to represent the cost of different misclassifications. According to an embodiment of the invention, if there were no differences among such costs, then a simplified version of $g_2(r)$ could be used to measure the CBE accuracy, e.g.:

$$g_2(\tau) = \sum_{i=1}^{T} K * R * M(i, i)$$

Functions $g_1(t)$ and $g_2(t)$ may be defined to measure coverage and relative accuracy, respectively. Function $g_1(t)$ may be a monotonically non-increasing with the value t (larger values of t will not increase coverage), while $g_2(t)$ may be a monotonically non-decreasing with the value t (larger values of t will not decrease relative accuracy, unless the set is empty.). The two functions may be aggregated into a global accuracy function A(t) to evaluate the overall system performance under different thresholds t:

$A(\tau) = g_1(\tau) \times g_2(\tau)$ where X indicates scalar multiplication

The function A(t) provides a measure of accuracy combined with the coverage of cases. FIG. 21 illustrates an example of the computation of Coverage, Relative Accuracy, and Global Accuracy as a function of threshold t. In this example, t=0.1 has the largest coverage, t=0.7 has the largest relative accuracy, and t=0.5 has the largest global accuracy.

There are many approaches that may be used to maximize the aggregate function A(t) to obtain the best value for threshold t. Any reasonable optimization algorithm (such as a gradient-based search, or a combined gradient and binary search) may be used to this effect. For example, in FIG. 21, the value of A(t) may be computed for nine values of t. According to an embodiment of the invention, values may be explored to determine a best threshold, By way of example only, the neighborhood of t=0.5 may be explored, such as by a gradient method, to determine that the value t=0.55 is the best threshold.

As described above, the present invention provides many advantages. According to an embodiment of the present invention, incremental deployment of the CBE may be achieved, instead of postponing its deployment until an entire Case Base has been completely populated. Further, a determination may be made for which applications (e.g., characterized by specific medical conditions) the CBE can provide sufficiently high confidence in the output to shift its use from a human underwriter productivity tool to an automated placement tool.

According to an embodiment of the invention, as the Case Base is augmented and or updated by new resolved applications, the quality of the retrieved cases may change. The present invention may enable monitoring of the quality of the Case Base, indicating the part of the CB requiring growth or scrubbing. By way of example, regions within the Case Base with insufficient coverage (small area histograms, low similarity levels) may be identified, as well as regions containing inconsistent decisions (bimodal histograms), and ambiguous regions (very broad histograms).

According to an embodiment of the invention, by establishing a confidence threshold, a determination can be made, for each application processed by the CBE, if the output can be used directly to place the application or if it will be a suggestion to be revised by a human underwriter.

According to an embodiment of the invention, a process as described above may be used after the deployment of the CBE, as part of the Case Base maintenance. As the Case Based is enriched by the influx of new cases, the distribution of its cases may also vary. Regions of the CB that were sparsely populated might now contain a larger number of cases. Therefore, as part of the tuning of the CBE, one should periodically recompute various steps within the process to update the soft constraints on each of the parameters. As part of the same maintenance, the value of the best threshold may also be updated and used in the process.

Network-Based Underwriting System

Figure 22:
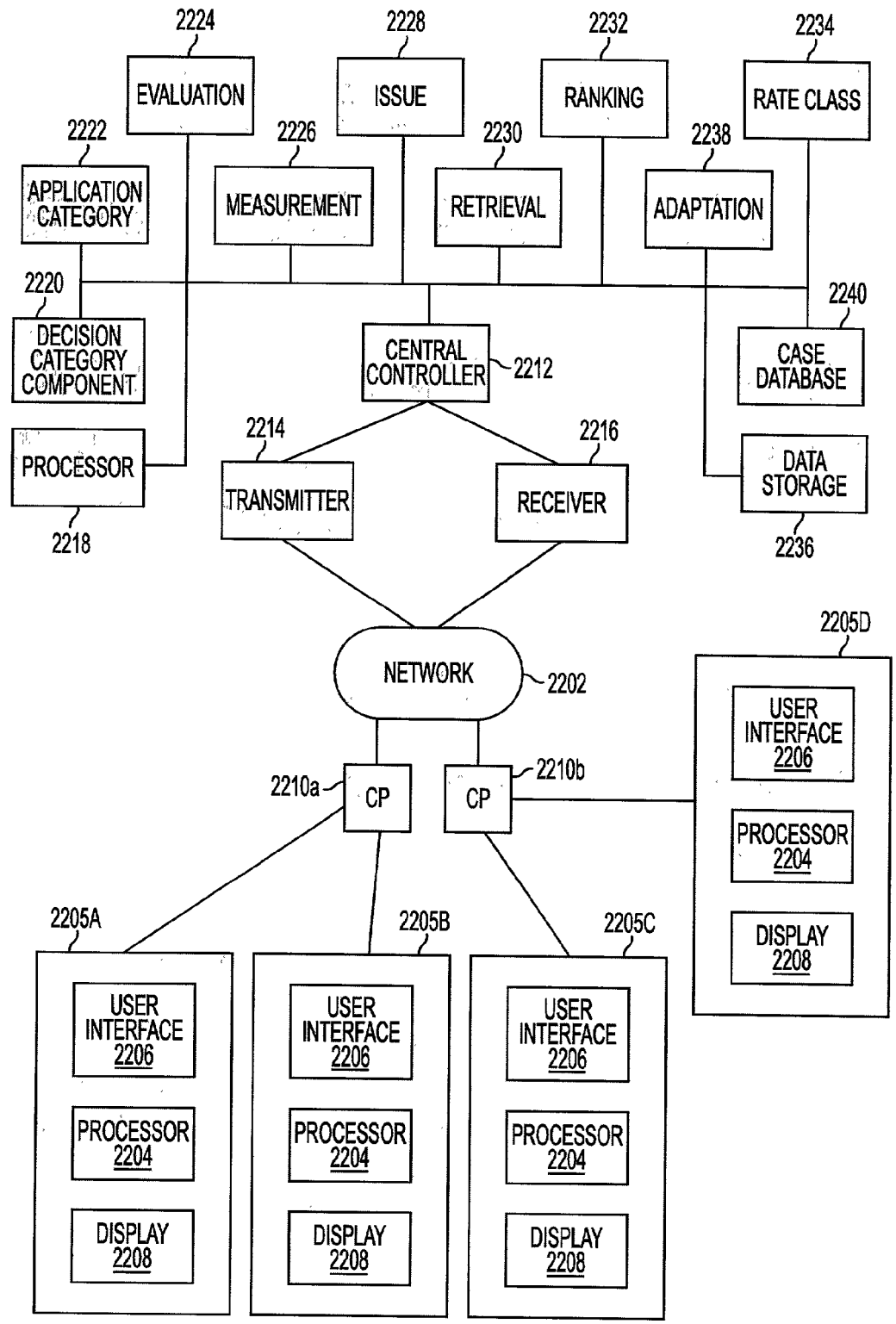
FIG. 22 is a schematic representation of a system for underwriting according to an embodiment of the invention.

FIG. 22 illustrates a system 2200 according to an embodiment of the present invention. The system 2200 comprises a plurality of computer devices 2205 (or "computers") used by a plurality of users to connect to a network 2202 through a plurality of connection providers (CPs) 2210. The network 2202 may be any network that permits multiple computers to connect and interact. According to an embodiment of the invention, the network 2202 may be comprised of a dedicated line to connect the plurality of the users, such as the Internet, an intranet, a local area network (LAN), a wide area network (WAN), a wireless network, or other type of network. Each of the CPs 2210 may be a provider that connects the users to the network 2202. For example, the CP 2210 may be an Internet service provider (ISP), a dial-up access means, such as a modem, or other manner of connecting to the network 2202. In actual practice, there may be significantly more users connected to the system 2200 than shown in FIG. 22. This would mean that there would be additional users who are connected through the same CPs 2210 shown or through another CP 2210. Nevertheless, for purposes of illustration, the discussion will presume three computer devices 2205 are connected to the network 2202 through two CPs 2210.

According to an embodiment of the invention, the computer devices 2205a-2205c may each make use of any device (e.g., a computer, a wireless telephone, a personal digital assistant, etc.) capable of accessing the network 2202 through the CP 2210. Alternatively, some or all of the computer devices 2205a-2205c may access the network 2202 through a direct connection, such as a T1 line, or similar connection. FIG. 22 shows the three computer devices 2205a-2205c, each having a connection to the network 2202 through the CP 2210a and the CP 2210b. The computer devices 2205a-2205c may each make use of a personal computer such as a computer located in a user's home, or may use other devices which allow the user to access and interact with others on the network 2202. A central controller module 2212 may also have a connection to the network 2202 as described above. The central controller module 2212 may communicate with one or more modules, such as one or more data storage modules 2236, one or more evaluation modules 2224, one or more case database modules 2240 or other modules discussed in greater detail below.

Each of the computer devices 2205a-2205c used may contain a processor module 2204, a display module 2208, and a user interface module 2206. Each of the computer devices 2205a-2205c may have at least one user interface module 2206 for interacting and controlling the computer. The user interface module 2206 may be comprised of one or more of a keyboard, a joystick, a touchpad, a mouse, a scanner or any similar device or combination of devices. Each of the computers 2205a-2205c may also include a display module 2208, such as a CRT display or other device. According to an embodiment of the invention, a developer, a user of a production system, and/or a change management module may use a computer device 2205.

The central controller module 2212 may maintain a connection to the network 2202 such as through a transmitter module 2214 and a receiver module 2216. The transmitter module 2214 and the receiver module 2216 may be comprised of conventional devices that enable the central controller module 2212 to interact with the network 2202. According to an embodiment of the invention, the transmitter module 2214 and the receiver module 2216 may be integral with the central controller module 2212. According to another embodiment of the invention, the transmitter module 2214 and the receiver module 2216 may be portions of one connection device. The connection to the network 2202 by the central controller module 2212 and the computer devices 2205 may be a high speed, large bandwidth connection, such as through a T1 or a T3 line, a cable connection, a telephone line connection, a DSL connection, or another similar type of connection. The central controller module 2212 functions to permit the computer devices 2205a-2205c to interact with each other in connection with various applications, messaging services and other services which may be provided through the system 2200.

The central controller module 2212 preferably comprises either a single server computer or a plurality of server computers configured to appear to the computer devices 2205a-

2205c as a single resource. The central controller module 2212 communicates with a number of modules. Each module will now be described in greater detail.

A processor module 2218 may be responsible for carrying out processing within the system 2200. According to an embodiment of the invention, the processor module 2218 may handle high-level processing, and may comprise a math co-processor or other processing devices.

A decision component category module 2220 and an application category module 2222 may handle categories for various insurance policies and decision components. As described above, each decision component and each application may be assigned a category. The decision component category module 2220 may include information related to the category assigned for each decision component, including a cross-reference to the application associated with each decision component, the assigned category or categories, and/or other information. The application category module 2222 may include information related to the category assigned for each application, including a cross-reference to the decision components associated with each application, the assigned category or categories, and/or other information.

An evaluation module 2224 may include an evaluation of a decision component using one or more rules, where the rules may be fuzzy logic rules. The evaluation module 2224 may direct the application of one or more fuzzy logic rules to one or more decision components. Further, the evaluation module 2224 may direct the application of one or more fuzzy logic rules to one or more policies within a case database 2240, to be described in greater detail below. Evaluation module policies within a case database 2240, are to be described in greater detail below.

A measurement module 2226 may include measurements assigned to one or more decision components. As described above, a measurement may be assigned to each decision component based on an evaluation, such as an evaluation with a fuzzy logic rule. The measurement module 2226 may associate a measurement with each decision component, direct the generation of the measurement, and/or include information related to a measurement.

An issue module 2228 may handle issuing an insurance policy based on the evaluation and measurements of one or more decision components and the application itself. According to an embodiment of the invention, decisions whether to ultimately issue an insurance policy or not to issue an insurance policy may be communicated to an applicant through the issue module 2228. The issue module 2228 may associate issuance of an insurance policy with an applicant, with various measurement(s) and evaluation(s) of one or more policies and/or decision components and other information.

A retrieval module 2230 may be responsible for retrieving cases from a case database module 2240. According to an embodiment of the invention, queries submitted by a user for case-based reasoning may be coordinated through the retrieval module 2230 for retrieving cases. Other information and functions related for case retrieval may also be available.

A ranking module 2232 may be responsible for ranking cases retrieved based on one or more queries received from a user. According to an embodiment of the invention, the ranking module 2232 may maintain information related to cases and associated with one or more queries. The ranking module 2232 may associate each case with the ranking(s) associated with one or more queries. Other information may also be associated with the ranking module 2232.

A rate class module 2234 may handle various designations of rate classes for one or more insurance policies. According to an embodiment of the invention, each application may be assigned a rate class, where the premiums paid by the applicant are based on the rate class. The rate class module 2234 may associate a rate class with each insurance application, and may assign a rate class based on evaluation and measurements of various applications and decision components, as well as based on a decision by one or more underwriters. Other information may also be associated with the rate class module 2234.

Data may be stored in a data storage module 2236. The data storage module 2236 stores a plurality of digital files. According to an embodiment of the invention, a plurality of data storage modules 2236 may be used and located on one or more data storage devices, where the data storage devices are combined or separate from the controller module 2212. One or more data storage modules 2236 may also be used to archive information.

An adaptation module 2238 may be responsible for adapting the results of one or more queries to determine which previous cases are most similar to the application for the present application for insurance. Other information may also be associated with the adaptation module 2238.

All cases used in a case based reasoning may be stored in a case database module 2240. According to an embodiment of the invention, a plurality of case database modules 2240 may be used and located on one or more data storage devices, where the data storage devices are combined or separate from the controller module 2212.

While the system 2200 of FIG. 22 discloses the requester device 2205 connected to the network 2202, it should be understood that a personal digital assistant ("PDA"), a mobile telephone, a television, or another device that permits access to the network 2202 may be used to arrive at the system of the present invention.

According to another embodiment of the invention, a computer-usable and writeable medium having a plurality of computer readable program code stored therein may be provided for practicing the process of the present invention. The process and system of the present invention may be implemented within a variety of operating systems, such as a Windows® operating system, various versions of a Unix-based operating system (e.g., a Hewlett Packard, a Red Hat, or a Linux version of a Unix-based operating system), or various versions of an AS/400-based operating system. For example, the computer-usable and writeable medium may be comprised of a CD ROM, a floppy disk, a hard disk, or any other computer-usable medium. One or more of the components of the system 2200 may comprise computer readable program code in the form of functional instructions stored in the computer-usable medium such that when the computer-usable medium is installed on the system 2200, those components cause the system 2200 to perform the functions described. The computer readable program code for the present invention may also be bundled with other computer readable program software.

According to one embodiment, the central controller module 2212, the transmitter module 2214, the receiver module 2216, the processor module 2218, the decision component category module 2220, application category module 2222, evaluation module 2224, measurement module 2226, issue module 2228, retrieval module 2230, ranking module 2232, rate class module 2234, data storage module 2236, adaptation module 2238, and case database module 2240 may each comprise computer-readable code that, when installed on a computer, performs the functions described above. Also, only some of the components may be provided in computer-readable code.

Additionally, various entities and combinations of entities may employ a computer to implement the components performing the above-described functions. According to an embodiment of the invention, the computer may be a standard computer comprising an input device, an output device, a processor device, and a data storage device. According to other embodiments of the invention, various components may be computers in different departments within the same corporation or entity. Other computer configurations may also be used. According to another embodiment of the invention, various components may be separate entities such as corporations or limited liability companies. Other embodiments, in compliance with applicable laws and regulations, may also be used.

According to one specific embodiment of the present invention, the system may comprise components of a software system. The system may operate on a network and may be connected to other systems sharing a common database. Other hardware arrangements may also be provided.

Other embodiments, uses and advantages of the present invention will be apparent to those skilled in the art from consideration of the specification and practice of the invention disclosed herein. The specification and examples should be considered exemplary only. The intended scope of the invention is only limited by the claims appended hereto.

Information Summarization

The fuzzy rule-based decision engine and the case-based decision engine may need to capture the medical/actuarial knowledge required to evaluate and underwrite an application. They may do so by using a rule set or a case base, respectively. However, both decision engines may also need access to all the relevant information that characterizes the new application. While the structured component of this information can be captured as data and stored into a database ("DB"), the free-form nature of an attending physician statement (APS) may not be suitable to automated parsing and interpretation. Therefore, for each application requiring an APS, a summarization tool may be used that will convert all the essential input variables from that statement into a structured form, suitable for storage in a DB and for supporting automated decision systems. Furthermore, if the decision engines were not capable of handling this new application, then the use of the APS summarization tool may be a productivity aid for a human underwriter, rather than an automation tool.

The present invention may be used in connection with an engine to automate decisions in business, commercial, or manufacturing processes. Such an engine may be based on (but not limited to) rules and/or cases. A process and system may be provided to structure and summarize key information required by a reasoning system. According to an embodiment of the invention, summarized information required by a reasoning system may be used to underwrite insurance applications, and establish a rate class corresponding to the perceived risk of the applicant. Such risk may be characterized by several information sources, such as, but not limited to, the application form, the APS, laboratory data, medical insurance consortium data bases, motor vehicle registration data bases, etc. Once this information has been gathered and compiled, the application risk may be evaluated by a human underwriter or by an automated decision system. This evaluation is carried out leveraging the medical and actuarial knowledge of the human underwriter, which is captured in its essence by the automated reasoning system. According to an embodiment of the invention, an APS summarization tool may capture the relevant variables that characterize a given medical impairment, allowing an automated reasoning system to determine the degree of severity of such impairment and to estimate the underlying insurance risk.

According to an embodiment of the invention, a focus of this invention on the individual medical impairments of a patient may provide 1) incremental deployment of the Automated Underwriting system as summaries for new impairments can be developed and added; 2) efficient coverage, by addressing the most frequent impairments first, according to a Pareto analysis of their frequencies; 3) efficient description of the impairment, by including in the summary only the variables that could have an impact on the decision.

By way of example, an aspect of the present invention will be described in terms of underwriting of an application for a fixed life insurance policy. Although the description focuses on the use of a reasoning system to automate the underwriting process of insurance policies, it will be understood by one of ordinary skill in the art that the applicability of this invention may be much broader, as it may apply to other reasoning system applications.

Figure 23:
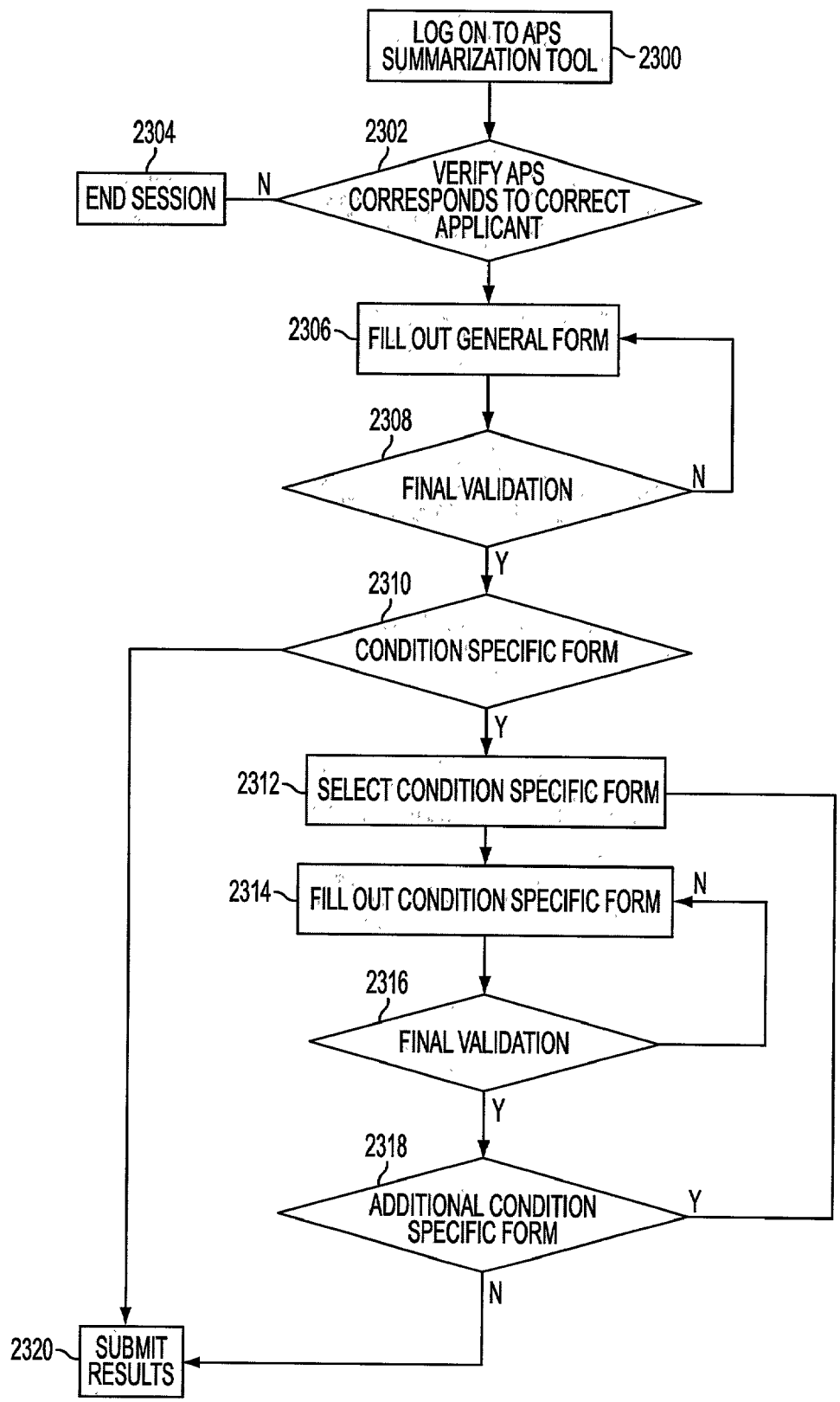
FIG. 23 a flowchart illustrating the steps performed for executing and manipulating a summarization tool according to an embodiment of the invention.

According to an embodiment of the invention, a method for executing and manipulating an APS summarization tool may occur as illustrated in FIG. 23. At step 2300, a summarizer with the appropriate medical knowledge would log into a web-based system to begin the summarization process. According to an embodiment of the invention, the APS summarization system may include a general form plus various condition specific forms, which are then filled out by the summarizer. The summarizer may first fill out the general form, which contains data fields relevant to all applicants. Condition specific forms are then filled out as needed, as the summarizer discovers various features present in the APS being summarized.

At step 2302, a summarizer may verify that the APS corresponds to the correct applicant. This may be done by matching information on the APS itself with information about the applicant provided by the system. By way of example, an applicant's name, date of birth, and social security number could be matched. If a match is not made, the summarizer may note this by checking the appropriate checkbox. According to an embodiment of the invention, at step 2304, failure to match an APS to an applicant would end the summarizer's session for that applicant, and the summarizer may recommend corrective action.

Figure 24:
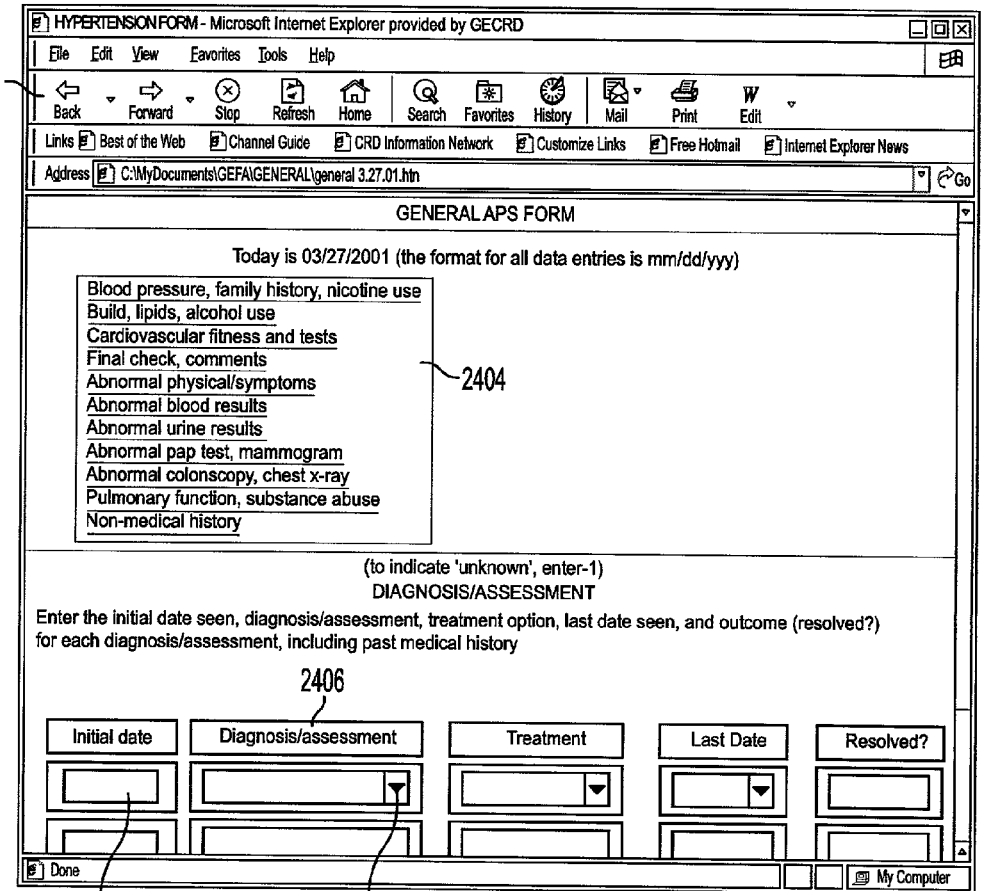
FIG. 24 illustrates a graphic user interface for a summarization tool for a general form according to an embodiment of the invention.

At step 2306, the general form is filled out. FIG. 24 illustrates a general form within a graphical user interface 2400 according to an embodiment of the invention. Graphical user interface 2400 may comprise access to any network browser, such as Netscape Navigator, Microsoft Explorer, or others. Other means of accessing a network may also be used. Graphical user interface 2400 may include a control area 2402, whereby a summarizer may control various aspects of graphical user interface 2400. Control may include moving to various portions of the network via the graphical user interface 2400, printing information from the network, searching for information within the network, and other functions used within a browser.

According to an embodiment of the invention, a general form 2400 may provide a fixed structure 2406 to capture the data within the system. According to an embodiment of the invention, different sections of the form may be organized into fields that are structured to provide only a fixed set of choices for the summarizer. This may be done to standardize the different pieces of information contained in the APS. By way of example, a fixed set of choices may be provided to a summarizer via a pull-down menu 2408. For fields that cannot be treated as pull-down menus (e.g., dates, numeric values of lab tests), such as entry field 2410 labeled as "Initial date," validation may be performed to ensure that data entry errors are minimized, and to check that values are within allowable pre-determined limits. According to an embodiment of the invention, validation may include a "client-side" validation, designed to give the summarizer an immediate response if any of the data is incorrectly entered. A "client-side" validation may be achieved through JavaScript code embedded in the web pages. According to an embodiment of the invention, validation may include a "server-side" validation, which may be performed after data submission. "Server-side" validation may be designed primarily as a fail-safe check to prevent erroneous data from entering the business-critical database.

According to an embodiment of the invention, link section 2404 may provide access to other portions of general form 2400. As illustrated in FIG. 24, link section 2404 may include links (such as hypertext links) to portions of general form 2400 that relate to blood pressure, family history, nicotine use, build, lipids, alcohol use, cardiovascular fitness and tests, final check, comments, abnormal physical symptoms, abnormal blood results, abnormal urine results, abnormal pap test, mammogram, abnormal colonoscopy, chest x-ray, pulmonary function, substance abuse, and non-medical history. Other information within a general form 2400 may also be provided, and as such, may be linked through link section 2404.

According to an embodiment of the invention, an APS summary may distinguish between a blank data field and answers such as "don't know" or "not applicable," thereby ensuring the completeness of the summary. For a general form submission, a final validation pass may be performed at step 2308 to alert the summarizer if certain required fields are blank. If required fields are blank, the system may require a summarizer to return to step 2306 and complete the general form. If the summarizer wishes to indicate that the particular piece of information is not known, they may be required to specifically indicate so, thereby maintaining information about what information is specifically not known. However, it will be recognized that not all fields will necessarily require information. For example, certain fields may be "conditionally mandatory," meaning that they require an answer only if other fields have been filled out in a particular way. Use of conditionally mandatory fields may ensure that all necessary information is gathered. Further, ensuring that all required fields have been filled may also ensure that the necessary information is gathered.

When the general form has been filled out and validated at step 2308, with all of the required fields entered, it may be necessary to complete one or more condition-specific forms. At step 2310, it is determined if any condition-specific forms are required. If no condition specific forms are required, the results may be submitted to a database or other storage device for use at a later time at step 2320.

If a condition-specific form is required, a summarizer may select a condition-specific form to fill-in at step 2312. According to an embodiment of the invention, a summarizer may move from the general form to any of the condition-specific forms by following a hypertext link embedded within the general form. By way of example, a link to a condition-specific form may be similar to, and/or same as links located within link portion 2404. Further, links to condition-specific forms may be located within link portion 2404. A portion of the knowledge of which condition-specific forms are necessary may be obtained while filling out the general form. In the current example of life insurance underwriting, these condition-specific forms may include hypertension, diabetes, etc.

Figure 25:
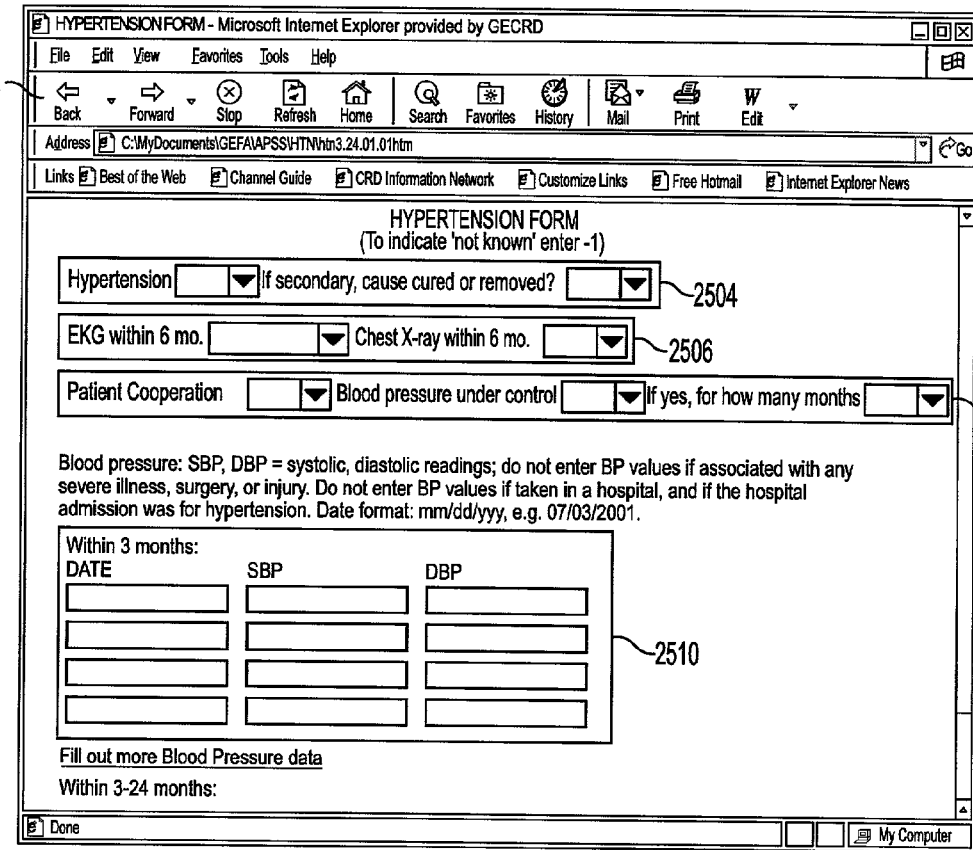
FIG. 25 illustrates a graphic user interface for a summarization tool for a condition-specific form according to an embodiment of the invention.

FIG. 25 illustrates an example of a condition-specific form for hypertension within a graphical user interface 2500 according to an embodiment of the invention. Graphical user interface 2500 may comprise access to any network browser, such as Netscape Navigator, Microsoft Explorer, or other browser. Other manners of accessing a network may also be used. Graphical user interface 2500 may include a control area 2502, whereby a summarizer may control various aspects of graphic user interface 2500. Control may include moving to various portions of the network via the graphic user interface 2500, printing information from the network, searching for information within the network, and other functions used within a browser.

Graphical user interface 2500 displays the hypertension-specific form, which may include various sections for inputting information related to hypertension. In the hypertension specific form illustrated in FIG. 25, initial identification section 2504 may enable a summarizer to provide initial identification information, including whether an applicant has hypertension, the type of hypertension, whether it was secondary hypertension, and if so, how the cause was removed or cured. According to an embodiment of the invention, pull down menus may be used to ensure that information entered is standardized for each patient. Other information may also be gathered in initial identification section 2504.

EKG section 2506 may enable a summarizer to provide EKG information, including EKG readings within a specified time period (e.g., 6 months), chest X-rays within a specified time period (e.g., 6 months), and other information related to EKG readings. According to an embodiment of the invention, pull down menus may be used to ensure that information entered is standardized for each patient. Patient cooperation section 2508 may enable a summarizer to provide information related to a patient's cooperation, including whether the patient has cooperated, whether a patient's blood pressure is under control, and if so, for how many months, and other information related to a patient's cooperation in dealing with hypertension. According to an embodiment of the invention, pull down menus may be used to ensure that information entered is standardized for each patient.

Blood pressure section 2510 may enable a summarizer to enter blood pressure readings corresponding to various dates. According to an embodiment of the invention, separate entry fields may be provided for the date the blood pressure reading was taken, (e.g., systolic reading (SBP) and the diastolic reading (DBP)). Other information may also be entered in blood pressure section 2510. Further, it will be understood by those skilled in the art that other information related to hypertension may also be entered in a hypertension form displayed on graphical user interface 2500.

At step 2314, a summarizer fills out a condition-specific form. For a condition-specific form, a final validation pass may be performed at step 2316 to alert the summarizer if certain required fields are blank. If required fields are blank, the system may require a summarizer to return to step 2314 and complete the condition-specific form. As with a general form, if the summarizer wishes to indicate that the particular piece of information is not known, they may be required to specifically indicate so, thereby facilitating the tracking of what information is specifically not known. However, it will be recognized that not all fields will necessarily require information. For example, certain fields may be "conditionally mandatory," meaning that they require an answer only if other fields have been filled out in a particular way. Use of conditionally mandatory fields may ensure that all necessary information is gathered. Further, ensuring that all required fields have been filled may also ensure that the necessary information is gathered.

If the condition-specific form has been filled out and validated at step 2316, with all of the required fields entered, a summarizer may determine if additional condition-specific forms are necessary at step 2318. If additional condition-specific forms are necessary, a summarizer may return to step 2312 and select the appropriate condition-specific form in which to enter information. If no additional condition-specific forms are required, the results may be submitted to a database or other storage device for use at a later time at step 2320.

Once the summarization is complete for a general form and any selected condition-specific forms, the summarizer may submit the results, such as described in step 2320. The data may then be transferred over a network, such as the Internet, and stored in a database for later use. According to an embodiment of the invention, different categorical data fields may be presented to the summarizer as text, but for space efficiency are encoded as integer values in the database. A "translation table" to the corresponding field meanings may then be provided as part of the design of the APS summary. The APS summarizer may provide a structured list of topics, thereby enabling a trained person to summarize the most significant information currently contained in a handwritten or typewritten APS. Further, the APS summarizer may provide an efficient description of the data content of the APS. As stated above, the APS itself can be several tens of pages of doctor's notes. The APS summary is designed to capture only the data fields that are relevant to the problem at hand. In addition, a structured and organized description of the APS data may be provided. An APS itself can adhere to any arbitrary order because of different doctor's styles. The APS summary may provide a single consistent format for the data as required for an automated system, and/or which facilitates the human underwriter's job greatly.

Since the APS summary may be captured in a database, the information contained in it may be easily available to any computer-based application. Again, this is a requirement for an automated underwriting system, but it may provide many other advantages as well. For example, the APS data may otherwise be very difficult to analyze statistically, to categorize, or to classify. Since the APS summary forms can be web-based, the physical location of the summarizers may be immaterial. The original APS sheets can be received in location X, scanned, sent over the Internet to location Y, where the APS summary is filled out, and the digital data from the summary can be submitted and stored on a database server in location Z. Further, the automated decision engine can be in any fourth location, as could an individual running queries against the APS summary database for statistical analysis or reporting purposes.

According to an embodiment of the invention, general and condition specific forms may be written in HTML and JavaScript, which provide the validation functionality. A system for storing filled out summary data into a remote database has also been created. This system was created using JavaBeans and JSP. Testing by experienced underwriters has been performed. The HTML summary forms are displayed to the underwriters via a web browser, and the data from an actual APS is entered onto the form. The underwriter comments and feedback are captured on the form as well, and used to aid the continual improvement of the forms. In choosing which condition-specific forms to create, a statistical analysis was done of the frequencies of the various medical conditions. The conditions that are most frequent were chosen to be worked on first. The APS summary does not have to cover all conditions before it is put into production. Deployment of the APS summary may be progressive, covering new conditions one by one as new forms become available. Applicants with APS requirements that are not covered in the current APS summary may be underwritten using the usual procedures. Condition-specific forms may therefore be added to the APS summary in order to increase coverage of applicants by the digital underwriting system.

Optimization of Fuzzy Rule-Based and Case-Based Decision Engines

According to an embodiment of the present invention, fuzzy rule-based and case-based reasoning may be used to automate decisions in business, commercial, or manufacturing process. Specifically, a process and system to automate the determination of optimal design parameters that impact the quality of the output of the decision engines is described.

According to an embodiment of the invention, the optimization aspect may provide a structured and robust search and optimization methodology for identifying and tuning the decision thresholds (cutoffs) of the fuzzy rules and internal parameters of the fuzzy rule-based decision engine ("RBE"), and the internal parameters of the case-based decision engine ("CBE"). These benefits may include a minimization of the degree of rate class assignment mismatch between that of an expert human underwriter and automated rate class decisions. Further, the maintenance of the accuracy of rule-based and case-based decision-making as decision guidelines evolve with time may be achieved. In addition, identification of ideal parameter combinations that govern the automated decision-making process may occur.

The system and process of the present invention may apply to a class of stochastic global search algorithms known as evolutionary algorithms to perform parameter identification and tuning. Such algorithms may be executed utilizing principles of natural evolution and may be robust adaptive search schemes suitable for searching non-linear, discontinuous, and high-dimensional spaces. Moreover, this tuning approach may not require an explicit mathematical description of the multi-dimensional search space. Instead, this tuning approach may rely solely on an objective function that is capable of producing a relative measure of alternative solutions. According to an embodiment of the invention, an evolutionary algorithm may be used for optimization within an RBE and CBE. By way of example, an evolutionary algorithm ("EA") may include genetic algorithms, evolutionary programming, evolution strategies, and genetic programming. The principles of these related techniques may define a general paradigm that is based on a simulation of natural evolution. EAs may perform their search by maintaining at any time t a population $P(t)=\{P_1(t), P_2(t), \ldots, P_p(t)\}$ of individuals. In this example, "genetic" operators that model simplified rules of biological evolution are applied to create the new and desirably more superior population $P(t+1)$. Such a process may continue until a sufficiently good population is achieved, or some other termination condition is satisfied. Each $P_i(t) \in P(t)$, represents via an internal data structure, a potential solution to the original problem. The choice of an appropriate data structure for representing solutions may be more an "art" than a "science" due to the plurality of data structures suitable for a given problem. However, the choice of an appropriate representation may be a critical step in a successful application of EAs. Effort may be required to select a data structure that is compact, minimally superfluous, and can avoid creation of infeasible individuals. For instance, if the problem domain requires finding an optimal real vector from the space defined by dissimilarly bounded real coordinates, it may be more appropriate to choose as a representation a real-set-array (e.g., bounded sets of real numbers) instead of a representation capable of generating bit strings. A representation that generates bit strings may create many infeasible individuals, and can be certainly longer than a more compact sequence of real numbers. Closely linked to a choice of representation of solutions may be a choice of a fitness function ψ:P(t)→R, that assigns credit to candidate solutions. Individuals in a population are assigned fitness values according to some evaluation criterion. Fitness values may measure how well individuals represent solutions to the problem. Highly fit individuals are more likely to create offspring by recombination or mutation operations. Weak individuals are less likely to be picked for reproduction, so they eventually die out. A mutation operator introduces genetic variations in the population by randomly modifying some of the building blocks of individuals. Evolutionary algorithms are essentially parallel by design, and at each evolutionary step a breadth search of increasingly optimal sub-regions of the options space is performed. Evolutionary search is a powerful technique of solving problems, and is applicable to a wide variety of practical problems that are nearly intractable with other conventional optimization techniques. Practical evolutionary search schemes do not guarantee convergence to the global optimum in a predetermined finite time, but they are often capable of finding very good and consistent approximate solutions. However, they are shown to asymptotically converge under mild conditions.

An evolutionary algorithm may be used within a process and system for automating the tuning and maintenance of fuzzy rule-based and case-based decision systems used for automated decisions in insurance underwriting. While this approach is demonstrated for insurance underwriting, it is broadly applicable to diverse rule-based and case-based decision-making applications in business, commercial, and manufacturing processes. Specifically, we describe a structured and robust search and optimization methodology based on a configurable multi-stage evolutionary algorithm for identifying and tuning the decision thresholds of the fuzzy rules and internal parameters of the fuzzy rule-based decision engine and the internal parameters of the case-based decision engine. The parameters of the decision systems impact the quality of the decision-making, and are therefore critical. Furthermore, this tuning methodology can be used periodically to update and maintain the decision engines.

As stated above, these fuzzy logic systems may have many parameters that can be freely chosen. These parameters may either be fit to reproduce a given set of decisions, or set by management in order to achieve certain results, or a combination of the two. A large set of cases may be provided by the company as a "certified case base." According to an embodiment of the invention, the statistics of the certified case base may closely match the statistics of insurance applications received in a reasonable time window. According to an embodiment of the invention, there will be many more cases than free parameters, so that the system will be over-determined. Then, an optimal solution may be found which minimizes the classification error between a decision engine's output and the supplied cases. When considering maintenance of a system, it may be convenient and advantageous that the parameters are chosen using optimization vs. a set of certified cases. New fuzzy rules and certified cases may be added, or aggregation rules may change. The fuzzy logic systems may be kept current, allowing the insurance company to implement changes quickly and with zero variability.

The parameter identification and tuning problem which may presented in this invention can be mathematically described as a minimization problem:

$$\min_{x \in \chi} \psi(x) \text{ where } \chi = \chi_1 \times \chi_2 \times \ldots \times \chi_n \ \chi_i \subset \mathbb{R} \text{ and } \psi: \chi \to \mathbb{R}_+$$

where χ is an n-dimensional bounded hyper-volume (parametric search space) in the n-dimensional space of reals, x is a parameter vector, and ψ is the objective function that maps the parametric search space to the non-negative real line.

Figure 26:
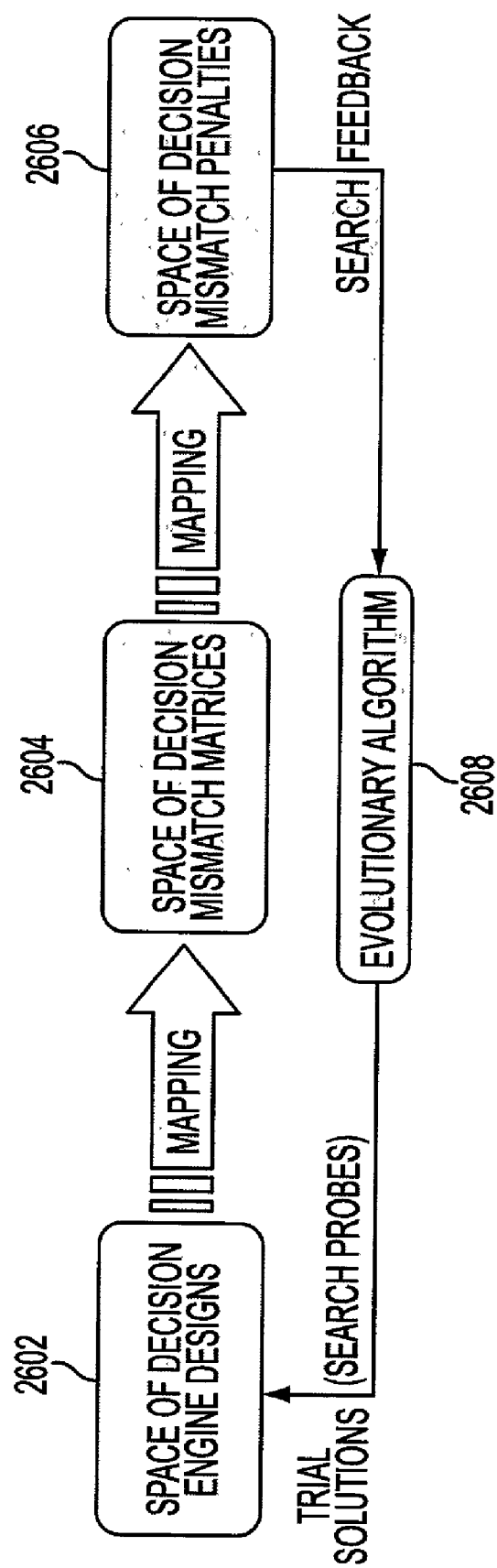
FIG. 26 illustrates an optimization process according to an embodiment of the invention.

FIG. 26 illustrates such a minimization (optimization) problem according to an embodiment of the invention in the context of the application domain, where the search space χ corresponds to the space of decision engine designs induced by the parameters imbedded in the decision engine, and the objective function ψ measures the corresponding degree of rate-class assignment mismatch between that of the expert human underwriter and the decision-engine for the certified case base. An evolutionary algorithm iteratively generates trial solutions (trial parameter vectors in the space χ), and uses their corresponding consequent degree of rate-class assignment mismatch as the search feedback. Thus, at step 2602, a space of decision engine's designs is probed. At step 2604, a mismatch matrix, which will be described in greater detail below, is generated based on the rate-class decisions generated for the cases by the decision engine. Penalties for mismatching cases are assigned at step 2606. The evolutionary algorithm uses the corresponding degree of rate-class assignment mismatches, and the associated penalties to provide feedback to the decision engine at step 2608. The system may then refine the internal parameters and decision thresholds in the decision engine at step 2602, and proceed through the process again. Thus, an iterative process may be performed.

Figure 27:
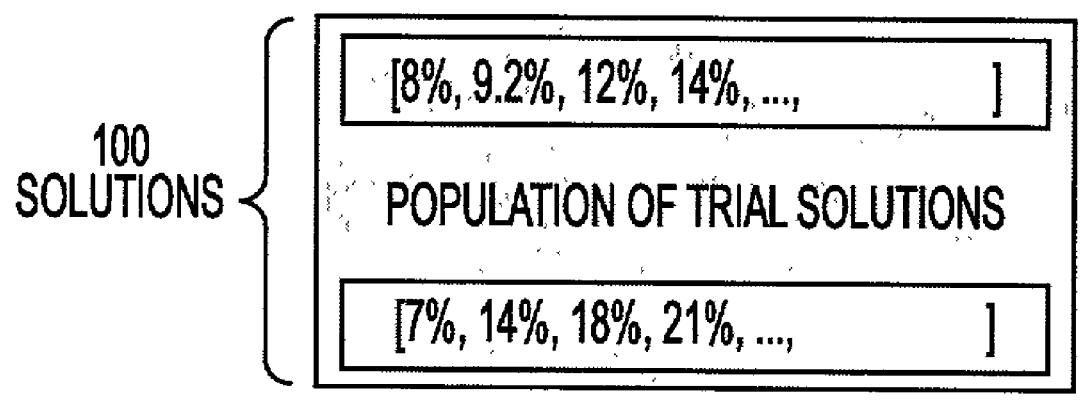
FIG. 27 illustrates an example of an encoded population at a given generation according to an embodiment of the invention.

FIG. 27 illustrates an example of an encoded population maintained by the evolutionary algorithm at a given generation. According to an embodiment of the invention, each individual in the population is a trial vector of design parameters representing fuzzy rule thresholds and internal parameters of the decision engine. Each percentage entry may represent a value of a trial parameter that falls within a corresponding bounded real line. Each trial solution vector may be used to initialize an instance of the decision engine, following which each of the cases in the certified case base is evaluated.

Figure 28:
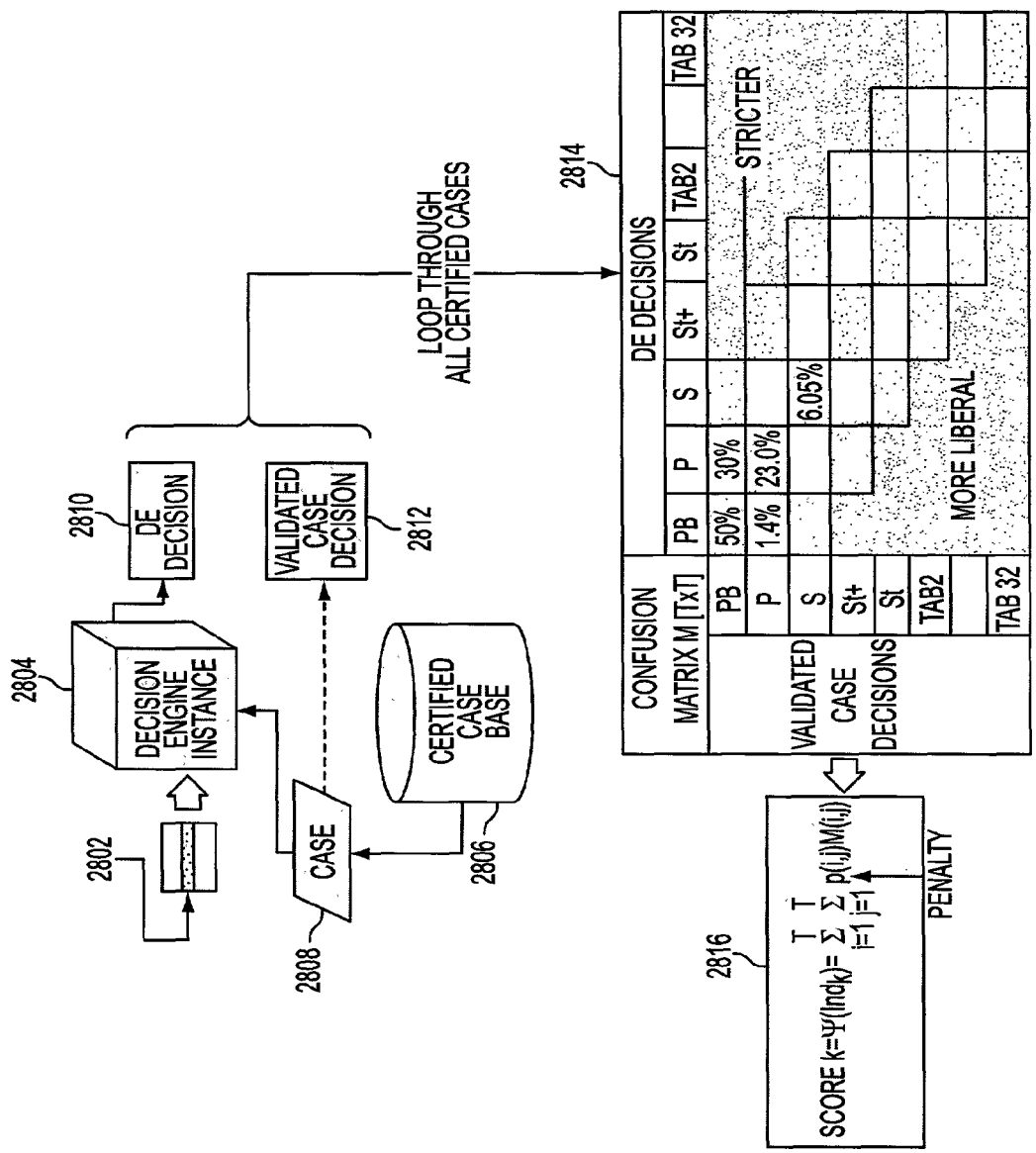
FIG. 28 illustrates a process schematic for an evaluation system according to an embodiment of the invention.

FIG. 28 illustrates a process schematic for an evaluation system according to an embodiment of the invention. Trial design parameters are provided at an input module 2802. The trial design parameters are automatically input to decision engine 2804. Case subset 2808 from certified case base 2806 is input into decision engine 2804. Certified case base 2806 may comprises cases that have been certified as being correct. Case subset 2808 may be a predetermined number of cases from certified case base 2806. According to an embodiment of the invention, case subset 2808 may comprise two thousand (2000) certified cases. According to an embodiment of the invention, case subset 2808 may comprise a number of times the number of tunable parameters of decision engine 2804. The cases within case subset 2808 are processed in decision engine 2804, and output to decision engine case decisions 2810.

Once all the cases in the certified case base are evaluated, a square confusion matrix 2814 is created. According to an embodiment of the invention, confusion matrix 2814 may be generated by comparing decision engine case decisions 2810 and certified case decisions 2812. The rows of confusion matrix 2814 may correspond to certified case decisions 2812 as determined by an expert human underwriter, and the columns of confusion matrix 2814 may correspond to the decision engine case decisions 2810 for the cases in the certified case base. By way of example, assume a case has been assigned a category S from certified case decision 2812 (from the matrix 2814) and a category PB from decision engine decision 2810. Under these categorizations, the case would count towards an entry in the cell at row 3 and column 1. In this example, the certified case decision 2812 places the case in a higher risk category, while the decision engine case decision 2810 places the case in a lower risk category. Therefore, for this particular case, the decision engine 2810 has been more liberal in decision-making. By way of another example, if on the other band both the certified case decision 2812 and the decision engine case decisions 2810 agree as upon categorizing the case in class S, then the case would count towards an entry in the cell at row 3 and column 3. By way of another example, if the certified case decision 2812 is PB, but the machine decision 2810 is S, then clearly the machine decision is more strict.

According to an embodiment of the invention, it may be desirable to use a decision engine that is able to place the maximum number of certified cases along the main diagonal of confusion matrix 2814. It may also be desirable to determine those parameters 2802 for decision engine 2804 that produce such results (e.g., minimize the degree of rate class assignment confusion or mismatch between certified case decisions 2812 and decision engine case decisions 2810). Confusion matrix 2814 may be used as the foundation to compute an aggregate mismatch penalty or score, using penalty module 2816. According to an embodiment of the invention, a penalty matrix may be derived from actuarial studies and is element-by-element multiplied with the cells of the confusion matrix 2814 to generate an aggregate penalty/score for a trial vector of parameters in the evolutionary search. A summation over the number of rows and columns of the matrix may occur, and that should now be "T" (upper case T), as the confusion matrix M may be of a dimension T×T. Other process systems may also be used to achieve the present invention.

According to an embodiment of the invention, an evolutionary algorithm may utilize only the selection and stochastic variation (mutation) operations to evolve generations of trial solutions. While the selection operation may seek to exploit known search space regions, the mutation operation may seek to explore new regions of the search space. Such an algorithm is known to those of ordinary skill in the art. One example of the theoretical foundation for such an algorithm class appears in Modeling and Convergence Analysis of Distributed Coevolutionary Algorithms, Raj Subbu and Arthur C. Sanderson, *Proceedings of the IEEE International Congress on Evolutionary Computation*, 2000.

Figure 29:
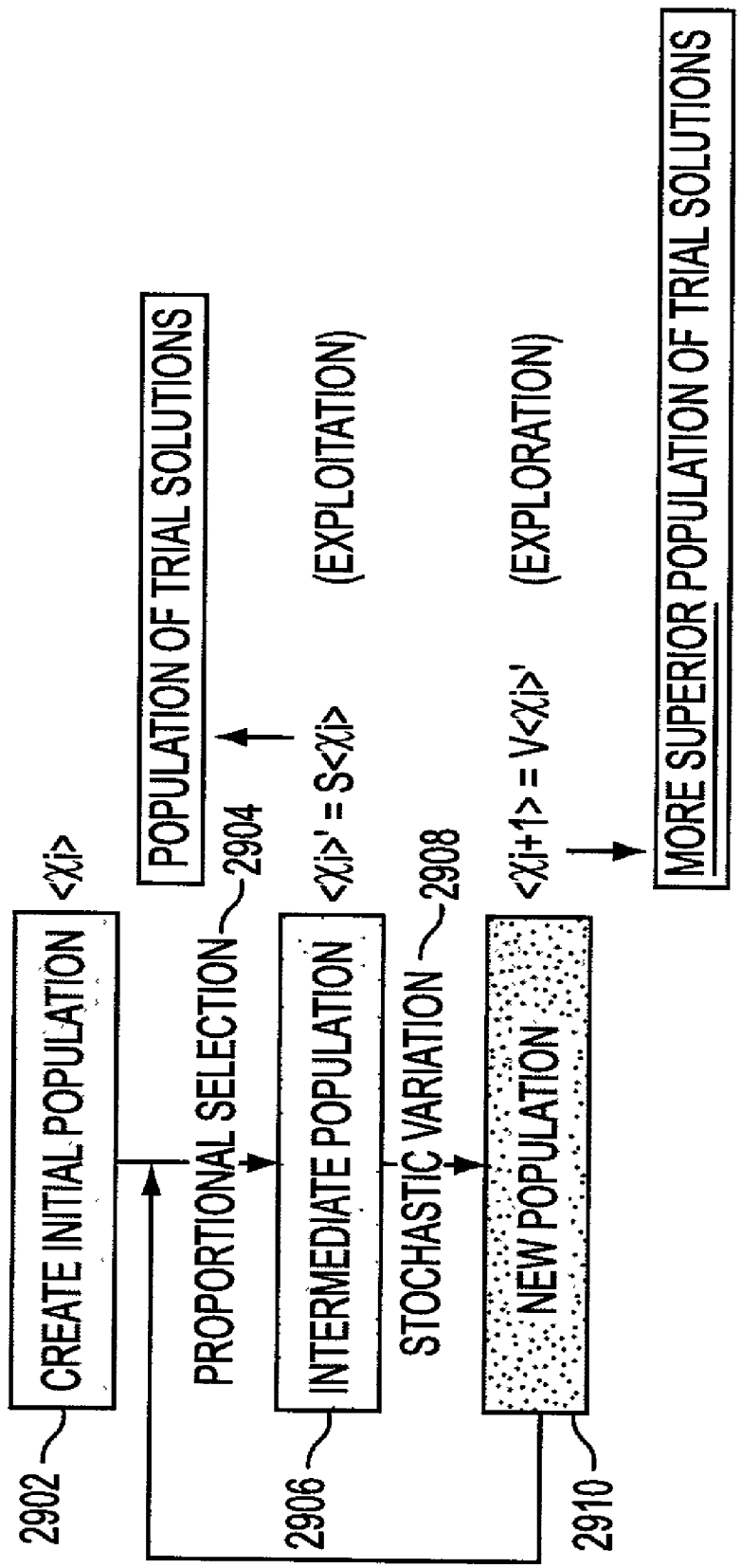
FIG. 29 illustrates an example of the mechanics of an evolutionary process according to an embodiment of the invention.

FIG. 29 illustrates an example of the mechanics of such an evolutionary process. At step 2902, an initial population of trial decision engine parameters is created. Proportional selection occurs at step 2904 and an intermediate population is created at step 2906. Stochastic variation occurs at step 2908, and a new population is created at step 2910. The new population may then be subject to proportional selection at step 2904, thereby creating an iterative process.

According to an embodiment of the invention, the evolutionary algorithm may use a specified fixed population size and operate in one or more stages, each stage of which may be user configurable. A stage is specified by a tuple consisting of a fixed number of generations and normalized spread of a Gaussian distribution governing randomized sampling. A given solution (also called the parent) in generation i may be improved by cloning it to create two identical child solutions from the parent solution.

The first child solution may be mutated according to a uniform distribution within the allowable search bounds. The second child solution may then be mutated according to the Gaussian distribution for generation i. If the mutated solution falls outside of the allowable search bounds, then the sampling is repeated a few times until an acceptable sample is found. If no acceptable sample is found within the allotted number of trials, then the second child solution may be mutated according to a uniform distribution. The best of the parent and two child solutions is retained and is transferred to the population at generation i+1. In addition, it is ensured via elitism that the improvement in the best performing individual of each generation of evolution i+n (where n is an increasing whole number) is a monotone function. According to an embodiment of the invention, the process may be repeated until i+n generation has been generated, where i+n is a whole number.

While the invention has been particularly shown and described within the framework of an insurance underwriting application, it will be appreciated that variations and modifications can be effected by a person of ordinary skill in the art without departing from the scope of the invention. For example, one of ordinary skill in the art will recognize that the fuzzy rule-based or case-based engine of this invention can be applied to any other transaction-oriented process in which underlying risk estimation is required to determine the price structure (premium, price, commission, etc.) of an offered product, such as insurance, re-insurance, annuities, etc. Furthermore, the determination of the confidence factor and the optimization of the decision engines transcend the scope of insurance underwriting. A confidence factor obtained in the manner described in this document could be determined from any application of a case-based reasoner (whether it is fuzzy or not). Similarly, the engine optimization process described in this document can be applied to any engine in which the structure of the engine has been defined and the parametric values of the engine need to be specified to meet a predefined performance metric. Furthermore, one of ordinary skill in the art will recognize that such decision engines do not need to be restricted to insurance underwriting applications.

The invention claimed is:

1. A system for optimizing an insurance application underwriting decision, of an insurance application, in a computer implemented insurance underwriting system, the system comprising:
   an input module that includes a process, represented by code, that processes an insurance application, the input module tangibly embodied in a computer device;
   a processor module, tangibly embodied in the computer device, that applies the process to a plurality of certified insurance applications, including parameters thereof, to render a second decision,
      where each of the plurality of certified insurance applications is constituted by an insurance application for which the system has rendered an underwriting first decision for each such certified insurance applications based on the parameters, and which each such certified insurance applications has been placed in a case base based on the first decision; and
   a comparison module, tangibly embodied in the computer device, that compares, to generate a comparison, the first decisions upon which the certified insurance applications were placed in the case base, to the second decisions performed by applying the process, the comparison generating a result, the result relating to whether at least one of the decisions of the certified applications matches a corresponding underwriting decision performed by applying the process; and outputting the result of the comparison between the second decisions and the first decisions performed by applying the process; and further comprising a penalty module that generates at least one penalty based on the comparison of the second decisions performed by applying the process and the first decisions, the generates at least one penalty including aggregating (1) penalties for misclassifications, between the second decisions performed by applying the process and the first decisions, with (2) rewards for correct classifications, between the second decisions performed by applying the process and the first decisions;

wherein penalties for misclassification are based on a determination of number of rate classes that a second decision performed by applying the process is as compared to a corresponding first decision;

where the process is a plurality of predetermined underwriting rules; and further comprising a redefinition module that redefines the plurality of underwriting rules based on the generated penalty and the comparison of the first decisions and the second decisions performed by applying the plurality of underwriting rules.

2. The system according to claim 1, where the process is an application comparison of an insurance application with at least one previously made insurance application underwriting decision, and the result of the comparison is in the form of at least a two by two matrix.

3. The system according to claim 1, where the comparison module further generates a mismatch matrix.

4. The system according to claim 1, where the processor module performs a plurality of insurance application underwriting decisions by applying the plurality of redefined rules to the plurality of certified insurance applications; and the comparison module compares the first decisions and the second decisions performed by applying the plurality of redefined rules.

5. The system according to claim 1, where the comparison module further generates a mismatch matrix, and the penalty module further:

generates a penalty matrix based on actuarial information; and performs an element-by-element multiplication of the cells of the penalty matrix with the cells of the mismatch matrix to generate an aggregate penalty.

6. A system for optimizing an insurance application underwriting decision, of an insurance application, in a computer implemented insurance underwriting system, the system comprising:

an input module that includes a process, represented by code, that processes an insurance application, the process including a plurality of rules, the input module tangibly embodied in a computer device;

a processor module, tangibly embodied in the computer device, that applies the plurality of rules to a plurality of certified insurance applications including parameters thereof, to render a second decision, where each of the plurality of certified insurance applications is constituted by an insurance application for which the system has rendered a first decision, which is an underwriting decision, for each such certified insurance applications based on the parameters and which each such certified insurance applications has been placed in a case base based on the first decision;

a comparison module, tangibly embodied in the computer device, that compares, to generate a comparison, first decisions upon which the certified insurance applications were placed in the case base, and the second decisions performed by applying the process;

a penalty module, tangibly embodied in the computer device, that generates and outputs at least one penalty based on the comparison of the first decisions and the second decisions performed by applying the plurality of rules, the generates at least one penalty including aggregating (1) penalties for misclassifications, between the second decisions and the first decisions, with (2) rewards for correct classifications, between the second decisions and the first decisions;

wherein penalties for misclassification are based on a rate class that a second decision is as compared to a corresponding first decision;

where the process is a plurality of predetermined underwriting rules; and a redefinition module, tangibly embodied in the computer device that redefines the plurality of underwriting rules based on the generated penalty and the comparison of the first decisions and the second decisions, the redefinition module outputting the redefined plurality of rules.

7. The system according to claim 6, where the process module further applying the plurality of redefined rules to the plurality of certified insurance applications; and the comparison module further compares the first decisions and the underwriting decisions performed by applying the plurality of redefined rules.

8. The system according to claim 6, where the comparison module further generates a mismatch matrix.

9. The system according to claim 8, where the penalty module further:

generates a penalty matrix based on actuarial information; and performs an element-by-element multiplication of the cells of the penalty matrix with the cells of the mismatch matrix to generate an aggregate penalty.

10. A system that optimizes a decision, of an insurance application, in a computer implemented decision system, based on a plurality of predetermined rules, the system comprising:

an input module that includes a process, represented by code, that processes an insurance application using the plurality of rules, the input module tangibly embodied in a computer device;

a processor module, tangibly embodied in the computer device, that applies the process to each of a plurality of certified insurance applications including parameters thereof to render respective second decisions, where each of the plurality of certified insurance application is constituted by an insurance application for which the system has rendered an first decision, relating to underwriting, for each such certified insurance applications based on the parameters and which each such certified insurance applications has been placed in a case base based on the first decision of each respective insurance application;

a comparison module, tangibly embodied in the computer device, that compares, to generate a comparison, the first decisions to second decisions performed by applying the plurality of rules;

a penalty module, tangibly embodied in the computer device, that generates and outputs at least one penalty based on the comparison of the second decisions performed by applying the plurality of rules and the first decisions, the generates at least one penalty including aggregating (1) penalties for misclassifications, between the second decisions and the first decisions, with (2) rewards for correct classifications, between the second decisions and the first decisions;

wherein penalties for misclassification are based on a rate class that a second decision is as compared to a corresponding first decision;

where the process is a plurality of predetermined underwriting rules; and a redefinition module that redefines the plurality of rules based at least in part on the generated penalty and the comparison of the first decisions and the second decisions.

11. The system according to claim 10, where the comparison module further generates a mismatch matrix.

12. The system according to claim 11, where the penalty module further:

generates a penalty matrix based on historical information related to the decision system; and performs an element-by-element multiplication of the cells of the penalty matrix with the cells of the mismatch matrix to generate an aggregate penalty.

* * * * *